(12) United States Patent
Konno et al.

(10) Patent No.: US 8,425,120 B2
(45) Date of Patent: Apr. 23, 2013

(54) ELECTROLYTIC EROSION PREVENTING INSULATED ROLLING BEARING, MANUFACTURING METHOD THEREOF, AND BEARING DEVICE

(75) Inventors: Katsuhiro Konno, Kanagawa (JP); Kenji Kotaki, Kanagawa (JP); Takashi Murai, Kanagawa (JP); Osamu Fujii, Kanagawa (JP); Tetsuo Watanabe, Kanagawa (JP); Takayuki Matsushita, Kanagawa (JP)

(73) Assignee: NSK Ltd., Tokyo (JP)

( * ) Notice: Subject to any disclaimer, the term of this patent is extended or adjusted under 35 U.S.C. 154(b) by 925 days.

(21) Appl. No.: 11/994,284

(22) PCT Filed: Oct. 26, 2006

(86) PCT No.: PCT/JP2006/321434
§ 371 (c)(1),
(2), (4) Date: Jul. 9, 2009

(87) PCT Pub. No.: WO2007/049727
PCT Pub. Date: May 3, 2007

(65) Prior Publication Data
US 2009/0304318 A1 Dec. 10, 2009

(30) Foreign Application Priority Data

Oct. 27, 2005 (JP) ................ 2005-312160
Jan. 27, 2006 (JP) ................ 2006-018631
Jun. 13, 2006 (JP) ................ 2006-163439
Jun. 19, 2006 (JP) ................ 2006-168605
Jul. 14, 2006 (JP) ................ 2006-194060
Aug. 4, 2006 (JP) ................ 2006-213136

(51) Int. Cl.
*F16C 19/00* (2006.01)
*F16C 33/58* (2006.01)

(52) U.S. Cl.
USPC ........... 384/492; 384/476; 384/569; 384/625; 384/907.1; 384/913

(58) Field of Classification Search ................ 384/476, 384/492, 493, 557, 569, 625, 905, 907.1, 384/912, 913; 29/898.066; 427/453–456
See application file for complete search history.

(56) References Cited

U.S. PATENT DOCUMENTS 3,873,469 A * 3/1975 Foster et al. ............... 502/242
4,997,293 A * 3/1991 Ono et al. ................. 384/476
(Continued)

FOREIGN PATENT DOCUMENTS

DE 29613702 U1 * 12/1997
DE 19631988 A1 * 2/1998
(Continued)

OTHER PUBLICATIONS

International Search Report dated Jan. 30, 2007 with English translation (Seven (7) pages).
(Continued)

*Primary Examiner* — Marcus Charles
(74) *Attorney, Agent, or Firm* — Crowell & Moring LLP

(57) ABSTRACT

Disclosed herein is an electrolytic erosion preventing insulated rolling bearing and a manufacturing method thereof. In one embodiment, the electrolytic erosion preventing insulated rolling bearing includes an insulating coating being a ceramic coating layer including alumina as the main component and 0.01 to 0.2 percent by weight titanium oxide with the alumina having a particle size ranging from 10 to 50 μm and average particle size ranging from 15 to 25 μm.

4 Claims, 30 Drawing Sheets

(A)

(B)

U.S. PATENT DOCUMENTS

| | | | |
|---|---|---|---|
| 5,085,733 A | | 2/1992 | Mitamura |
| 5,352,331 A | * | 10/1994 | Templin .......................... 216/16 |
| 5,975,764 A | | 11/1999 | Okada et al. |
| 6,248,186 B1 | | 6/2001 | Yamamura et al. |
| 6,984,255 B2 | * | 1/2006 | Itsukaichi et al. .............. 75/252 |
| 7,008,674 B2 | * | 3/2006 | Nagaraj et al. ................ 427/454 |
| 2005/0094910 A1 | | 5/2005 | Tsuji et al. |

FOREIGN PATENT DOCUMENTS

| | | | | |
|---|---|---|---|---|
| DE | 101 37 785 A1 | | 2/2003 | |
| EP | 475592 A2 | * | 3/1992 | |
| JP | 55-10111 A | | 1/1980 | |
| JP | 58114803 A | * | 7/1983 | |
| JP | 60-85626 A | | 5/1985 | |
| JP | 62-3066 A | | 1/1987 | |
| JP | 63-111318 A | | 5/1988 | |
| JP | 63274751 A | * | 11/1988 | |
| JP | 64-38320 U | | 3/1989 | |
| JP | 1-182621 A | | 7/1989 | |
| JP | 1-288618 A | | 11/1989 | |
| JP | 3-82736 A | | 4/1991 | |
| JP | 3-277818 A | | 12/1991 | |
| JP | 05-52223 A | | 3/1993 | |
| JP | 05-312216 A | | 11/1993 | |
| JP | 6-2030 A | | 1/1994 | |
| JP | 07268594 A | * | 1/1994 | |
| JP | 6-43350 U | | 6/1994 | |
| JP | 07187820 A | * | 7/1995 | |
| JP | 7-279972 A | | 10/1995 | |
| JP | 2624337 B2 | | 4/1997 | |
| JP | 10005930 A | * | 1/1998 | |
| JP | 10-246238 A | | 9/1998 | |
| JP | 2002-48145 A | | 2/2002 | |
| JP | 2002048145 A | * | 2/2002 | |
| JP | 2002-147468 A | | 5/2002 | |
| JP | 2002147473 A | * | 5/2002 | |
| JP | 2002-181054 A | | 6/2002 | |
| JP | 2003-183806 A | | 7/2003 | |
| JP | 2003226586 A | * | 8/2003 | |
| JP | 2005-42895 A | | 2/2005 | |
| JP | 2005-133876 A | | 5/2005 | |
| JP | 2005-214348 A | | 8/2005 | |
| JP | 2007218368 | * | 8/2007 | |

OTHER PUBLICATIONS

Supplementary European Search Report dated Nov. 10, 2011 (twelve (12) pages).

Notification of Transmittal of Translation of the International Preliminary Report on Patentability, International Preliminary Report on Patentability and Written Opinion of the International Searching Authority mailed Sep. 29, 2008.

Japanese Office Action dated Dec. 22, 2010 w/ English translation (four (4) pages).

Japanese Office Action dated Mar. 9, 2011 w/ English translation (three (3) pages).

Machine Translation of JP 2005-133876 (nine (9) pages).

Japanese language document dated Jan. 11, 2007 related to JP 2005-133876 (two (2) pages).

* cited by examiner

Fig.1
(A)
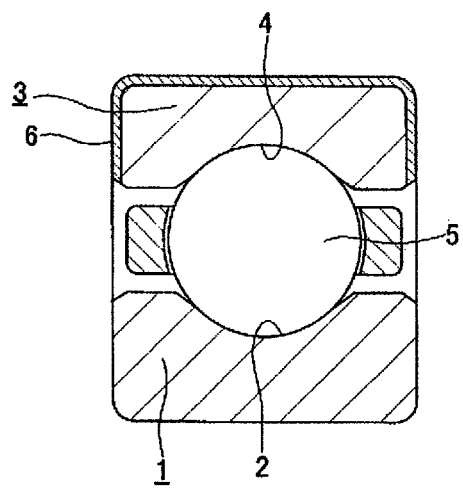
(B)
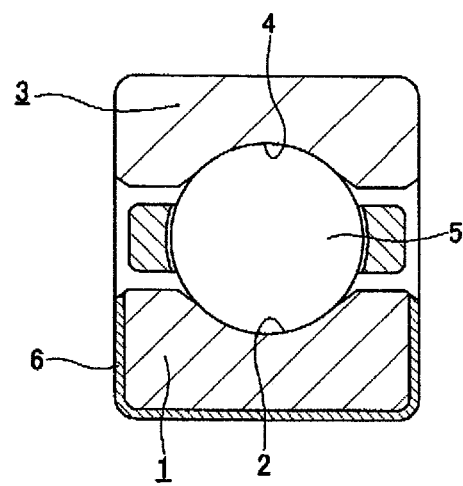

Fig.4
(A)
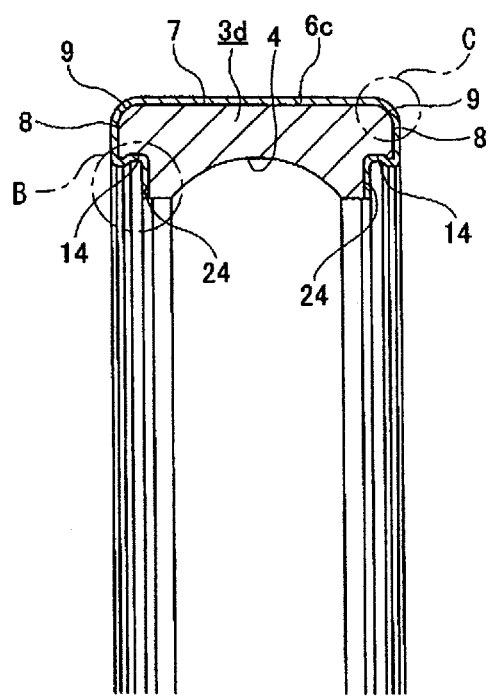
(B)
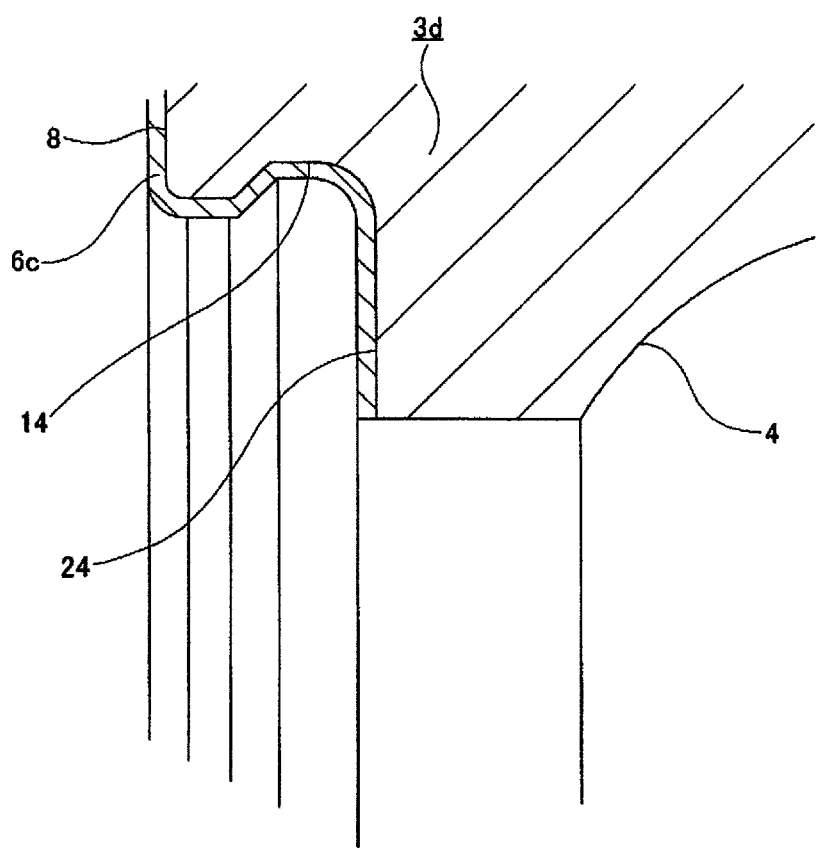

Fig.6
(A)
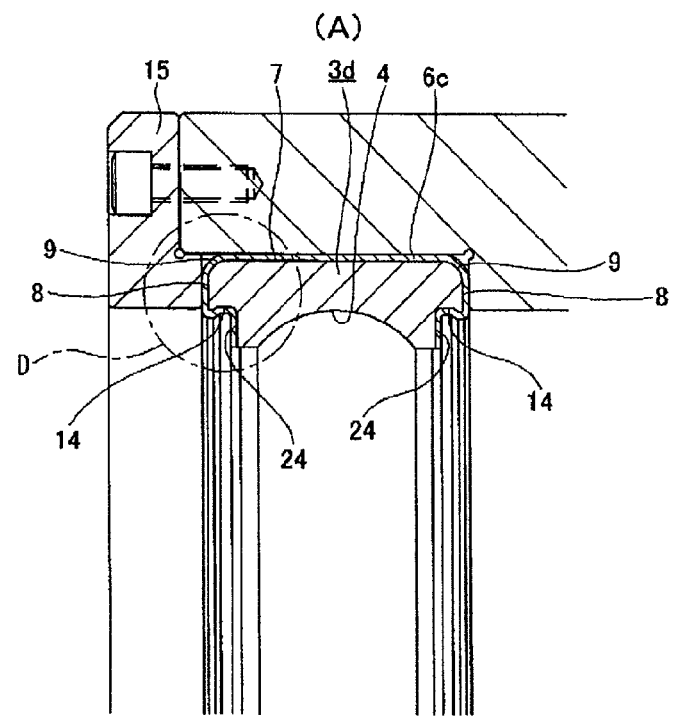
(B)
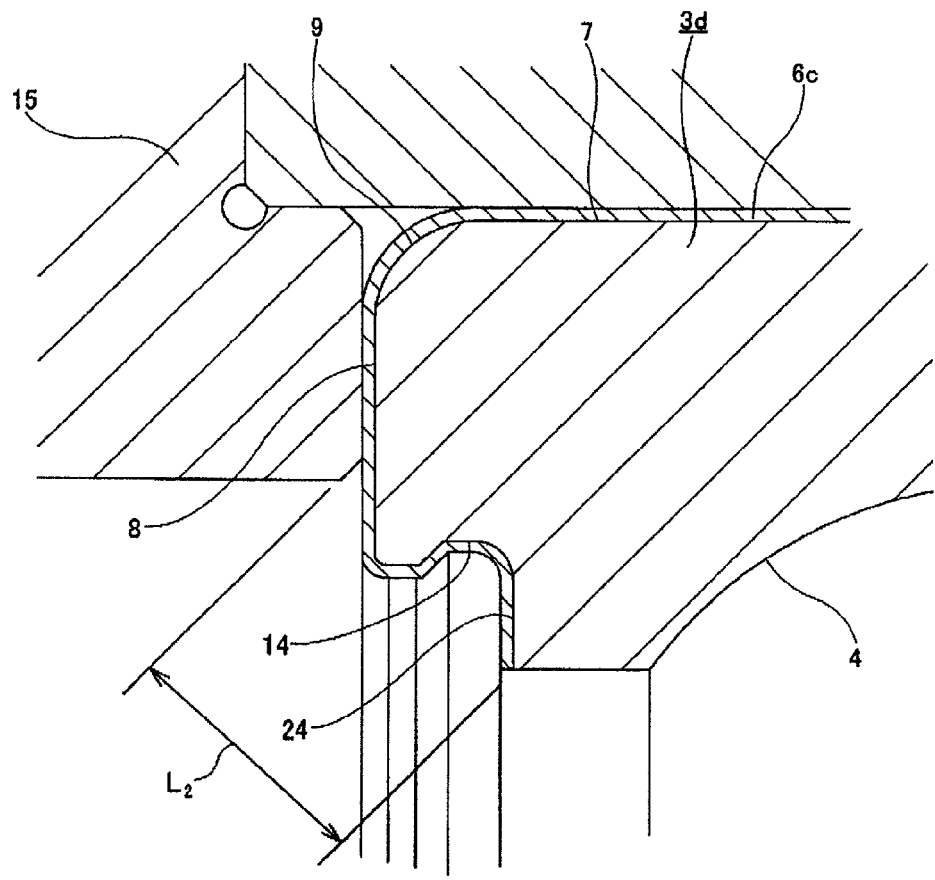

Fig.15
(A) 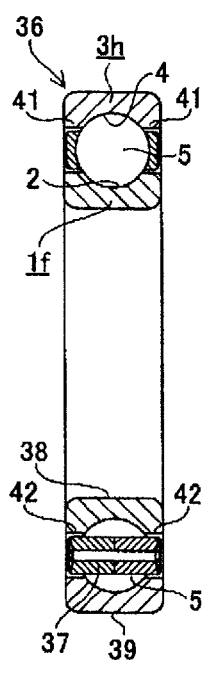
(B) 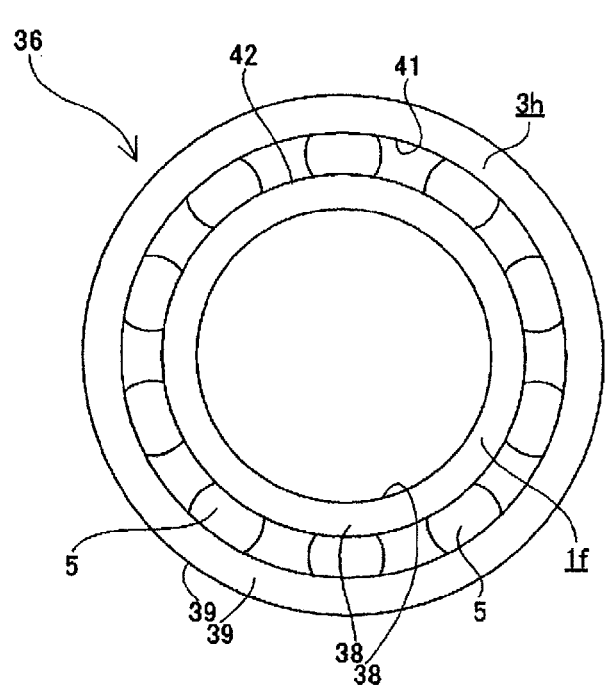
(C) 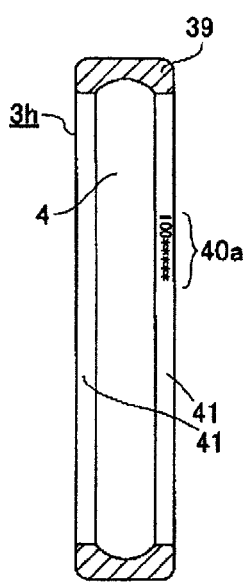
(D) 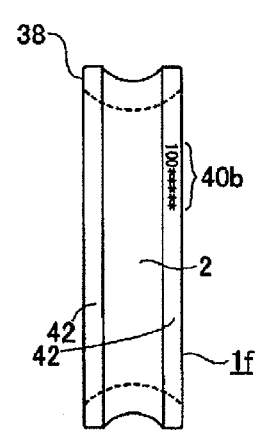

(A)          (B)

Fig.37
(A)
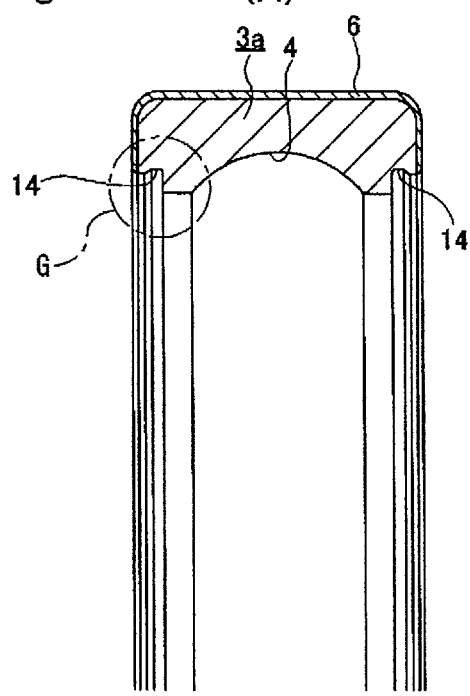
(B)
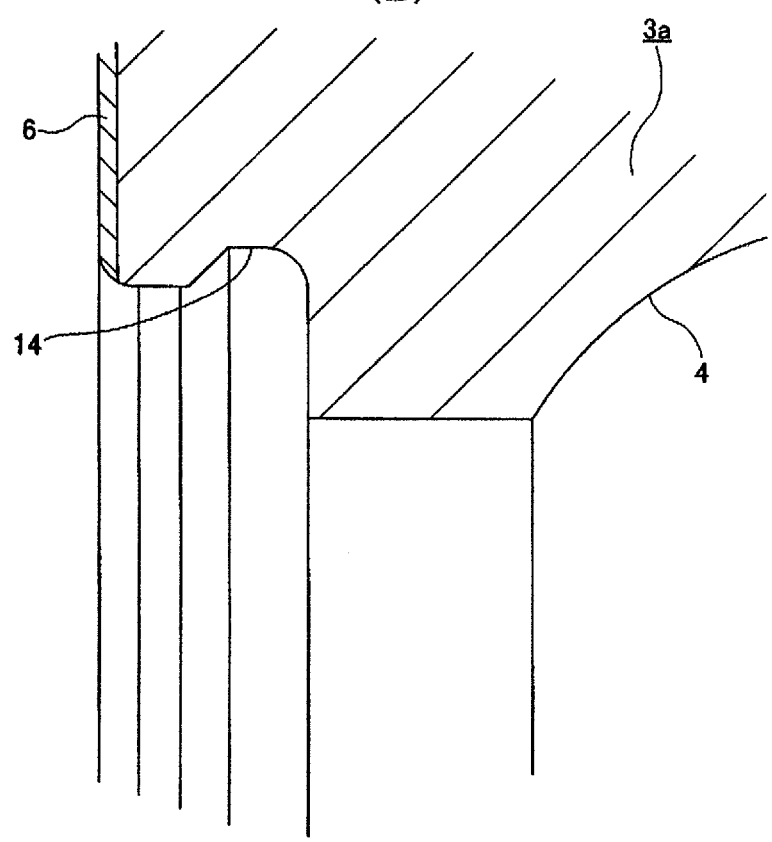

Fig.38
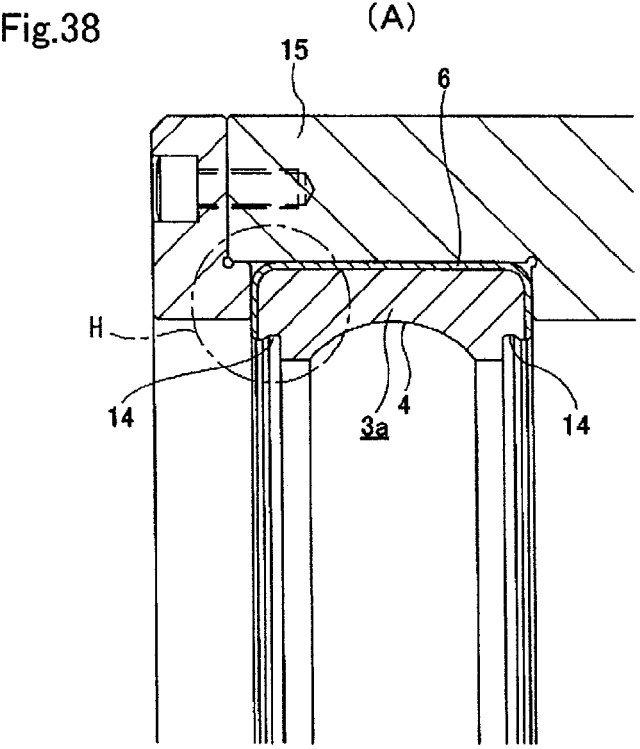
(A)
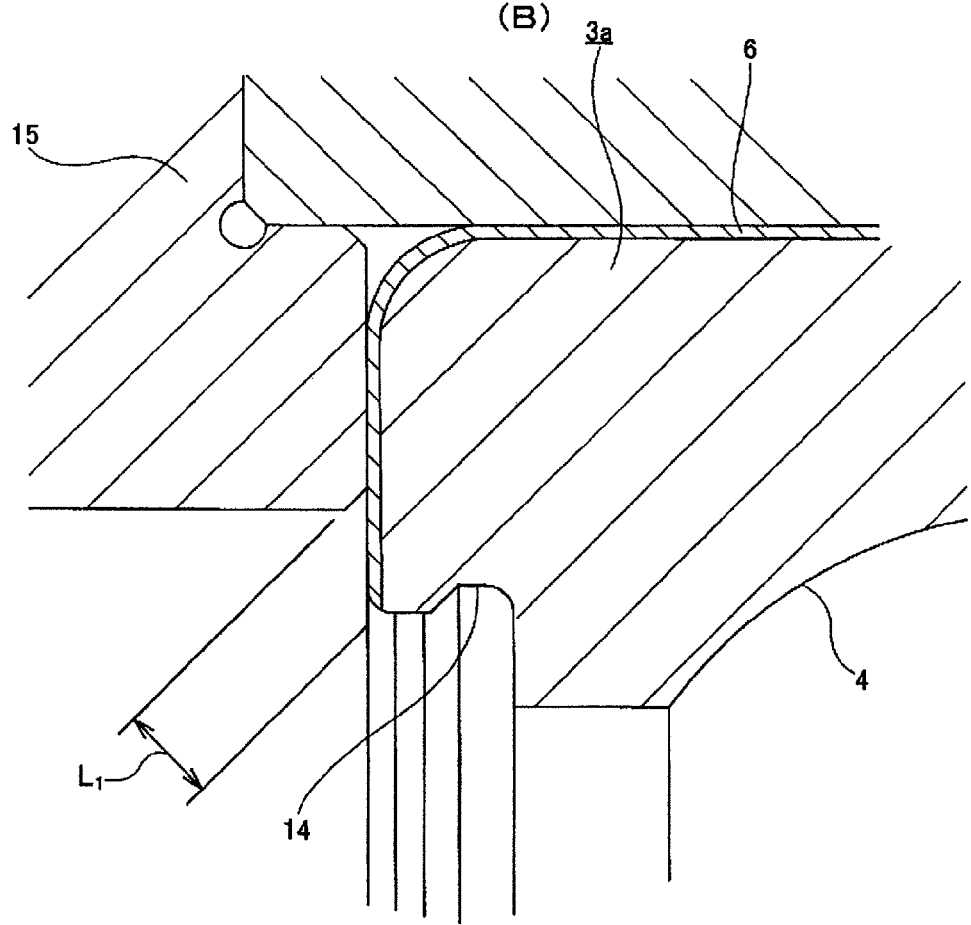
(B)

US 8,425,120 B2

ELECTROLYTIC EROSION PREVENTING INSULATED ROLLING BEARING, MANUFACTURING METHOD THEREOF, AND BEARING DEVICE

CROSS-REFERENCE TO RELATED APPLICATIONS

This application is a US national stage application of PCT application no. PCT/JP2006/321434, filed Oct. 26, 2006. Priority is claimed based on Japanese patent application no. 2005-312160, filed Oct. 27, 2005; Japanese patent application no. 2006-018631, filed Jan. 27, 2006; Japanese patent application no. 2006-163439, filed Jun. 13, 2006; Japanese patent application no. 2006-168605, filed Jun. 19, 2006; Japanese patent application no. 2006-194060, filed Jul. 14, 2006; and Japanese patent application no. 2006-213136, filed Aug. 4, 2006.

BACKGROUND OF THE INVENTION

1. Field of the Invention

This invention relates to an electrolytic erosion preventing insulated rolling bearing and a manufacturing method thereof. This electrolytic erosion preventing insulated rolling bearing is incorporated in a rotation support portion into which there is a possibility of current flowing, such as a rotation shaft of a general-purpose electric motor for general industry, an electrical generator (electrical generator of a wind mill or the like), a main motor for a rail car, or a medical device (CT scanner or the like). Specifically, this invention relates to a large sized electrolytic erosion preventing insulated rolling bearing whose outer diameter is 200 mm or more.

Moreover, this invention is a bearing assembly which constitutes a rotation support portion of a general-purpose electric motor for general industry, an electrical generator (electrical generator of a wind mill or the like), a main motor for a rail car, or a medical device (CT scanner or the like). Specifically, this invention relates to a bearing assembly which is incorporated in an inverter controlled motor or generator.

2. Description of Related Art

In the case of a rolling bearing for supporting a rotating shaft as used in a range of electrical equipment such as an electric motor, an electrical generator, or the like, if no countermeasure is devised, electrical current, such as return current, motor shaft current, or the like, flows into the rolling bearing itself. In the case where electrical current flows into a rolling bearing, so-called electrolytic erosion occurs whereby erosion progresses in the parts that serve as pathways of current, shortening the life of the rolling bearing significantly. Conventionally, in order to prevent such electrolytic erosion from occurring, an electrolytic erosion preventing insulated rolling bearing has been known, that prevents electric current from flowing into the rolling bearing by the formation of an insulating coating on the surfaces of the outer ring and the inner ring of the rolling bearing, as is disclosed in Patent Documents 1 to 3, and Patent Documents 8 to 10, for example.

The insulated rolling bearings disclosed in each of the patent documents are produced by forming an insulating coating such as a ceramic, a synthetic resin, or the like, on part of a bearing ring of the rolling bearing that fits with and is supported by a mating component, and is configured as shown in FIG. 34 for example. The rolling bearing is provided with a plurality of rolling elements 5 between an inner ring raceway 2 formed in the outer peripheral surface of an inner ring 1 and an outer ring raceway 4 formed in the inner peripheral surface of an outer ring, that enable the inner ring 1 and the outer ring 3 to rotate relative to each other. An insulating coating 6, which is a ceramic sprayed layer, is formed on the outer peripheral surface and the two axial end faces of the outer ring 3. In the case of such an electrolytic erosion preventing insulated rolling bearing, in a state in which the outer ring 3 is fitted inside and supported by a metal housing, the insulating coating 6 insulates the outer ring 3 from the housing. As a result, current does not flow between the outer ring 3 and the housing, preventing electrolytic erosion as described above from occurring in each of the components 1, 3 and 5 of the rolling bearing.

However, in the case of the known conventional electrolytic erosion preventing insulated rolling bearing, which is disclosed in the above-mentioned Patent Documents 1 to 3, it is difficult to ensure high levels of insulation performance, durability, and low cost, at the same time. The reason is as follows. For example, in the case where the insulating coating 6, which is a ceramic sprayed layer, is formed on the surface of the outer ring 3 by moving a spray nozzle along the outer peripheral surface 7 of the outer ring 3, a ceramic sprayed layer is formed on the outer peripheral surface 7, and by moving a spray nozzle along the two axial end faces 8 of the outer ring 3, ceramic sprayed layers are formed on the two axial end faces 8. As a ceramic sprayed layer formed in this manner, one with a thickness dimension of 0.5 mm or more (typically about 0.6 to 0.7 mm) is formed conventionally by spraying droplets of ceramic material containing alumina ($Al_2O_3$) at 94 to 95 percent by weight.

Since ceramic sprayed layers are formed on the surfaces 7 and 8 as described above, ceramic sprayed from both nozzles becomes attached to continuous folded over portions 9 which are located between the two axial end faces 8 and the outer peripheral surface 7. Consequently, the thickness dimension of the continuous folded over portions 9 is greater than the thickness dimension of the outer peripheral surface and the two axial end faces 8. As a result, if the thickness dimension of the surfaces 7 and 8 is made a sufficient value from the aspect of maintaining insulation performance, the thickness dimension of the two continuous folded over portions 9 becomes too large. The ceramic sprayed layers are brittle, so if the thickness dimension becomes too large, it is likely to cause damage such as cracks, chips and the like. Since the continuous folded over portions 9 themselves do not make contact with other parts such as the housing and the like, even if the ceramic sprayed layer is damaged, it is unlikely to cause a problem from the aspect of maintaining the insulation performance. However, in the case where a broken fragment of ceramic falls and enters the inside of the rolling bearing, it is likely to generate damage such as making an indentation in the surface or the like of the inner ring raceway 2, the outer ring raceway 4, or the rolling contact surface of each of the rolling elements 5, which is undesirable. Therefore, conventionally, the thickness dimension of the part of the ceramic sprayed layer that covers the continuous folded over portions 9 is also reduced by grinding. Grinding the surface parts of the continuous folded over portions 9 causes an increase in the cost, for no gain.

Furthermore, conventionally, an invention disclosed in Patent Documents 4 and 5 is known as a technique that aims at preventing a ceramic insulating coating from being damaged. The invention disclosed in Patent Document 4 improves the toughness of the insulating coating by impregnating a ceramic insulating coating with a synthetic resin. Moreover, the invention disclosed in Patent Document 5 prevents the ceramic sprayed layer from breaking off, by covering a ceramic insulating coating with a metal layer. However, in the cases of the inventions disclosed in Patent Documents 4 and 5, manufacture is difficult, so neither of them can achieve low cost.

On the other hand, Patent Document 6 discloses an invention related to an electrolytic erosion preventing insulated rolling bearing having a gray alumina insulating coating containing titanium oxide ($TiO_2$) at 1 percent by weight or less. As disclosed in Patent Document 6, in the case where only performance maintenance (maintenance of insulation resistance value) of an insulating coating is considered, white alumina, being pure alumina that does not contain titanium oxide, is superior to gray alumina containing titanium oxide. However, as is disclosed in Patent Document 6, in the case of white alumina, the yield of the material (alumina grain) at the time of sprayed layer formation is poor, increasing the cost. Therefore, in the case of the invention disclosed in Patent Document 6, insulation performance is maintained while controlling the cost increase by using gray alumina having the above-described composition.

However, according to an experiment performed by the inventor of the present invention, it is found that gray alumina having the composition disclosed in Patent Document 6 does not always maintain sufficient insulation performance. On the other hand, in the case where white alumina is used, it is found that, if the grain diameter of alumina sprayed is controlled appropriately, although the amount of cost increase is limited, irregular coloring occurs on the surface, resulting in a poor external appearance of the product. That is, the alumina sprayed layer has minute voids inside it in its normal condition, and in the case where moisture enters the voids, the insulation performance deteriorates. Therefore, after forming the sprayed alumina layer, as is disclosed in Patent Document 7, it is necessary to perform sealing whereby the above-described voids are covered with synthetic resin, so that the moisture is prevented from entering the voids. In the case where the sprayed layer is formed using white alumina, irregular coloring occurs on the surface of the sprayed layer accompanying the sealing with synthetic resin. Such irregular coloring is not a problem in terms of insulation performance, but since it degrades the external appearance of the product, it is not desirable.

On the other hand, as shown in FIGS. 35 and 36, there is a construction in which seal rings 10, being sealing devices, or shield plates 11, are provided in a rolling bearing. In the case of the construction shown in FIG. 35, the seal rings 10 are formed by reinforcing an elastic material 13 such as rubber or the like with metal cores 12. The outer peripheral edges of the two seal rings 10 are fitted in fitting grooves 14 formed in the inner peripheral surfaces of the two ends of the outer ring 3a, and the inner peripheral edges of the two seal rings 10 are pressed into sliding contact with parts of the outer peripheral surfaces of the two ends of the inner ring 1a around the entire circumference. Furthermore, in the case of the construction as shown in FIG. 36, the shield plates 11 are formed by a metal plate formed approximately circularly, and the outer peripheral edges are fitted into the fitting grooves 14 formed in the inner peripheral surfaces of the two ends of the outer ring 3a, and the inner peripheral edges are close to the outer peripheral surfaces of the two ends of the inner ring 1a. In the cases of the constructions as shown in FIGS. 35 and 36, by providing the seal rings 10 or the shield plates 11, the space between the outer ring 3a and the inner ring 1a, where each of the rolling elements 5 are installed, is isolated from the external environment.

Heretofore, in the case of forming the aforementioned insulating coating 6 as shown in FIG. 34 in the abovementioned constructions as shown in FIGS. 35 and 36, the fitting grooves 14 are not covered with the insulating coating 6 as shown in FIG. 37. Therefore, as shown in FIG. 38, in a state in which the outer ring 3a is installed in a metal housing 15 that forms a rotation support portion such that part of the housing 15 and the two fitting grooves 14 are adjacent, the distance between the surfaces of the fitting grooves 14, which are not covered with the insulating coating 6, and the surface of part of the housing 15, becomes small. In this case, there is a possibility that discharge phenomena occur between the surface of part of the housing 15 and the two fitting grooves 14. Especially, in the case where the potential difference is great (for example, 1500V or more), such discharge phenomena are likely to occur. If the discharge phenomena occur, current flows into the rolling bearing, and there is a possibility that the aforementioned electrolytic erosion will occur.

Furthermore, in recent years, in order to improve sealing, carbon black or silica has been added to the elastic material 13 of the seal rings 10, which are fitted into the two fitting grooves 14. For example, carbon black is added to acrylonitrile-butadiene rubber or the like as the elastic material 13 to improve the friction property, wear resistance, and thermal resistance. However, since carbon black is conductive, in the case where the fitting grooves 14 are not covered by the insulating coating 6 as described above, it is easy for current to flow through the two seal rings 10 from the two fitting grooves 14.

Moreover, in the case where the metal shield plates 11 are fitted into the two fitting grooves 14 also, since the inner peripheral edges of the two shield plates 11 are close to the outer peripheral surfaces of the two ends of the inner ring 1a, it can be expected that it is easy for current to flow through the two shield plates 11. In this manner, in the case where current flows through the seal rings 10 or the shield plates 11, there is a possibility that electrolytic erosion occurs between the inner peripheral edges of the seal rings 10 or the inner peripheral edges of the shield plates 11, and the outer peripheral surfaces of the two ends of the inner ring 1a. In the case where electrolytic erosion occurs in such places, the seal deteriorates, leading to a shortened life of the rolling bearing.

Furthermore, in the case where the seal rings 10 or shield plates 11, as described above, are conductive, there is a possibility that discharge phenomena occur between the housing 15 and the seal rings 10 or the shield plates 11. In the case where such discharge phenomena occur, current flows not only between the seal rings 10 or the shield plates 11 and the inner ring 1a, but also through the fitting grooves 14 to the outer ring 3a side. Therefore, there is a possibility that the aforementioned electrolytic erosion occurs even among the component members of the outer ring 3a, the rolling elements 5 and the inner ring 1a.

Moreover, in order to prevent electrolytic erosion as described above, heretofore, a technique is known in which an insulating coating made from synthetic resin with excellent insulating characteristics, is formed on the outer peripheral surface of the outer ring or the inner peripheral surface of the inner ring, which are surfaces that fit with the housing or the shaft. As such a synthetic resin with excellent insulating characteristics, polybutylene terephthalate (PBT), polyamide 66 (PA66), polyamide 6 (PA6) and the like are recommended for example. However, among them PA66 and PA6 have high water absorptivity, and their dimensions can change easily by absorbing moisture from the air. Therefore, they are not desirable as materials for coating the fitting surface of a bearing device, which must be accurate. Moreover, the above-described PBT is sometimes not sufficiently thermal resistant or strength, so it is inevitably not desirable as a material for coating the interface surface.

In response, in Patent Document 11 for example, a technique is disclosed wherein polyphenylene sulfide (PPS) containing glass fiber is used as a material for forming an insulating coating. That is, as shown in FIG. 39, an insulating coating 17 made from PPS containing glass fiber is formed on the outer peripheral surface and the two end faces of the metal outer ring 3b and the inner peripheral surface and the two end faces of the metal inner ring 1b, which are constituents of a rolling bearing 16. The rolling bearing 16, which is shown in the figure, is a deep groove ball bearing, and therefore there is a plurality of metal balls 18 provided between the outer ring raceway 4 formed in the inner peripheral surface of the outer ring 3b, and the inner ring raceway 2 formed in the outer peripheral surface of the inner ring 1b. In the rolling bearing 16 configured in this manner, the outer ring 3b is fitted inside the metal housing 15a via the insulating coating 17, and the inner ring 1b is fitted outside the metal shaft, which is not shown in the figure, similarly via the insulating coating 17. As a result, it is possible to prevent current from flowing into the rolling bearing 16, and thus prevent electrolytic erosion.

Furthermore, by using PPS that is reinforced by glass fiber as described above as the insulating coating 17, it is possible to solve problems such as dimensional change due to moisture absorption, and insufficiency of thermal resistance and strength as mentioned previously. However, synthetic resin material as described above has a greater coefficient of linear expansion than that of metal such as bearing steel, which is the material for the bearing ring of the rolling bearing, the housing, the shaft, and the like. Accordingly, it can be deformed easily due to the heat generated in the rotation support portion.

In response, Patent Documents 6, 12 and 13 disclose a technique wherein a ceramic insulating coating, whose coefficient of linear expansion is small, is formed on the outer peripheral surface of the outer ring and the two end faces. In the case of the construction disclosed in Patent Document 12, as shown in FIG. 40, a ceramic insulating coating 17a is formed on the outer peripheral surface and the two end faces of an outer metal ring 3c, and the insulating coating 17a is covered with a metal layer 19. A rolling bearing 16a, which is shown in the figure, is a cylindrical roller bearing. Therefore, flange parts 20 are formed on the inner peripheral surfaces of the two ends of the outer ring 3c, and a cylindrical outer ring raceway 4a is formed on the inner peripheral surface of the central part of the outer ring 3c, which is located between the two flange parts 20. Moreover, a cylindrical inner ring raceway 2a is formed on the outer peripheral surface of the central part of the inner metal ring 1c. A plurality of cylindrical metal rollers 21 is provided between the outer ring raceway 4a and the inner ring raceway 2a.

In the case of the rolling bearing 16a configured as above, since the insulating coating 17a is made from a ceramic whose coefficient of linear expansion is small, deformation due to heat can be suppressed. Furthermore, since the insulating coating 17a is covered with the metal layer 19, when the outer ring 3c is fitted inside the mating component such as the housing or the like by an interference fit, the insulating coating 17a can be prevented from peeling off. However, in the case of the construction disclosed in Patent Document 12 having such a configuration, the manufacturing cost increases proportionate to forming the metal layer 19. Moreover, Patent Document 13 discloses a construction in which a first metal layer is provided on the outer peripheral surface of the outer ring and the two end faces, an insulating coating is provided on the first metal layer, and furthermore a second metal layer is provided on the insulating coating. In the case of the construction disclosed in Patent Document 13, it is also inevitable that the cost will be increased.

Incidentally, an electric motor or an electrical generator, into which a rolling bearing provided with an insulating coating as described above is incorporated, is generally inverter controlled. Furthermore, in recent years, in order to reduce noise at the time of switching, there has been a tendency to increase the carrier frequency of the inverter. Consequently, the current flowing into the rolling bearing has become high frequency. Accordingly, the insulating coating is required to have high impedance (a high insulation resistance value). The impedance becomes smaller as the capacitance (C) increases (or becomes greater as C decreases) as is evident from the following equation.

$$|Z| = \frac{1}{\sqrt{\frac{1}{R^2} + (2\pi fC)^2}} \quad \text{[Equation 1]}$$

|Z|: impedance (Ω)
R: resistance (Ω)
f: frequency (Hz)
C capacitance (F)

Accordingly, in order to increase the impedance |Z|, it is necessary to reduce the capacitance C. This capacitance C is proportional to the area (A) as is evident from the following equation.

$$C = \varepsilon_0 \varepsilon_r \frac{A}{S} \quad \text{[Equation 2]}$$

$\in_o$: dielectric constant of a vacuum (8.854×10$^{-12}$ F/m)
$\in_r$: relative dielectric constant
A: area (m$^2$)
S: distance (m)

Accordingly, in the case where the thickness (distance S) of the insulating coating is constant, the smaller the area A, the smaller the capacitance. Accordingly, in the case where an insulating coating with the same thickness is applied to rolling bearings with different bearing sizes, the capacitance of a rolling bearing with a larger bearing size, whose surface area becomes larger, is larger than that of a rolling bearing with a smaller bearing size. Therefore, in order to increase the impedance of an insulating coating applied to a rolling bearing with a larger bearing size, it is necessary to increase the thickness of the insulating coating. However, if the thickness of the film increases, the cost of the material increases. Especially, in the case where the insulating coating is made of a ceramic sprayed layer, the duration of the spraying operation increases, which also incurs an increase in the cost.

Patent Document 6 discloses a construction in which a ceramic insulating coating consists of only one layer formed directly on the material surface. However, in the case where the construction disclosed in Patent Document 6 is used in a large sized rolling bearing, there is a possibility that sufficient insulation performance cannot always be obtained. The reason is that the case of the construction disclosed in Patent Document 6 is targeted at a rolling bearing whose outer diameter is approximately 120 to 170 mm, and a large-sized rolling bearing whose outer diameter is 200 mm or more is not taken into consideration. As mentioned above, in the case where an insulating coating is formed on the outer ring of a large-sized rolling bearing, the film thickness must be increased as the surface area is enlarged. However, if the film thickness is increased by greater than or equal to a certain value, good insulation performance proportionate to the increase in the cost cannot always be expected. Accordingly, in the case of considering the material cost and the spraying operation duration, depending on the quality of the insulating coating material, it is sometimes difficult to obtain an insulating coating with sufficient insulation performance.

Furthermore, in the case where a ceramic insulating coating is formed on a rolling bearing, in many cases it is formed on the outer ring side. The reason is that in the case of forming a ceramic insulating coating by spraying, for the outer ring whose outer peripheral surface and two end faces are the surfaces to be sprayed, spray nozzles can be placed on the outside of the component, improving manufacturability. Moreover, in the case where the rolling bearing is incorporated in a rotation support portion, in many cases the inner ring and the shaft are fitted together by an interference fit, and the outer ring and the housing are fitted together by a clearance fit. However, in the case where the brittle ceramic insulating coating is formed on the inner peripheral surface of the inner ring, which is an interference fit, there is a possibility that cracks or chips occur in the insulating coating. Therefore, in order to prevent such cracks or chips occurring in the insulating coating, in many cases, the ceramic insulating coating is formed on the outer ring side.

However, the sum of the surface areas of the outer peripheral surface of the outer ring and the two end faces is larger than the sum of the surface areas of the inner peripheral surface of the inner ring and the two end faces, so in the case of forming an insulating coating on the outer ring side, from the equation relating the capacitance and the area as mentioned previously, it is necessary to increase the film thickness in order to decrease the capacitance. In response, a construction can be considered in which a ceramic insulating coating is formed on the inner peripheral surface of the inner ring, the inner ring and a shaft are fitted together by a clearance fit, and disparity between the fitted surfaces is prevented by the design of the shape of the fitted surface, or using a jig or the like. However, since creeping occurs between the inner ring and the shaft, this is not realistic. Furthermore, Patent Document 6 discloses a construction in which the ratio of titanium oxide contained in a ceramic is controlled. In the case of the construction disclosed in Patent Document 6, the titanium oxide is regulated to 0.25 to 0.75 percent by weight. However, in the case where the ratio of the titanium oxide is increased this much, there is a possibility that sufficient impedance cannot be ensured.

Patent Documents 14 to 16 are documents in which a technique associated with the present invention is disclosed. Patent Documents 14 and 15 disclose a technique in which the dimensions of a bearing are stabilized even at a high temperature. Moreover, Patent Document 16 discloses a case where an inner ring is made from a ceramic, and a technique in which the interference between an inner ring and a shaft is regulated.

On the other hand, in the case of the known conventional electrolytic erosion preventing insulated rolling bearing, which is disclosed in the aforementioned Patent Documents 1 to 3, it is found by research by the present inventor that under harsh working conditions, such as the case where the insulating coating 6 (refer to FIG. 34) is thinned in order to reduce cost, there is room for improvement from the aspect of preventing electrolytic erosion. For example, in the case of the conventional construction disclosed in Patent Documents 1 and 2, a continuous portion 22 of the axial end faces of the outer ring 3 (refer to FIG. 34), being a coated bearing ring, and the inner peripheral surface of the outer ring 3, being a raceway side peripheral surface, intersect as shown in FIG. 41 in detail. That is, the continuous portion 22 is a vertex with an angle of 90 degrees. However, in the case of the conventional construction disclosed in Patent Document 3, as shown in FIG. 42, a partial cone indented chamfer 23, which is inclined at 45 degrees with respect to the central axis of the outer ring 3, is formed at the continuous portion of the inner peripheral surface and the axial end face of the outer ring 3. The continuous portion 22a between the outer peripheral rim of the chamfer 23 and the axial end face is a vertex with an angle of 135 degrees.

As described above, either in the construction shown in FIG. 41, or in the construction shown in FIG. 42, the continuous portions 22 and 22a are vertices. In the case where current flows between the outer ring 3 and a housing 15b (refer to FIG. 42), the current tends to concentrate at the continuous portions 22 and 22a. As a result, it is found by research including a range of experiments by the present inventor that there is a case in which, even in the case of a rotation support portion of a rotating shaft of an electric motor for general purposes or rail car, or a rotating shaft of an electrical generator, sparks occur between the continuous portions 22 and 22a, and the housing 15b. That is, it is found (it was not known prior) in the process of the research for understanding the influence of thinning the insulating coating by the present inventor, that sparks occur between the continuous portions 22 and 22a, and the housing 15b.

Such sparks can be prevented from occurring to a certain extent by increasing the thickness of the insulating coating 6 coating the continuous portions 22 and 22a. For example, in the case where an electrolytic erosion preventing insulated rolling bearing is used for a rotation support portion of the abovementioned electric motor or electrical generator, if the thickness exceeds 0.3 mm, sparks can be prevented to a considerable degree. Furthermore, if the thickness exceeds 0.5 mm, most of the sparks can be prevented. However, in order to increase the thickness, it is necessary to perform operations of coating the insulating coating 6 a plurality of times (multi-layer coating), causing an increase in the cost of manufacturing the electrolytic erosion preventing insulated rolling bearing, which is undesirable. Moreover, sparks can be prevented from occurring completely if the housing 15b or an outer ring spacer, which the continuous portions 22 and 22a face, is made from insulating material. However, from the aspects of strength or cost, in most of cases, it is difficult to make the housing 15b or the outer ring spacer from insulating material.

Moreover, it is common practice that on part of the surface of an inner ring 1 or an outer ring 3 constituting a rolling bearing, characters or reference symbols indicating the performance, the product number, the lot number, or the like, of the rolling bearing in which the inner ring 1 or outer ring 3 is incorporated, are inscribed. In the case of a typical rolling bearing, as shown in FIG. 43, conventionally, the characters or reference symbols (part indicated "****001" in the figure) are inscribed using a laser marker, an air marker (minute drill-like cutting tool, which is rotated by compressed air) or stamp, as disclosed in Patent Document 17 for example. Furthermore, Patent Document 18 discloses that the assembly direction of an outer ring is indicated on part of the outer ring using an inscribed line, or the like.

Even if a construction in which characters or reference symbols are inscribed on the axial end faces of the inner ring 1 or the outer ring 3 as shown in FIG. 43 is used in the electrolytic erosion preventing insulated rolling bearing as shown in FIG. 34, there is a possibility that the characters or symbols are covered, preventing them from being discriminated. Moreover, even if they can be discriminated, an edge (vertex) occurring due to marking is likely to be a start point of discharge, and in the case where discharge occurs, damage due to electrolytic erosion is produced in the rolling bearing.

[Patent Document 1] Japanese Patent Application Publication No. Hei 01-182621
[Patent Document 2] Japanese Patent Application Publication No. Hei 05-52223
[Patent Document 3] Japanese Patent Application Publication No. Hei 05-312216
[Patent Document 4] Japanese Utility Model Application Publication No. S 60-85626
[Patent Document 5] Japanese Utility Model Publication No. Hei 06-2030
[Patent Document 6] Japanese Patent Application Publication No. 2005-133876
[Patent Document 7] Japanese Patent application Publication No. 2003-183806
[Patent Document 8] Japanese Patent Publication No. 2571594
[Patent Document 9] Japanese Patent Publication No. 3009516
[Patent Document 10] Japanese Patent Application Publication No. Hei 07-279972
[Patent Document 11] Japanese Patent Publication No. 2779251
[Patent Document 12] Japanese Patent Application Publication No. 2002-48145
[Patent Document 13] Japanese Patent Application Publication No. 2002-181054
[Patent Document 14] Japanese Patent Publication No. 3475497
[Patent Document 15] Japanese Patent Publication No. 2624337
[Patent Document 16] Japanese Patent Publication No. 2617300
[Patent Document 17] Japanese Patent Application Publication No. 2005-42895 (Paragraph 0003)
[Patent Document 18] Japanese Patent Application Publication No. 2005-214348 (Paragraph 0040)

BRIEF SUMMARY OF THE INVENTION

Problems to be Solved by the Invention

The present invention has been made in consideration of the above circumstances in order to realize;

an electrolytic erosion preventing insulated rolling bearing, which can ensure high levels of insulation performance, durability, and low cost, at the same time, and also can have an excellent external appearance, and a manufacturing method thereof, furthermore, a construction in which, in the case where the rolling bearing is incorporated in a rotation support portion, it is possible to prevent discharge phenomena from occurring between fitting grooves and a mating component into which a bearing ring in which the fitting grooves are formed is fitted, and that in the case where a conductive elastic material is used, or a metal shield plate is used, as a seal ring, it is possible to prevent electrolytic erosion from occurring in the rolling contact parts between each raceway surface and each rolling element, which are important parts, by arranging such that current does not flow between the seal rings or shield plates and a bearing ring, or the two bearing rings, moreover, a construction in which, even in the case where a ceramic insulating coating is formed on the outer ring of a large-sized rolling bearing, sufficient insulation performance of the insulating coating can be ensured, furthermore, a construction in which a ceramic insulating coating is formed on part of the surface of a bearing ring, which makes contact with a metal mating component, that is cheap and has high impedance (insulation resistance value), moreover, a low cost electrolytic erosion preventing insulated rolling bearing, which can prevent electrolytic erosion sufficiently effectively even in the case of harsh working conditions, and furthermore, an electrolytic erosion preventing insulated rolling bearing in which the electrolytic erosion prevention performance does not drop regardless of the marking of characters or reference symbols indicating property or history information.

Means for Solving the Problems

As shown in FIG. 1 for example, an electrolytic erosion preventing insulated rolling bearing comprises a pair of metal bearing rings (inner ring 1 and outer ring 3 for example), which are placed concentrically with each other, and a plurality of metal rolling elements (for example balls) 5 provided between a pair of raceway surfaces (inner ring raceway 2 and outer ring raceway 4 for example) formed on the facing surfaces of the two bearing rings 1 and 3 such that they can roll freely. A ceramic insulating coating 6 is coated on the surfaces other than the surface on which a raceway surface is provided, of at least one bearing ring of the two bearing rings 1 and 3, that is, in the case of a radial rolling bearing as shown in FIG. 1(A) or (B), either one of the peripheral surfaces and the two axial end faces, and in the case of a thrust rolling bearing, either one of the axial sides and the inner and outer peripheral surfaces.

In particular, in an electrolytic erosion preventing insulated rolling bearing of the first aspect, the ceramic forming the insulating coating 6 contains alumina ($Al_2O_3$) at 99 percent by weight or more. Furthermore, the insulating coating 6 is formed by grinding the surface of a ceramic sprayed layer formed on the surfaces other than those on which the two raceways 2 and 4 are formed. Moreover, the thickness of the ceramic sprayed layer is 0.4 mm or less, except on continuous folded over portions between adjacent surfaces, and the thickness of the insulating coating obtained by grinding the ceramic sprayed layer is 0.25 mm or more.

Furthermore, it is preferable that the insulating coating is formed from an alumina sprayed layer containing titanium oxide ($TiO_2$) at 0.01 to 0.2 percent by weight (the main components other than titanium oxide is alumina).

Moreover, it is preferable that the insulating coating 6 is formed from a ceramic sprayed layer containing alumina ($Al_2O_3$) at 97 percent by weight or more and zirconia ($ZrO_2$) at 0.5 to 2.5 percent by weight.

In the case that the insulating coating 6 is formed from a ceramic sprayed layer, it is preferable that the insulating coating 6 is formed by grinding the surface of the ceramic sprayed layer which is formed on the surfaces other than those of the raceways. In this case, the thickness of the ceramic sprayed layer is 0.4 mm or less, except on the continuous folded over portions between adjacent surfaces, and the thickness of the insulating coating obtained by grinding the ceramic sprayed layer is 0.25 mm or more.

Furthermore, as a method of controlling the thickness of the insulating coating, the following method is known, for example. That is, a ceramic sprayed layer which contains alumina at 97 percent by weight or more and zirconia at 0.5 to 2.5 percent by weight, is formed on the surfaces other than those on which the raceway surfaces are provided, wherein the thickness on the parts other than the continuous folded over portions between adjacent surfaces is limited to 0.4 mm or less. Afterwards, by grinding the parts of the ceramic sprayed layer except the parts coating the folded over portions, an insulating coating of 0.25 mm or more in thickness is produced.

Moreover, an electrolytic erosion preventing insulated rolling bearing according to another aspect has a pair of bearing rings, a plurality of rolling elements, and a sealing device.

Here, the bearing rings are placed concentrically with each other, and they are made from metal.

Furthermore, the rolling elements are made from metal, and are provided between the pair of raceway surfaces on the facing surfaces of the two bearing rings such that they can roll freely.

Moreover, the sealing devices are fitted in fitting grooves formed in the surfaces at the two ends of part of one of the two bearing rings on which a raceway surface is formed, and isolate the place where the rolling elements are installed from the outside.

A film with insulating characteristics is coated on the surfaces other than those on which the raceway surface is provided, of at least one of the two bearing rings.

In particular, in this electrolytic erosion preventing insulated rolling bearing, a film with insulating characteristics is also coated on the two fitting grooves formed in the one bearing ring.

The construction described above can be preferably applied to the case where the sealing device is a seal ring comprising a conductive elastic material, or a metal shield plate.

Moreover, it is preferable that the film with insulating characteristics is a ceramic insulating coating, or an insulating coating made from a synthetic resin such as PPS (polyphenylene sulfide).

Here, for an insulating coating made from ceramic, it is preferable to use one in which the ceramic constituting the insulating coating contains alumina ($Al_2O_3$) at 99 percent by weight or more. In this case, of the above-described insulating coating, the insulating coating formed on the surfaces of the bearing ring other than the surface on which the raceway surface is provided is formed by grinding the surface of the ceramic sprayed layer. Furthermore, the thickness of the ceramic sprayed layer, except on continuous folded over portions between adjacent surfaces, is 0.4 mm or less, and the thickness of the insulating coating obtained by grinding the ceramic sprayed layer is 0.25 mm or more.

Moreover, in the case where the coating with insulating characteristics is an insulating coating made from a ceramic, the insulating coating may be a sprayed layer of alumina containing either titanium oxide ($TiO_2$), or zirconia ($ZrO_2$).

In the case where titanium oxide is contained to the sprayed layer of alumina, the content of alumina is 99 percent by weight or more, and the content of titanium oxide is 0.01 to 0.2 percent by weight.

Furthermore, in the case where zirconia is contained to the sprayed layer of alumina, the content of alumina is 97 percent by weight or more, and the content of zirconia is 0.5 to 2.5 percent by weight.

In the case of a ceramic sprayed layer having such a composition, when it is formed on the surfaces of the bearing ring other than the surface on which the raceway surface is provided, it is also preferable to form it by grinding the surface of the ceramic sprayed layer. Moreover, in this case also, it is preferable that the thickness of the ceramic sprayed layer, except on the continuous folded over portions between adjacent surfaces, is 0.4 mm or less, and the thickness of the insulating coating obtained by grinding the ceramic sprayed layer is 0.25 mm or more.

In the case where an insulating coating is made from a ceramic sprayed layer are implemented, it is preferable to use alumina of particle size 10 to 50 µm, and average particle size 15 to 25 µm, with a purpose of improving the accuracy related to the thickness dimension of the ceramic sprayed layer, being the insulating coating, and the deposition efficiency of the alumina constituting the ceramic sprayed layer.

On the other hand, in the case where a film with insulating characteristics that coats the surfaces of the bearing ring other than those on which the raceway surfaces are provided, and the two fitting grooves, is an insulating coating made from synthetic resin, examples that can be given for the synthetic resin, other than the aforementioned PPS, are an aromatic polyamide resin, an aliphatic polyamide resin, or the like.

Furthermore, it is also possible to mix fibrous material with the synthetic resin in order to improve the strength of the insulating coating. Examples that can be given for the fibrous material are glass fiber, ceramic fiber, rock wool, slag fiber, and the like.

Moreover, it is also possible to mix elastic material with the synthetic resin in order to improve the shock resistance of the insulating coating. Examples that can be given for the elastic material are ethylene propylene diene terpolymer (EPDM), acrylonitrile-butadiene rubber (NBR), styrene-butadiene rubber (SBR), and the like.

Furthermore, it is also possible to add filling material to the synthetic resin in order to improve the insulation performance of the insulating coating. Examples that can be given for the filling material are powder, fibers, and whiskers of silicon carbide (SiC), aluminum nitride (AlN), beryllia (BeO), boron nitride (BN), alumina ($Al_2O_3$), or the like.

Moreover, in a manufacturing method of an electrolytic erosion preventing insulated rolling bearing, a ceramic sprayed layer which contains alumina at 99 percent by weight or more, is formed on the surfaces other than those on which the raceway surfaces are provided, wherein the thickness on parts other than continuous folded over portions between adjacent surfaces is limited to 0.4 mm or less. Afterwards, by grinding the parts of the ceramic sprayed layer except the parts coating the folded over portions, the insulating coating of 0.25 mm or more in thickness is produced.

An electrolytic erosion preventing insulated rolling bearing of yet another aspect comprises; an outer ring, an inner ring, and a plurality of rolling elements, each of which is made from metal.

The outer ring thereof has an outer ring raceway formed on its inner peripheral surface.

Furthermore, the inner ring is placed medially in the outer ring, and has an inner ring raceway formed on its outer peripheral surface.

Moreover, the rolling elements are provided between the outer ring raceway and the inner ring raceway such that they can roll freely.

In particular, in this electrolytic erosion preventing insulated rolling bearing, a ceramic insulating coating with alumina ($Al_2O_3$) as its main component is formed on at least the outer peripheral surface, of the surfaces other than the outer ring raceway, of the outer ring. Furthermore, an insulation resistance value of the insulating coating is 1000 MΩ or more, and a capacitance of the same is 27 nF or less.

Moreover, in order to regulate the insulation resistance value and capacitance of the insulating coating as described above, the insulating coating is an insulating coating in which the content of alumina is 99 percent by weight or more and titanium oxide (titania, $TiO_2$) is contained at 0.01 to 0.2 percent by weight, and the film thickness is 0.1 to 0.7 mm.

Alternatively, the insulating coating may be an insulating coating in which the content of alumina is 97 percent by weight or more and zirconia ($ZrO_2$) is contained at 0.1 to 2.5 percent by weight, and the film thickness is 0.1 to 0.7 mm.

In the case where each of these embodiments is implemented, and the insulating coating is formed by plasma spraying, it is preferable that at least the outer ring of the two bearing rings constituting the rolling bearing is one that has had a high temperature dimension stabilizing treatment applied or is one that is made from a high temperature dimensionally stabilized material. An example that can be given for a high temperature dimension stabilizing treatment thereof is a treatment in which high temperature tempering, or double tempering, is applied to make the retained austenite amount 2 percent by volume or less as described in Patent Document 14 for example. Furthermore, examples that can be given for the high temperature dimensionally stabilized material are AISI M50 and M50NIL, being high-speed steels for high temperature bearings, or as described in Patent Document 15, a material that has higher contents of Si and Cu than normal bearing steel (SUJ2, SUJ3, etc.), and that has a retained austenite amount of 3 percent by volume or less.

Moreover, it is preferable that each of these embodiments is applied to a construction in which an insulating coating consists of only one layer formed directly on the surface of the outer ring, and the outer diameter of the rolling bearing is 200 mm or more.

Furthermore, a bearing device of the present invention comprises; a rolling bearing, and a metal mating component that is fitted outside the rolling bearing.

The rolling bearing thereof comprises an outer ring and an inner ring, and a plurality of rolling elements, each of which is made from metal.

The outer ring thereof has an outer ring raceway formed on its inner peripheral surface.

Moreover, the inner ring is placed medially in the outer ring, and has an inner ring raceway formed on its outer peripheral surface.

Furthermore, the rolling elements are provided between the outer ring raceway and the inner ring raceway such that they can roll freely.

The inner ring is fitted together with the mating component by an interference fit.

In particular, in this bearing device described, a ceramic insulating coating with alumina ($Al_2O_3$) as its main component is formed on at least the inner peripheral surface, of the surfaces other than the inner ring raceway, of the inner ring. Furthermore, the interference between the inner ring and the mating component is regulated such that the insulating coating is not damaged. The inner ring contains an insulating coating that coats the inner peripheral surface, and the interference between the inner ring and the mating component (for example, a shaft) is the interference between the insulating coating that coats the inner peripheral surface of the inner ring, and the mating component.

Moreover, in order to prevent the insulating coating from being damaged during use, it is preferable to control the interference between the inner ring and the mating component such that a hoop stress (stress in the circumferential direction) acting on the insulating coating that coats the inner peripheral surface of the inner ring is 200 $N/mm^2$ or less even during use. That is, the inner ring and the mating component sometimes expand thermally during use. However, even in this case, the interference is determined such that the hoop stress acting on the insulating coating does not exceed 200 $N/mm^2$ Needless to say, even during fitting (in a state before the temperature increases), it is arranged such that the hoop stress acting on the insulating coating does not exceed 200 $N/mm^2$ Furthermore, in the case where these bearing devices are implemented, it is preferable that an insulation resistance value of the insulating coating is 1000 MΩ or more, and a capacitance is 27 nF or less.

Moreover, in order to regulate the insulation resistance value and capacitance of the insulating coating as described above, the insulating coating is an insulating coating in which the content of alumina is 99 percent by weight or more and titanium oxide (titania, $TiO_2$) is contained at 0.01 to 0.2 percent by weight, and the film thickness is 0.1 to 0.7 mm.

Alternatively, the insulating coating may be an insulating coating in which the content of alumina is 97 percent by weight or more and zirconia ($ZrO_2$) is contained at 0.1 to 2.5 percent by weight, and the film thickness is 0.1 to 0.7 mm.

In the case where each of these bearing devices is implemented, and the insulating coating is formed by plasma spraying, it is preferable that at least the inner ring of the two bearing rings constituting the rolling bearing is one that has had a high temperature dimension stabilizing treatment applied or is one that is made from a high temperature dimensionally stabilized material. An example that can be given for a high temperature dimension stabilizing treatment thereof is a treatment in which high temperature tempering, or double tempering, is applied to make the retained austenite amount 2 percent by volume or less as described in Patent Document 14 for example. Furthermore, examples that can be given for the high temperature dimensionally stabilized material are AISI M50 and M50NIL, being high-speed steels for high temperature bearings, or as described in Patent Document 15, a material that has higher contents of Si and Cu than normal bearing steel (SUJ2, SUJ3, etc.), and that has a retained austenite amount of to 3 percent by volume or less.

Furthermore, it is preferable that the present invention is applied to a construction in which a sum of the surface areas of the outer peripheral surface of the outer ring and the two end faces is greater than or equal to 1.3 times the sum of the surface areas of the inner peripheral surface of the inner ring and the two end faces. Moreover, it is more preferable that it is applied to a construction in which the insulating coating consists of one layer formed directly on the surface of the inner ring, and an inner diameter of the rolling bearing is 100 mm or more.

It is further preferable that the bearing device of the present invention is incorporated in a rotation support portion of an inverter controlled electric motor or electrical generator. In this case, the inner ring of a rolling bearing is fitted securely on the outside of the rotating shaft of an electrical generator or the like, for example, on the outer peripheral surface of which a rotor is installed.

Furthermore, an electrolytic erosion preventing insulated rolling bearing of yet another aspect comprises a pair of metal bearing rings which are placed concentrically with each other, and a plurality of metal rolling elements provided between the pair of raceway surfaces formed on the facing surfaces of the two bearing rings such that they can roll freely.

A ceramic insulating coating is coated on the surfaces other than a raceway side peripheral surface on which a raceway surface is provided, of at least one bearing ring of the two bearing rings.

In particular, in this electrolytic erosion preventing insulated rolling bearing, in relation to one coated bearing ring, being the bearing ring that is provided with the insulating coating, an indented part which is indented in the axial direction away from the axial end face, is provided around the whole circumference in a part drawn towards the raceway side peripheral surface at a part in the radial direction, of the axial end face. Moreover, the insulating coating is coated continuously from the axial end face to the indented part. Furthermore, a continuous portion between the axial end face and the indented part is a shape which is not a vertex with an apex angle of 135 degrees or less.

In the case where this electrolytic erosion preventing insulated rolling bearing is implemented, for example, the indented part is a partial cone concave shape, whose generatrix shape is a straight line. The continuous portion between the indented part and the axial end face is a partial circle shape convex surface whose cross-section has a curve radius of 1 mm or more.

Alternatively, the indented part is a plurality of joined partial cone indented surfaces, whose angles of inclination with respect to the central axis of the coated bearing ring are different, and the generatrix shapes of which are straight lines. Intersect angles between the adjacent partial cone indented surfaces, and apex angles of the continuous portions between one of the partial cone indented surfaces and the axial end face are 150 degrees or more.

Alternatively, the indented part is a single partial cone concave shape, whose generatrix shape is a straight line. An apex angle of the continuous portion between the indented part and the axial end face is 150 degree or more.

Alternatively, the indented part is a convex surface, whose generatrix shape is a partial circle. A generatrix of the axial end face is located tangentially to the generatrix of the indented part.

Furthermore, in the case where this electrolytic erosion preventing insulated rolling bearing is implemented, it is preferable that, of the two rims of the indented part in the radial direction, the rim drawn towards the raceway side peripheral surface (the surface of the insulating coating that coats it) is located 1 mm or more axially inside from the axial end face of the coated bearing ring (the surface of the insulating coating that coats it, or the surface of the housing, which is a mating surface facing the axial end face).

Moreover, an electrolytic erosion preventing insulated rolling bearing of yet another aspect comprises a metal outer ring having an outer ring raceway on its inner peripheral surface, a metal inner ring having an inner ring raceway on its outer peripheral surface, and placed on the inner diameter side of the outer ring concentrically with the outer ring, and a plurality of metal rolling elements provided between the inner ring raceway and the outer ring raceway such that they can roll freely.

Furthermore, in the case of this electrolytic erosion preventing insulated rolling bearing, at least one of the outer ring and the inner ring is a coated bearing ring, and an insulating coating is coated on the surfaces of the coated bearing ring other than the raceway side peripheral surface on which a raceway surface is provided, being the outer ring raceway or the inner ring raceway.

In particular, in this electrolytic erosion preventing insulated rolling bearing, characters or reference symbols indicating property or history information of the rolling bearing containing the coated bearing ring having the raceway side peripheral surface concerned, are marked on part of the raceway side peripheral surface, which is away from the raceway surface.

In the case where this electrolytic erosion preventing insulated rolling bearing is implemented, for example, it is provided with a cage for retaining the rolling elements. The characters or reference symbols are marked on a part that is covered by the cage.

Moreover, in the case where this electrolytic erosion preventing insulated rolling bearing is implemented, it is preferable that, in relation to the coated bearing ring, an indented part which is indented in the axial direction away from the axial end face, is provided around the whole circumference in a part drawn towards a peripheral surface in which the raceway surface is provided, at a part in the radial direction, of the axial end face. Moreover, the insulating coating is coated continuously from the axial end face to the indented part.

In the case where this electrolytic erosion preventing insulated rolling bearing is implemented, it is further preferable that, the continuous portion between the axial end face and the indented parts is not a vertex with an apex angle of 135 degrees or less. To be specific, the apex angle is an angle of 135 degrees or more (for example, 150 degrees or more), or the continuous portion is a convex surface whose cross-section is a circular arc. Furthermore, of the two rims of the indented part in the radial direction, the rim drawn towards the peripheral surface on which the raceway surface is provided is located 1 mm or more axially inside from the axial end face.

Moreover, in the case of the electrolytic erosion preventing insulated rolling bearing of yet another aspect, a bearing ring of only one of the outer ring and the inner ring is a coated bearing ring. Of the surfaces of the coated bearing ring, an insulating coating is coated on the surfaces other than the raceway side peripheral surface on which the raceway surface, being the outer ring raceway or the inner ring raceway, is provided. Conversely, the other bearing ring of the outer ring and the inner ring is an exposed bearing ring, none of the surfaces of which is coated with an insulating coating.

In particular, in this electrolytic erosion preventing insulated rolling bearing, characters or reference symbols indicating property or history information of the rolling bearing that contains the exposed bearing ring are marked on part of the surface of the exposed bearing ring, which is a part other than the raceway surface formed on the peripheral surface of the exposed bearing ring.

In the case where this electrolytic erosion preventing insulated rolling bearing is implemented, it is preferable that second characters or reference symbols corresponding to the characters or reference symbols marked on the surface of the exposed bearing ring, are marked on part of the peripheral surface of the coated bearing ring on which the raceway surface is provided, away from the raceway surface. In the case where this electrolytic erosion preventing insulated rolling bearings is implemented, it is also possible to use the construction in which a cage is provided, an indented part is formed, and the continuous portion between the axial end surface and the indented part is not a vertex with an apex angle.

Effects of the Invention

According to the electrolytic erosion preventing insulated rolling bearing, and the manufacturing method thereof, of the present invention, it is possible to ensure high levels of insulation performance, durability, and low cost, at the same time.

That is, a ceramic sprayed layer that contains alumina at 99 percent by weight or more is used, but such a ceramic sprayed layer has a comparatively high electrical resistivity (excellent insulating characteristics). Accordingly, if it is ensured that the thickness of the insulating coating after grinding is 0.25 mm or more, provided that the application is for rotation support portion of a rotating shaft of an electric motor for general use or for rail car, or for a rotation support portion of a rotating shaft for an electrical generator, or furthermore for a rotation support portion of a general purpose motor for general industry or the like, a sufficient electrolytic erosion prevention effect can be ensured.

Moreover, in the case where the insulating coating 6 is formed by grinding the surfaces of a ceramic sprayed layer formed on the surfaces other than the raceway surface, the thickness of the ceramic sprayed layer is 0.4 mm or less except on the continuous folded over portions between adjacent surfaces, and the thickness of the insulating coating obtained by grinding the ceramic sprayed layer is 0.25 mm or more, it is possible to ensure high levels of insulation performance, durability, and low cost, at the same time.

That is, in the case of the construction described in the third aspect, a ceramic sprayed layer which contains alumina at greater than or equal to 97 percent by weight and zirconia at greater than or equal to 0.5 to 2.5 percent by weight, is used. However, such a ceramic sprayed layer has a comparatively high electrical resistivity (excellent insulating characteristics). Therefore, if it is ensured that the thickness of the insulating coating after grinding is greater than or equal to 0.25 mm, provided that the application is for a rotating shaft of an electric motor for general use or for railroad rocking stock, or for a rotation support portion of a rotating shaft for an electrical generator, a sufficient electrolytic erosion prevention effect can be ensured.

Furthermore, in the first, third, sixth and eleventh aspects of the invention, in order to ensure that the thickness of the insulating coating after grinding is greater than or equal to 0.25 mm, even if the thickness of the ceramic sprayed layer before grinding is less than or equal to 0.4 mm, a sufficient grinding allowance can be ensured. If the thickness of the ceramic sprayed layer can be limited to less than or equal to 0.4 mm, the thickness of the ceramic sprayed layer coating the two continuous folded over portions between adjacent surfaces can be limited to less than 0.5 mm (furthermore less than or equal to 0.48 mm). If the thickness of the ceramic sprayed layer is approximately 0.5 mm (furthermore 0.48 mm), the thickness dimension is not excessive, so it is difficult for damage such as cracks, chips or the like to occur even if it is left as it is (even if the thickness dimension is not reduced by grinding). Accordingly, the time and effort for grinding parts of the ceramic sprayed layer which coat the continuous folded over portions, are eliminated and hence the cost can be reduced. Moreover, cost reduction can also be achieved by keeping the thickness of the ceramic sprayed layer thinner {formerly greater than or equal to 0.5 mm (typically about 0.6 to 0.7 mm) to less than or equal to 0.4 mm}.

Furthermore, according to the electrolytic erosion preventing insulated rolling bearing of the second, third, seventh and eighth aspects of the invention, by incorporating either one of titanium oxide and zirconia in an alumina sprayed layer, it is possible to ensure high levels of insulation performance, durability, low cost, and excellent external appearance at the same time.

In particular, if the content of alumina is 99 percent by weight or more, and the titanium oxide contained in the alumina sprayed layer is 0.01 to 0.2 percent by weight, or the content of alumina is 97 percent by weight or more, and the content of zirconia contained in the alumina sprayed layer is 0.5 to 2.5 percent by weight, it is easier to ensure an excellent external appearance. That is, for a ceramic sprayed layer with alumina as its main component, in the case of white alumina which does not contain titanium oxide or the like, the insulation performance is excellent, but the external appearance deteriorates when it is sealed with synthetic resin. Conversely, since titanium oxide of 0.01 percent by weight or more is incorporated, such irregular coloring that leads to deterioration of the external appearance does not occur even if sealing with synthetic resin is applied. That is, when a ceramic sprayed layer is sealed with a synthetic resin to cover minute voids inside it, part of the synthetic resin appears on the surface of the ceramic sprayed layer. In the case of white alumina, whose surface color is close to pure-white, irregular coloring occurs due to the synthetic resin that appears on the surface in this manner, which degrades the external appearance of the product. However, in the case of incorporating gray alumina containing titanium oxide at 0.01 percent by weight or more, or of incorporating zirconia at 0.5 percent by weight or more, since the color of the surface has a gray appearance (ash color), if a synthetic resin with an appropriate color (ash color family) is used for the sealing, irregular coloring that degrades the external appearance of the produce does not occur on the surface.

However, if titanium oxide is contained at over 0.2 percent by weight, or zirconia at over 2.5 percent by weight, the thickness of the ceramic sprayed layer required to ensure the necessary insulation performance increases. Therefore, the content of the titanium oxide is limited to 0.01 to 0.2 percent by weight, or the content of the zirconia is limited to within 0.5 to 2.5 percent by weight.

By limiting the content of the titanium oxide in the ceramic sprayed layer to 0.2 percent by weight or less, or the content of the zirconia to 2.5 percent by weight or less, the yield of the material (alumina grains) when forming a sprayed layer deteriorates slightly. However, if alumina of particle sizes 10 to 50 µm, and average particle size 15 to 25 µm, is used, the deposition efficiency of alumina forming the ceramic sprayed layer is improved, and at the same time the accuracy related to the thickness dimension of the ceramic sprayed layer is improved, thus enabling the increase in cost to be kept down. That is, a reduction in the material cost due to the improvement of the deposition efficiency, and simplification of finishing (shortening of finishing time) due to the improvement of the dimensional accuracy, enable the cost of manufacturing an electrolytic erosion preventing insulated rolling bearing to be inexpensive.

Furthermore, in the case where zirconia having high strength and high toughness is incorporated in the alumina sprayed layer, the adhesion of the alumina sprayed layer can be improved. As a result, sufficient durability can be ensured.

Moreover, according to the electrolytic erosion preventing insulated rolling bearing of the present invention, in the case where the rolling bearing is installed in a rotation support portion, discharge phenomena can be prevented from occurring between the fitting grooves and a mating component into which the bearing ring in which the fitting grooves are formed is fitted. That is, since the insulating coating covers the fitting grooves, even if the distance between the surface of a fitting groove and the surface of the mating component is short, discharge phenomena can be prevented from occurring between the surfaces.

Furthermore, even in the case where a seal ring to be fitted in the fitting groove is a seal ring containing a conductive elastic material, for example having carbon black added, or even in the case where a metal shield plate is used, current can be prevented from flowing through the seal ring or the shield plate. Moreover, even if discharge phenomena occur between the surface of the mating component and the seal ring or the shield ring, current does not flow to the bearing ring side.

Accordingly, electrolytic erosion can be prevented from occurring at least between the two bearing rings and the rolling elements.

On the other hand, in the case where the coating with insulating characteristics is an insulating coating made from synthetic resin, and a fibrous material as described previously is mixed in the insulating coating, the strength of the insulating coating is ensured, thus enabling the creep resistance to be improved. Furthermore, in the case where an elastic material as mentioned previously is mixed in the insulating coating, the impact resistance can be improved. Moreover, in the case where a filling material as mentioned previously is mixed in the insulating coating, the insulation performance can be improved, and also the heat transfer properties can be improved, thus enabling the increase in temperature of the rolling bearing to be controlled.

Furthermore, according to the electrolytic erosion preventing insulated rolling bearing of the present invention, even in the case where a ceramic insulating coating is formed on the outer ring of a large sized rolling bearing, sufficient insulation performance of the insulating coating can be ensured.

That is, by selecting the material and film thickness of the ceramic insulating coating with alumina as its main component such that the insulation resistance value of the insulating coating is 1000 MΩ or more, and the capacitance of the same is 27 nF or less, even in the case where the insulating coating is formed on the outer ring of a large sized rolling bearing, which has a large surface area, a rolling bearing with high impedance can be achieved. According to a range of data such as experimental data obtained by the inventor, if the capacitance exceeds 27 nF, sometimes sufficient impedance (insulation resistance value) cannot be obtained. Therefore, by making the capacitance of the insulating coating 27 nF or less, preferably 25 nF or less, or more preferably 23 nF or less, sufficient insulation performance of the insulating coating can be ensured.

Moreover, according to the bearing device of the present invention, using a construction in which the ceramic insulating coating is formed on the bearing ring, it is possible to realize an inexpensive construction with high impedance (insulation resistance value).

That is, since the insulating coating is formed on the inner ring side, it is possible to make the area on which the coating is formed small. As a result, the capacitance of the insulating coating can be made low, and the impedance can be made high. Furthermore, since the film thickness does not need to be made large in order to reduce the capacitance, the manufacturing cost can be reduced. In the case of a construction where the inner ring is fitted into the mating component by an interference fit, there is a possibility that damage such as cracks occurs in the brittle ceramic insulating coating. However, if the interference between the inner ring and the mating component is controlled such that the insulating coating is not damaged during use, such a problem does not occur. In particular, if the interference between the inner ring and the mating component is controlled such that the hoop stress acting on the insulating coating, which coats the inner peripheral surface of the inner ring, is 200 N/mm$^2$ or less even during use, it is possible to prevent damage such as cracks from occurring on the insulating coating, effectively.

Moreover, if the insulating coating is formed as an insulating coating in which the content of alumina is 99 percent by weight or more and titanium oxide is contained at 0.01 to 0.2 percent by weight, and the film thickness is between 0.1 and 0.7 mm, it is possible to obtain an inexpensive insulating coating having high impedance as described above. That is, the higher the purity of the alumina, the higher the impedance can be. However, increasing the purity of the alumina leads to an increase in the manufacturing cost. In response, if the content of titania incorporated unavoidably is limited to within 0.01 to 0.2 percent by weight, an insulating coating with high impedance can be obtained while minimizing the increase in cost. Furthermore, in the case where the thickness of the insulating coating is made thinner than 0.1 mm, the insulation resistance worsens, and even if it is made thicker than 0.7 mm, an improvement of the insulation performance proportionate to the increase in the cost cannot be expected. Accordingly, in order to ensure the insulation resistance, and also limit the increase in manufacturing cost, the thickness of the insulating coating should be 0.1 to 0.7 mm, and preferably, 0.2 to 0.5 mm.

Moreover, if the insulating coating is formed by an insulating coating in which the content of alumina is 97 percent by weight or more and zirconia is contained at 0.1 to 2.5 percent by weight, the purity of alumina is increased, thus enabling the impedance to be increased, and also the bond strength of the insulating coating to the metal surface can be improved. That is, in the case where the content of zirconia of high strength and high toughness is less than 0.1 percent by weight, the bond strength cannot be improved sufficiently. On the other hand, in the case where the content of zirconia is greater than 2.5 percent by weight, the purity of the alumina becomes too low, leading to a drop in the impedance. In the case where zirconia is incorporated as described above also, similarly to the case where titania is incorporated, if the thickness of the insulating coating is 0.1 to 0.7 mm, and preferably 0.2 to 0.5 mm, a balance can be found between ensuring the insulation resistance and controlling manufacturing costs.

Furthermore, in the case where the insulating coating is formed by plasma spraying, if at least the outer ring of the two bearing rings constituting the rolling bearing is one that has had a high temperature dimension stabilizing treatment applied or one that is made from a high temperature dimensionally stabilized material, the dimensional accuracy of the outer ring can be ensured. That is, by applying a high temperature dimension stabilizing treatment, even in the case where a high localized temperature is reached due to plasma spraying, the dimensional accuracy of the outer ring can be maintained.

Moreover, if the present invention is applied to a construction in which the outer diameter of a rolling bearing (outer ring constituting it) is 200 mm or more, the effects of the invention can be obtained more conspicuously. That is, since a rolling bearing whose diameter is 200 mm or more has a significantly large outer ring surface area, even if the insulating coating is formed without consideration of the size of the surface area, there is a possibility that sufficient insulation performance cannot be ensured. Conversely, in the present invention, by controlling the capacitance of the insulating coating, even if the surface area is large, the impedance is increased reliably, thus enabling sufficient insulation performance to be ensured.

Furthermore, since the insulating coating is only one layer, compared with the construction described in Patent Documents 12 and 13, the manufacturing cost can be reduced. Moreover, as described previously, if an insulating coating incorporating zirconia is used, the adhesion between the insulating coating and the outer ring is increased, so that even if a metal layer is not provided, the insulating coating can be prevented from peeling off.

Moreover, in the case where the insulating coating is formed by plasma spraying, if a high temperature dimension stabilizing treatment is applied to at least the inner ring of the two bearing rings constituting a rolling bearing, or high temperature dimensionally stabilized material is used, the dimensional accuracy of the inner ring can be ensured. That is, by applying the above-mentioned high temperature dimension stabilizing treatment, or by using high temperature dimensionally stabilized material, even in the case where a high localized temperature is reached due to the high temperature plasma sprayed gas, the dimensional accuracy of the inner ring can be maintained.

Furthermore, if the present invention is applied to a construction in which the sum of the surface areas of the outer peripheral surface and the two end faces of the outer ring is greater than or equal to 1.3 times the sum of the surface areas of the inner peripheral surface and the two end faces of the inner ring, the effects of the invention can be obtained more conspicuously. That is, if there is a large difference in surface area between the outer ring and the inner ring, in the case where the insulating coating is formed on the inner ring side, compared with the case where an insulating coating of the same thickness is formed on the outer ring side, the capacitance can be reduced by a greater proportion. Furthermore, higher impedance can be achieved, and also the cost reduction effect is increased.

Moreover, if the present invention is applied to a construction in which the inner diameter of the rolling bearing (inner ring constituting it) is 100 mm or more, good levels of high impedance and cost reduction can be achieved at the same time. In the case of a large sized bearing in which the inner diameter exceeds 100 mm, diameter series numbers 3, 2 & 0 are commonly used. In the case of a rolling bearing of such diameter series numbers 3, 2 or 0, the surface area of the outer ring is larger than the surface area of the inner ring by 30 percent or more. Furthermore, in the case of a rolling bearing whose inner diameter is 100 mm or more, it is easy to spray the inner peripheral surface, and the work efficiency is excellent, so low cost can be achieved. Moreover, since the insulating coating is only one layer, compared with the constructions described in Patent Documents 12 and 13, the manufacturing cost can be reduced. Furthermore, as described previously, if an insulating coating incorporating zirconia is used, the adhesion between the insulating coating and the inner ring is increased, so that even if a metal layer is not provided, the insulating coating can be prevented from peeling off.

If an electrolytic erosion preventing insulated rolling bearing of the present invention, or the bearing device of the present invention, is incorporated in the rotation support portion of an inverter controlled electric motor or electrical generator, the effects of the invention can be obtained more effectively. That is, as described earlier, since an inverter controlled electric motor or the like tends to increase the carrier frequency of the inverter, the current flowing to the rolling bearing has a high frequency. Therefore, the insulating coating is required to have high impedance (high insulation resistance value). Conversely, in the case of each of the invention, as described above, since high impedance can be realized, they are suitable for inverter controlled electric motors and the like.

Moreover, in the case of the electrolytic erosion preventing insulated rolling bearing of the present invention, even in the case where current flows between the coated bearing ring and the mating component that makes contact with the coated bearing ring, the concentration of current at the continuous portion between the axial end face and the indented part of the coated bearing ring is limited (excessive current does not concentrate at a vertex). Therefore, a voltage that is applied to an electrolytic erosion preventing insulated rolling bearing installed in a rotation support portion of a rotating shaft of an electric motor for general purposes, or for rail car, or a rotating shaft of an electrical generator, would be unlikely to produce sparking between the continuous portion and the mating component. As a result, it is possible to ensure sufficient durability of the electrolytic erosion preventing insulated rolling bearing.

Furthermore, in the present invention, concentration of current at the continuous portion between the axial end face and the indented part of the coated bearing ring is limited so that the durability of the electrolytic erosion preventing insulated roller bearing can be prevented from being reduced due to sparking occurring.

Moreover, in the case of the electrolytic erosion preventing insulated rolling bearing of the present invention, marking of characters or reference symbols indicating property or history information is provided without reducing the electrolytic erosion prevention capabilities. That is, since the marking is provided on part of the surface of the bearing ring that is not coated by the insulating coating, that is, a part for which insulation from its mating surface is not required, the electrolytic erosion preventing capabilities are not damaged by the existence of the marking. Therefore, the fundamental capabilities of the electrolytic erosion preventing insulated rolling bearing can be ensured, while the quality of the electrolytic erosion preventing insulated rolling bearing can be controlled effectively.

BRIEF DESCRIPTION OF THE DRAWINGS

FIG. 1 is a sectional view showing two examples of the electrolytic erosion preventing insulated rolling bearing of the present invention.

FIG. 4 shows a third example of the present invention, wherein (A) is a sectional view of half of an outer ring, and (B) is an enlarged view of section B in (A).

FIG. 6 shows a state in which the outer ring is installed in a housing, wherein (A) is a partial sectional view, and (B) is an enlarged view of section D in (A).

FIG. 15 shows an eleventh example of the same, wherein (A) is a sectional view of the whole, (B) is a side view, (C) is a sectional view of the outer ring, and (D) is a diagram of the inner ring as seen from the side of (B).

FIG. 37 shows a second example of a conventional construction in which an insulating coating is formed on an outer ring, wherein (A) is a sectional half view, and (B) is an enlarged view of section G in (A).

FIG. 38 shows the outer ring of FIG. 37 in a state in which it is installed in a housing, wherein (A) is a partial sectional view, and (B) is an enlarged view of section H in (A).

DETAILED DESCRIPTION OF THE INVENTION

First Example of the Embodiment

Figure 2:
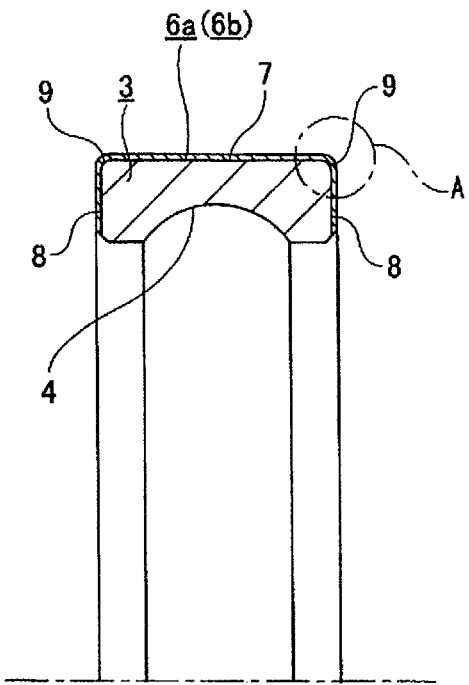
FIG. 2 is a partial sectional view showing the first and second examples of the invention.
Figure 3:
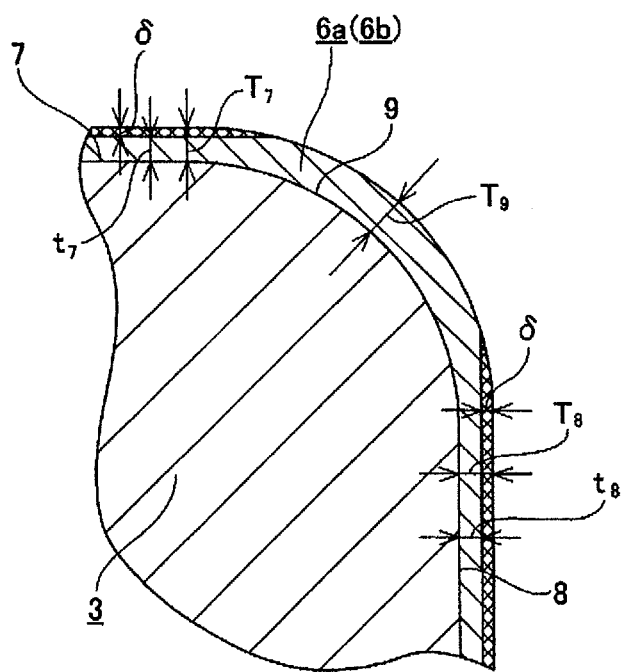
FIG. 3 is an enlarged view of section A in FIG. 2.

FIGS. 2 and 3 show a first example of an embodiment of the present invention. In the case of the present example, an insulating coating 6a is formed on the outer peripheral surface 7 and two axial end faces 8 of an outer ring 3 constituting a single row deep groove radial ball bearing. The insulating coating 6a is a ceramic sprayed layer formed by spraying ceramic droplets containing alumina at 99 percent by weight or more on the outer peripheral surface 7 and the two axial end faces 8. It is preferable that the insulating coating 6a is an alumina sprayed layer containing titanium oxide at 0.01 to 0.2 percent by weight. The insulating coating 6a, being such a ceramic sprayed layer, coats the outer peripheral surface 7, the two axial end faces 8, and also the surfaces of the quarter circle cross-section continuous folded over portions 9, which join the two axial edges of the outer peripheral surface 7, and the outer peripheral rims of the two axial end faces 8. Among the thickness dimensions T7, T8 and T9 (refer to FIG. 3) of the insulating coating 6a, which coats each of the surfaces, the thickness dimensions T7 and T8 of the parts coating the surfaces of the outer peripheral surface 7 and the two axial end faces 8 are limited to 0.4 mm or less. By limiting the thickness dimensions T7 and T8 of these parts to 0.4 mm or less, the thickness dimension T9 of the parts coating the surfaces of the two continuous folded over portions 9 is limited to 0.48 mm or less.

Furthermore, by grinding the parts of the insulating coating 6a that coat the surfaces of the outer peripheral surface 7 and the two axial end faces 8, each of the parts becomes a smooth surface, so that the surfaces 7 and 8 and the inner surface of the housing that the outer ring 3 is fitted inside, can make a close contact. Accompanying such grinding, a grinding allowance δ as shown in FIG. 3 is removed from part (cross-hatched part of FIG. 3) of the surface of the insulating coating 6a coating the surfaces 7 and 8, so that the thickness dimension of the insulating coating 6a becomes thinner than that in the state in which the ceramic sprayed layer was formed. However, the thicknesses t7 (=T7−δ) and t8 (=T8−δ) after the grinding allowance δ is removed are also maintained at 0.25 mm or more. On the other hand, parts of the insulating coating 6a, which coat the surfaces of the two continuous folded over portions 9, are not ground, and remain as they are (ceramic droplets as sprayed).

An electrolytic erosion preventing insulated rolling bearing as described above can ensure high levels of insulation performance of the insulating coating 6a, durability, and low cost, at the same time.

Firstly, the insulation performance can be ensured by using a ceramic sprayed layer to form the insulating coating 6a containing alumina at 99 percent by weight or more. That is, since a ceramic sprayed layer containing alumina at 99 percent by weight or more has a high electrical resistivity (excellent insulating characteristics), if it is ensured that the thickness of the insulating coating (in a useable state) after grinding is 0.25 mm or more, provided that the application is for a rotating support portion of the rotating shaft of an electric motor for general use or for rail car, or of a rotation shaft for an electrical generator, whose potential difference is up to about 3000 V, a sufficient electrolytic erosion prevention effect can be ensured. For example, in the case where the thickness dimension of an insulating coating after grinding is 0.3 mm, it is possible to ensure an insulation resistance of 5000 MΩ or more under the condition of 1000 V applied.

Moreover, in order to ensure that the thickness of the insulating coating 6a after grinding is 0.25 mm or more, even if the thickness of the ceramic sprayed layer before grinding is 0.4 mm or less, a sufficient grinding allowance (approximately 0.15 mm maximum) can be ensured. That is, in order to make the contact of the surface of the insulating coating 6a and the inner surface of the housing even, to stabilize the attitude of the outer ring 3 and prevent excessive force from being applied to part of the insulating coating 6a, it is necessary to grind the parts coating the surfaces of the outer peripheral surface 7 and the two axial end faces 8. In this case also, the necessary grinding allowance is 0.15 mm or less, so that even if the thickness of the ceramic sprayed layer before grinding is limited to 0.4 mm or less, it can be ensured that the thickness of the insulating coating 6a after grinding is 0.25 mm or more.

If the thickness of the ceramic sprayed layer can be limited to 0.4 mm or less, as described previously, the thickness dimension T9 of parts coating the surfaces of the two continuous folded over portions 9 can be limited to 0.48 mm or less. That is, ceramic droplets sprayed on the outer peripheral surface 7 from the outside in the radial direction, and ceramic droplets sprayed on the two axial end faces 8 from the outside in the axial direction, adhere to the two continuous folded over portions 9. Consequently, the thickness dimension of the ceramic sprayed layer coating the two continuous folded over portions 9 is greater than the thickness dimension of the ceramic sprayed layer coating the outer peripheral surface 7 and the two axial end faces 8.

Figure 23:
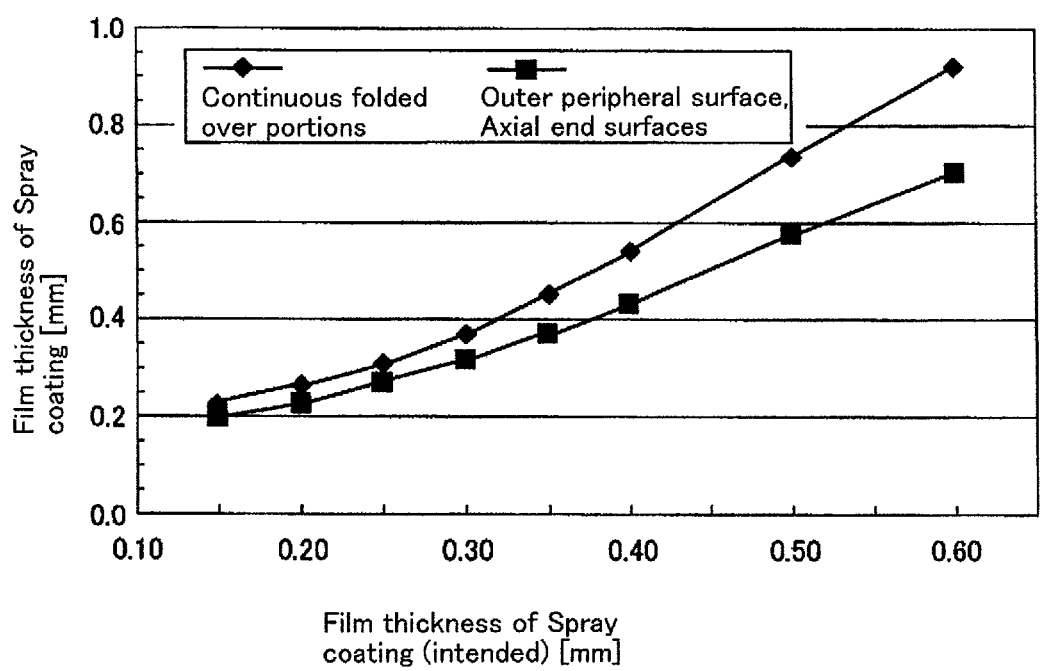
FIG. 23 is a line chart showing the influence of a ceramic sprayed layer on the thickness of the peripheral surface and end faces of a bearing ring, and the thickness of the continuous folded over portions.

From an experiment performed by the present inventor it was found that the proportionate increase in the thickness dimension of the ceramic sprayed layer coating the two continuous folded over portions 9 becomes considerable as the thickness dimension of the ceramic sprayed layer coating each of the surfaces 7 and 8 increases as shown in FIG. 23, described later. As shown in FIG. 23, in the case where the thickness dimension of the ceramic sprayed layer coating each of the surfaces 7 and 8 is approximately 0.4 mm, the amount of increase in the thickness dimension of the ceramic sprayed layer coating the two continuous folded over portions 9 remains approximately 1.2 times (0.48 mm). However, in the case where the thickness dimension of the ceramic sprayed layer coating each of the surfaces 7 and 8 is approximately 0.5 mm, the proportionate increase in the thickness dimension of the ceramic sprayed layer coating the two continuous folded over portions 9 reaches approximately 1.3 times (0.65 mm).

In the case of the present example, since the thickness dimension of the ceramic sprayed layer coating each of the surfaces 7 and 8 is limited to 0.4 mm or less, the thickness dimension of the ceramic sprayed layer coating the two continuous folded over portions 9 can be limited to 0.48 mm or less. If the thickness of the ceramic sprayed layer is approximately 0.48 mm, the thickness dimension is not excessive, so it is difficult for damage such as cracks, chips or the like to occur even if it is left as it is (even if the thickness dimension is not reduced by grinding). Accordingly, the time and effort for grinding parts of the insulating coating 6a, which coat the two continuous folded over portions 9, are eliminated and hence the cost can be reduced.

Furthermore, in the case of the present example, since titanium oxide at, preferably, 0.01 percent by weight or more is incorporated, such irregular coloring that leads to deterioration of the external appearance does not occur even if sealing with synthetic resin is applied. That is, when sealing with synthetic resin for covering minute voids inside the ceramic sprayed layer with a synthetic resin, part of the synthetic resin appears on the surface of the ceramic sprayed layer. In the case of a ceramic material containing titanium oxide at 0.01 percent by weight or more, since the color of the surface has a gray appearance (ash color), if a synthetic resin with an appropriate color is used for the sealing with synthetic resin, irregular coloring that degrades the external appearance of the product does not occur on the surface. In order to make the color of the surface gray (ash color), it is preferable that the content of titanium oxide is 0.02 percent by weight or more.

However, if titanium oxide at over 0.2 percent by weight is incorporated, the thickness of the ceramic sprayed layer required to ensure the necessary insulation performance increases. Therefore, it is preferable to limit the content of the titanium oxide to within 0.01 to 0.2 percent by weight.

By limiting the content of the titanium oxide in the ceramic sprayed layer to 0.2 percent by weight or less, the yield of the material (alumina grains) when forming a sprayed layer deteriorates slightly. However, if alumina of particle sizes 10 to 50 µm, and average particle size 15 to 25 µm, is used, the deposition efficiency of the alumina forming the ceramic sprayed layer is improved, and at the same time the accuracy related to the thickness dimension of the ceramic sprayed layer is improved, thus enabling the increase in the cost to be kept down. That is, a reduction in the material cost due to the improvement of the deposition efficiency, and simplification of finishing (shortening of finishing time) due to the improvement of the dimensional accuracy, enable the cost of manufacturing an electrolytic erosion preventing insulated rolling bearing to be inexpensive.

Second Example of the Embodiment

Next is a description of a second example of an embodiment of the present invention, using the above-described FIGS. 2 and 3. In the case of the present example also, an insulating coating 6b is formed on the outer peripheral surface 7 and two axial end faces 8 of an outer ring 3 constituting a single row deep groove radial ball bearing. The insulating coating 6b is a ceramic sprayed layer formed by spraying ceramic droplets containing alumina at 97 percent by weight or more and zirconia at 0.5 to 2.5 percent by weight, using plasma spraying. The insulating coating 6b, being such a ceramic sprayed layer, coats the outer peripheral surface 7 and the two axial end faces 8, and also the surfaces of the quarter circle cross-section continuous folded over portions 9, which join the two axial edges of the outer peripheral surface 7, and the outer peripheral rims of the two axial end faces 8. Among the thickness dimensions T7, T8 and T9 (refer to FIG. 3) of the insulating coating 6b, the thickness dimensions T7 and T8 of the parts coating the surfaces of the outer peripheral surface 7 and the two axial end faces 8 are limited to 0.4 mm or less. By limiting the thickness dimensions T7 and T8 of these parts to 0.4 mm or less, the thickness dimension T9 of the parts coating the surfaces of the two continuous folded over portions 9 is limited to less than 0.5 mm.

Furthermore, by grinding the parts of the insulating coating 6b that coat the surfaces of the outer peripheral surface 7 and the two axial end faces 8, each of the parts becomes a smooth surface, so that the surfaces 7 and 8 and the inner surface of the housing that the outer ring 3 is fitted inside, can make a close contact. Accompanying such grinding, a grinding allowance δ as shown in FIG. 3 is removed from part (crosshatched part of FIG. 3) of the surface of the insulating coating 6b coating the surfaces 7 and 8, so that the thickness dimension of the insulating coating 6b becomes thinner than that in the state in which the ceramic sprayed layer was formed. However, the thicknesses t7 (=T7−δ) and t8 (=T8−δ) after the grinding allowance δ is removed are also maintained at 0.25 mm or more. On the other hand, parts of the insulating coating 6b, which coat the surfaces of the two continuous folded over portions 9, are not ground, and remain as they are (ceramic droplets as sprayed).

An electrolytic erosion preventing insulated rolling bearing as described above can ensure high levels of insulation performance of the insulating coating 6b, durability, and low cost, at the same time.

Firstly, the insulation performance can be ensured by using a ceramic sprayed layer to form the insulating coating 6b containing alumina at 97 percent by weight or more. That is, since a ceramic sprayed layer containing alumina at 97 percent by weight or more has a high electrical resistivity (excellent insulating characteristics), if it is ensured that the thickness of the insulating coating (in a useable state) after grinding is 0.25 mm or more, provided that the application is for a rotating support portion of the rotating shaft of an electric motor for general use or for rail car, or of a rotating shaft for an electrical generator, whose potential difference is up to about 3000 V, a sufficient electrolytic erosion prevention effect can be ensured. For example, in the case where the thickness dimension of an insulating coating after grinding is 0.25 mm, it is possible to ensure an insulation resistance of 5000 MΩ or more under the condition of 1000 V applied.

Moreover, in order to ensure that the thickness of the insulating coating 6b after grinding is 0.25 mm or more, even if the thickness of the ceramic sprayed layer before grinding is 0.4 mm or less, a sufficient grinding allowance (approximately 0.15 mm maximum) can be ensured. That is, in order to make the contact of the surface of the insulating coating 6b and the inner surface of the housing even, to stabilize the attitude of the outer ring 3 and prevent excessive force from being applied to part of the insulating coating 6b, it is necessary to grind the parts coating the surfaces of the outer peripheral surface 7 and the two axial end faces 8. In this case also, the necessary grinding allowance is 0.15 mm or less, so that even if the thickness of the ceramic sprayed layer before grinding is limited to 0.4 mm or less, it can be ensured that the thickness of the insulating coating 6b after grinding is 0.25 mm or more.

If the thickness of the ceramic sprayed layer can be limited to 0.4 mm or less, as described previously, the thickness dimension T9 of parts coating the surfaces of the two continuous folded over portions 9 can be limited to less than 0.5 mm. That is, ceramic droplets sprayed on the outer peripheral surface 7 from the outside in the radial direction, and ceramic droplets sprayed on the two axial end faces 8 from the outside in the axial direction, adhere to the two continuous folded over portions 9. Consequently, the thickness dimension of the ceramic sprayed layer coating the two continuous folded over portions 9 is greater than the thickness dimension of the ceramic sprayed layer coating the outer peripheral surface 7 and the two axial end faces 8.

In the case of the present example, since the thickness dimension of the ceramic sprayed layer coating each of the surfaces 7 and 8 is limited to 0.4 mm or less, the thickness dimension of the ceramic sprayed layer coating the two continuous folded over portions 9 can be limited to less than 0.5 mm. If the thickness of the ceramic sprayed layer is approximately 0.5 mm, the thickness dimension is not excessive, so it is difficult for damage such as cracks, chips or the like to occur even if it is left as it is (even if the thickness dimension is not reduced by grinding). Accordingly, the time and effort for grinding parts of the insulating coating 6b, which coat the two continuous folded over portions 9, are eliminated and hence the cost can be reduced.

Furthermore, in the case of the present example, since zirconia at 0.5 percent by weight or more is incorporated, such irregular coloring that leads to deterioration of the external appearance does not occur even if sealing is applied with synthetic resin. That is, when sealing with synthetic resin for covering minute voids inside the ceramic sprayed layer with a synthetic resin, part of the synthetic resin appears on the surface of the ceramic sprayed layer. In the case of a ceramic material containing zirconia at 0.5 percent by weight or more, since the color of the surface has a gray appearance (ash color), if a synthetic resin with an appropriate color is used for the sealing with synthetic resin, irregular coloring that degrades the external appearance of the product does not occur on the surface.

However, if zirconia at over 2.5 percent by weight is incorporated, the thickness of the ceramic sprayed layer required to ensure the necessary insulation performance increases. Therefore, it is preferable to limit the content of the zirconia to within 0.5 to 2.5 percent by weight.

By limiting the content of the zirconia in the ceramic sprayed layer to 2.5 percent by weight or less, the yield of the material (alumina grains) when forming a sprayed layer deteriorates slightly. However, if alumina of particle sizes 10 to 50 μm, and average particle size 15 to 25 μm, is used, the deposition efficiency of the alumina forming the ceramic sprayed layer is improved, and at the same time the accuracy related to the thickness dimension of the ceramic sprayed layer is improved, thus enabling the increase in the cost to be kept down. That is, a reduction in the material cost due to the improvement of the deposition efficiency, and simplification of finishing (shortening of finishing time) due to the improvement of the dimensional accuracy, enable the cost of manufacturing an electrolytic erosion preventing insulated rolling bearing to be inexpensive.

Moreover, in the case of the present example, since zirconia of high strength and high toughness is incorporated in the ceramic sprayed layer, the adhesion of the ceramic sprayed layer can be improved. If in this manner the adhesion of the ceramic sprayed layer is improved, the ceramic sprayed layer is unlikely to peel off, and hence sufficient durability can be ensured.

Third Example of the Embodiment

Figure 5:
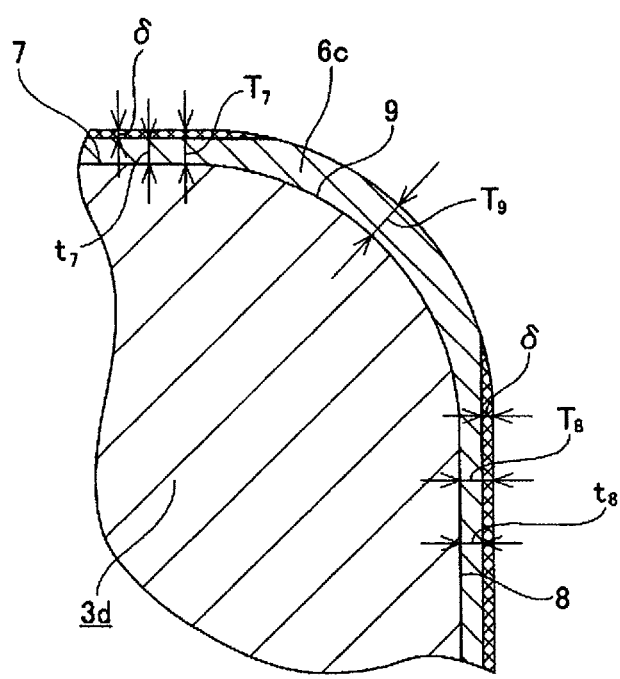
FIG. 5 is an enlarged view of section C in FIG. 4 (A).
Figure 34:
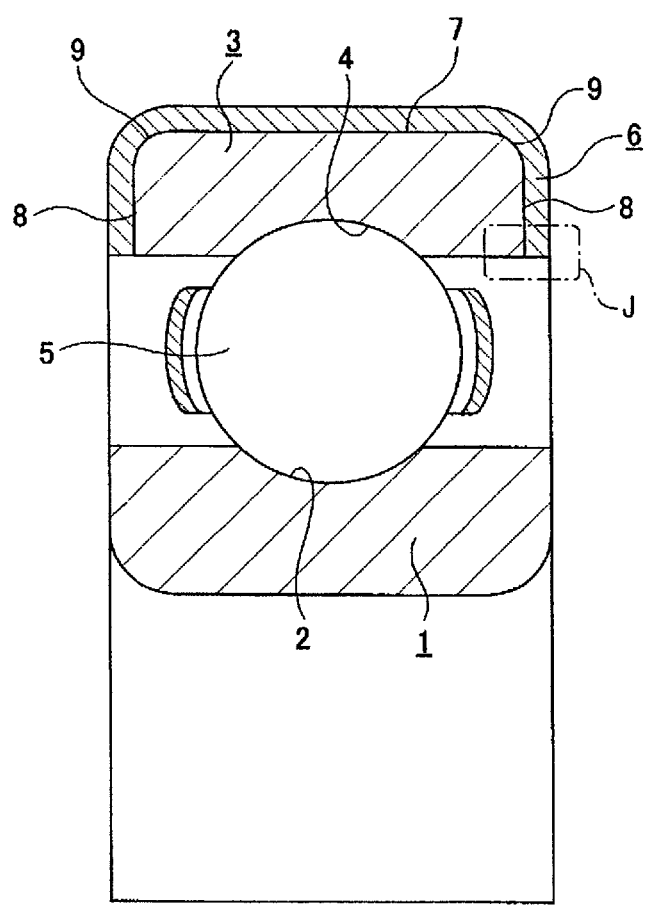
FIG. 34 is a sectional half view showing a first example of a conventional construction.
Figure 35:
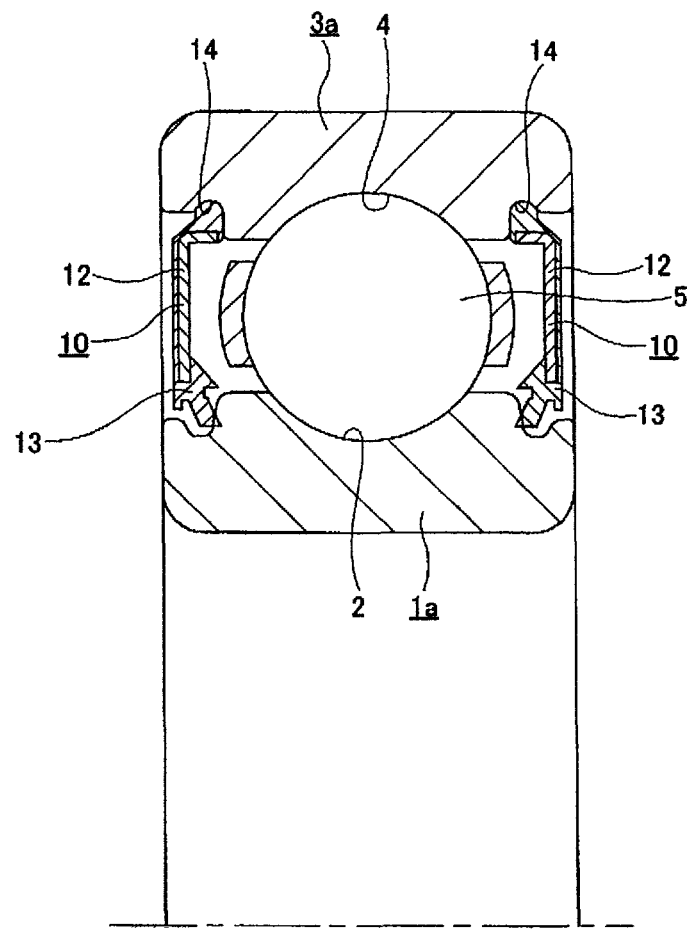
FIG. 35 is a sectional half view showing an example of a construction in which seal rings are installed in a rolling bearing.
Figure 36:
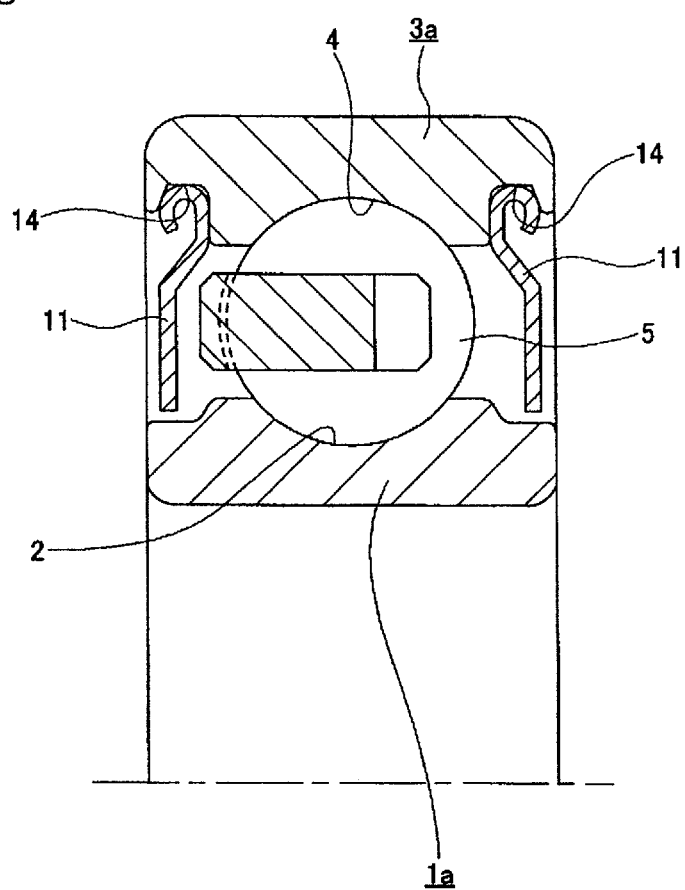
FIG. 36 is a sectional half view showing similarly an example of a construction in which shield plates are installed.

FIGS. 4 to 6 show a third example of an embodiment of the present invention. The characteristic point of the present example is that even in the case where an outer ring 3d is fitted into a metal housing 15, in order to prevent discharge phenomena from occurring between fitting grooves 14 formed in the surface of the housing 15 and the inner peripheral surfaces of the two ends of the outer ring 3d, an insulating coating 6c also coats the two fitting grooves 14. The other structures and effects are similar to those in the conventional construction shown in FIGS. 34 to 36. Therefore, parts similar to the construction shown in FIG. 34 to 36 and duplicate figures are omitted or simplified, and hereunder is a description focusing on the points of the present example and the parts that differ from the conventional construction.

In the case of the present example, in addition to the outer peripheral surface 7 of the outer ring 3d, and the two axial end faces 8 of the outer ring 3d, the ceramic insulating coating 6c also coats the surfaces of the two fitting grooves 14. The insulating coating 6c is a ceramic sprayed layer formed by spraying, for example by plasma spraying, ceramic droplets containing alumina at 99 percent by weight or more, onto the outer peripheral surface 7 and the two axial end faces 8, and also the two fitting grooves 14. The insulating coating 6c, being such a ceramic sprayed layer, in addition to the outer peripheral surface 7, the two axial end faces 8, and the two fitting grooves 14, also coats the surfaces of the quarter circle cross-section continuous folded over portions 9, which join the two axial direction edges of the outer peripheral surface 7, and the outer peripheral rims of the two axial end faces 8. Moreover, the portions which join the inner peripheral edges of the two axial end faces 8 and the two axial ends of the two fitting grooves 14 are also coated with the insulating coating 6c.

Accordingly, in the case of the present example, the parts from the outer peripheral surface 7, the continuous folded over portions 9, and the two axial end faces 8, to the two fitting grooves 14 of the surface of the outer ring 3d, are coated by the insulating coating 6c. Furthermore, parts of the surfaces of the two fitting grooves 14 are coated by the insulating coating 6c up to the internal rims of the side faces 24 inside, in the axial direction, of the two fitting grooves 14.

Moreover, among the thickness dimensions T7, T8 and T9 (refer to FIG. 5) of the insulating coating 6c that coats the aforementioned respective faces 7, 8 and 9 except for the two fitting grooves 14, the thickness dimensions T7 and T8 of the parts coating the surfaces of the outer peripheral surface 7 and the two axial end faces 8 are limited to 0.4 mm or less. By limiting the thickness dimensions T7 and T8 of these parts to 0.4 mm or less, the thickness dimension T9 of the parts coating the surfaces of the two continuous folded over portions 9 is limited to less than 0.5 mm (preferably 0.48 mm or less).

Furthermore, of the insulating coating 6c that coats the surfaces 7, 8, and 9, by grinding the parts that coat the surfaces of the outer peripheral surface 7 and the two axial end faces 8, each of the parts becomes a smooth surface, so that the surfaces 7 and 8 and the inner surface of the housing 15 (refer to FIG. 6) being the matching member, that the outer ring 3d is fitted inside, can make a close contact. Accompanying such grinding, a grinding allowance δ as shown in FIG. 5 is removed from part (cross-hatched part of FIG. 5) of the surface of the insulating coating 6c coating the surfaces 7 and 8, so that the thickness dimension of the insulating coating 6c becomes thinner than that in the state in which the ceramic sprayed layer was formed. However, the thicknesses t7 (=T7−δ) and t8 (=T8−δ) after the grinding allowance δ is removed are also maintained at 0.25 mm or more. On the other hand, parts of the insulating coating 6c, which coat the surfaces of the two continuous folded over portions 9, are not ground in order to reduce cost, and remain as they are (ceramic droplets as sprayed).

Moreover, it is preferable to ensure that the thickness of the insulating coating 6c coating the two fitting grooves 14 is at least 0.25 mm or more. That is, since the shapes of the two fitting grooves 14 are complex compared with those of the outer peripheral surface 7 and the two axial end faces 8, it is difficult to control the thickness of the insulating coating 6c. Accordingly, dispersion is likely to occur in the thickness of the insulating coating 6c coating the surfaces of the two fitting grooves 14. However, due to recent improvements in the spraying technique, it is possible to control the thickness to a certain extent. Therefore, by careful attention during spraying, it is preferable to make the thickness of the insulating coating 6c coating the two fitting grooves 14 to 0.25 mm or more. In this manner, if it can be ensured that the thickness of the coating is 0.25 mm or more, sufficient insulation performance can be ensured.

In the case where sealing devices to be fitted in the two fitting grooves 14 are seal rings 10 (refer to FIG. 35) formed by reinforcing elastic materials 13 with metal cores 12, the elastic materials 13 are fitted in the two fitting grooves 14. Accordingly, even if the insulating coating 6c is slightly thicker than that on the outer peripheral surface 7 and the two axial end faces 8, being parts supported inside the housing 15, it is difficult for damage such as cracks, chips and the like to be caused. Therefore, in the case where the two seal rings 10 are fitted in the two fitting grooves 14, the thickness of the insulating coating 6c coating the two fitting grooves 14 may be increased within a range in which it does not cause the functional problem described next. However, in the case where shield plates 11 (refer to FIG. 36) are fitted for example, since there is a possibility that damage such as cracks or chips occurs in the insulating coating 6c, it is preferable to limit the thickness of the insulating coating 6c coating the two fitting grooves 14 to 0.5 mm or less by devising a suitable spraying method, or by grinding the sprayed layer.

Furthermore, even if the components fitted in the two fitting grooves 14 are either seal rings 10 or shield plates 11, it is preferable to control the dimensions of the two fitting grooves 14 before spraying, with consideration of the dimensions after spraying. That is, as described above, in the case where the insulating coating 6c is sprayed on the two fitting grooves 14, it is difficult to control the thickness. Accordingly, it is first checked how the sprayed layer is formed, and then the dimensions of the two fitting grooves 14 before forming the insulating coating 6c are controlled in order to prevent any problem from occurring, even after spraying, when the seal rings 10 or the shield plates 11 are attached. For example, the spaces between the two inside faces of the fitting grooves 14 after the insulating coating 6c is formed, in which the two components 10 and 11 are fitted, are prevented from being too large, or the spaces in which the two components 10 and 11 are fitted are prevented from being too small. Then, the seal rings 10 or the shield plates 11 are prevented from detaching easily because the seal rings 10 or the shield plates 11 cannot be inserted to the full extent, and excessive force is prevented from being required when the seal rings 10 or the shield plates 11 are fitted.

According to an electrolytic erosion preventing insulated rolling bearing of the present example constructed as above, in the case where a rolling bearing is installed in a rotation support portion, it is possible to prevent discharge phenomena occurring between the fitting grooves 14 and the housing 15, in which the outer ring 3d in which the two fitting grooves 14 are formed, is fitted. That is, in the case of the conventional construction as described previously, as shown in FIG. 38 (B), since the insulating coating is not formed in the fitting grooves 14, the distance L1 between part of the surface of the housing 15 and part of the surface of the outer ring 3a, which is not coated by the insulating coating (that is, the rim of the fitting groove 14 in the axial direction), is short. Consequently, in the case where the potential difference is great, such as 1500 V or more for example, there is a possibility that discharge phenomena occur between part of the surface of the housing 15 and the surfaces of the two fitting grooves 14. However, in the case of the present example, since the fitting grooves 14 are coated by the insulating coating 6c, as shown in FIG. 6 (B), even if the outer ring 3d is installed in the housing 15 such that part of the housing 15 and the two fitting grooves 14 are adjacent, it is possible to make the distance L2 between part of the surface of the housing 15 and part of the surface of the outer ring 3d, which is not coated by the insulating coating 6c (that is, the internal rim of the side face 24 of the fitting groove 14), larger than the distance L1 in the construction shown in FIG. 38. Accordingly, it is possible to prevent discharge phenomena from occurring between the part of the surface of the housing 15 and the surface of the two fitting grooves 14.

Moreover, in the case of the present example, even if elastic material 13 made from acrylonitrile-butadiene rubber to which conductive carbon black is added is used, or metal shield plates 11 are used, as seal rings 10, current can at least be prevented from flowing to the outer ring 3d side. That is, in the case where conductive seal rings 10 or metal shield plates 11 are used without coating the two fitting grooves 14 with an insulating coating, current flows easily through the seal rings 10 or the shield plates 11 due to discharge phenomena occurring between the surfaces of the seal rings 10 or shield plates 11, and the surface of the housing 15. However, in the case of the present example, since the two fitting grooves 14 in which the seal rings 10 or the shield plates 11 are fitted are coated by the insulating coating 6c, discharge phenomena can be prevented, so that current can be prevented from flowing through the seal rings 10 or the shield plates 11.

However, as described above, in the state in which conductive seal rings 10 or metal shield plates 11 are fitted in the two fitting grooves 14, the distance between parts of the outer peripheral edges of the seal rings 10 or the shield plates 11, which are exposed from the two fitting grooves 14, and the surface of the housing 15, becomes short. Even in this case, the distance is larger than the distance L1 between the surface of the housing 15 and the surface of the fitting grooves 14 in the construction shown in FIG. 38 (B). Therefore, it is difficult for discharge phenomena to occur between the surface of the housing 15 and the seal rings 10 or the shield plates 11. Furthermore, even if discharge phenomena occur between the surface of the housing 15 and the seal rings 10 or the shield plates 11, since the fitting grooves 14 are coated by the insulating coating 6c, current does not flow to the outer ring 3d side. Therefore, although there is a possibility that discharge phenomena occur between the inner peripheral edges of the seal rings 10 or the shield plates 11, and the outer peripheral surfaces of the two ends of the inner ring, electrolytic erosion does not occur at the points of contact of the outer ring raceway 4 or the inner ring raceway and the rolling elements.

Moreover, the insulation performance can be ensured by using a ceramic sprayed layer to form the insulating coating 6c containing alumina at 99 percent by weight or more. That is, since a ceramic sprayed layer containing alumina at 99 percent by weight or more has a high electrical resistivity (excellent insulating characteristics), if it is ensured that the thickness of the insulating coating 6c in a useable state is 0.25 mm or more, a sufficient electrolytic erosion prevention effect can be ensured, even if the potential difference is large.

In order to prevent irregular coloring from occurring on a ceramic sprayed layer accompanying sealing with synthetic resin, it is preferable to incorporate titanium oxide at 0.01 to 0.2 percent by weight in the ceramic sprayed layer. In order to make the color of the surface gray (ash color), it is preferable that the content of titanium oxide is 0.02 to 0.2 percent by weight. Furthermore, in order to maintain the yield of the material (alumina grains) when forming a sprayed layer, it is preferable to use alumina of particle sizes 10 to 50 μm, and average particle size 15 to 25

Moreover, in the case where the insulating coating 6c coats the outer peripheral surface 7 and the two axial end faces 8 of the outer ring 3d, in order to ensure that the thickness of the insulating coating 6c is 0.25 mm or more, even if the thickness of the ceramic sprayed layer before grinding is 0.4 mm or less, a sufficient grinding allowance (approximately 0.15 mm maximum) can be ensured. That is, in order to make the contact of the surface of the insulating coating 6c coating the outer peripheral surface 7 of the outer ring 3d and the inner surface of the housing 15 even, to stabilize the attitude of the outer ring 3d, and prevent excessive force from being applied to part of the insulating coating 6c, it is necessary to grind the parts coating the surfaces of the outer peripheral surface 7 and the two axial end faces 8. In this case also, the necessary grinding allowance is 0.15 mm or less, so that even if the thickness of the ceramic sprayed layer before grinding is limited to 0.4 mm or less, it is possible to ensure that the thickness of the insulating coating 6c after grinding is 0.25 mm or more.

If the thickness of the ceramic sprayed layer that coats the surfaces 7 and 8 can be limited to 0.4 mm or less, as described previously, the thickness dimension T9 of parts coating the surfaces of the two continuous folded over portions 9 can be limited to 0.5 mm or less (furthermore 0.48 mm or less). That is, ceramic droplets sprayed on the outer peripheral surface 7 from the outside in the radial direction, and ceramic droplets sprayed on the two axial end faces 8 from the outside in the axial direction, adhere to the two continuous folded over portions 9. Consequently, the thickness dimension of the ceramic sprayed layer coating the two continuous folded over portions 9 is greater than the thickness dimension of the ceramic sprayed layer coating the outer peripheral surface 7 and the two axial end faces 8. Even in this case, if the thickness dimension T9 is limited to 0.5 mm or less, it can be made difficult for damage such as cracks, chips and the like to be caused in the ceramic sprayed layer coating the two continuous folded over portions 9.

It is also possible to form the insulating coating 6c from a sprayed layer in which the amount of alumina content is 97 percent by weight or more and zirconia is contained at 0.5 to 2.5 percent by weight, instead of the sprayed layer in which the amount of alumina content is 99 percent by weight or more and titanium oxide is contained at 0.01 to 0.2 percent by weight.

Fourth Example of the Embodiment

Figure 7:
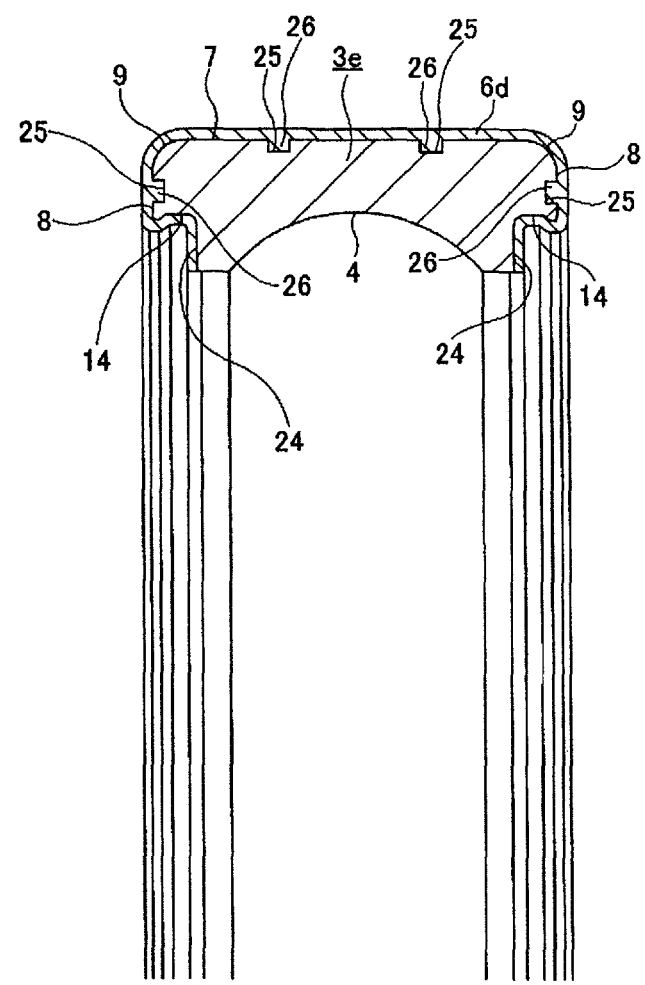
FIG. 7 shows a fourth example of the present invention, which is a diagram similar to FIG. 4 (A).

FIG. 7 shows a fourth example of the embodiment of the present invention. In the case of the present example, the outer peripheral surface 7, the two axial end faces 8, the two continuous folded over portions 9 and moreover the fitting grooves 14, of an outer ring 3e, are coated by an insulating coating 6d made from a synthetic resin such as a PPS resin or the like. In the case of the present example, concave parts 25 are formed in the outer peripheral surface 7 and the two axial end faces 8 of the outer ring 3e. Moreover, in a state in which the insulating coating 6d coats each of the surfaces 7, 8, 9 and 14, convex parts 26 formed at locations in the insulating coating 6d that coincide with each of the concave parts 25, engage with their respective concave parts 25. As a result, the bonding strength of the surfaces 7, 8, 9 and 14 of the outer ring 3e and the insulating coating 6d is increased, so that separation of the insulating coating 6d from the surfaces 7, 8, 9 and 14 can be prevented.

As a method for coating the insulating coating 6d on the surfaces 7, 8, 9 and 14 of the outer ring 3e, there is a method in which the insulating coating 6e is formed on the outer ring 3e by molding for example. In this case, during molding, parts of the insulating coating 6d enter each of the concave parts 25, forming the convex parts 26.

Furthermore, also, in the case where the insulating coating 6d is made from a synthetic resin as mentioned earlier, if the thickness of the insulating coating 6d (except the convex parts 26) coating the outer peripheral surface 7, the two axial end faces 8, the two continuous folded over portions 9, and moreover the fitting grooves 14, of an outer ring 3e is controlled appropriately, it is possible to ensure the insulation performance and simultaneously prevent damage such as cracks to a high degree. For example, each of the thicknesses of the surfaces 7, 8, 9 and 14 is 0.2 to 1.0 mm, and preferably 0.25 to 0.5 mm. The other structures and effects are similar to those in the third example described above.

Fifth Example of the Embodiment

Figure 8:
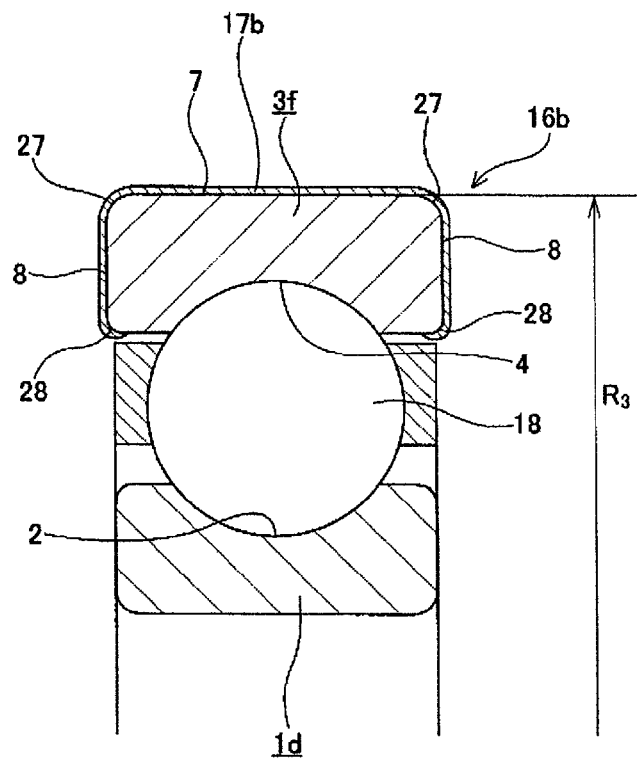
FIG. 8 is a partial sectional view of a rolling bearing, which shows a fifth example of the same.

FIG. 8 shows a fifth example of the embodiment of the present invention. The characteristic point of the present example is that even in the case where an insulating ceramic coating 17b is formed on the outer ring 3f side of a large sized rolling bearing, the properties of the insulating coating 17b are controlled so as to obtain sufficient insulation performance. The basic construction and effects of the rolling bearing are similar to those of a conventionally known rolling bearing such as in Patent Documents 6 and 11 to 13. Therefore, the description of parts similar to the conventional structure are omitted or simplified, and hereunder is a description focusing on the points of the present example.

Figure 39:
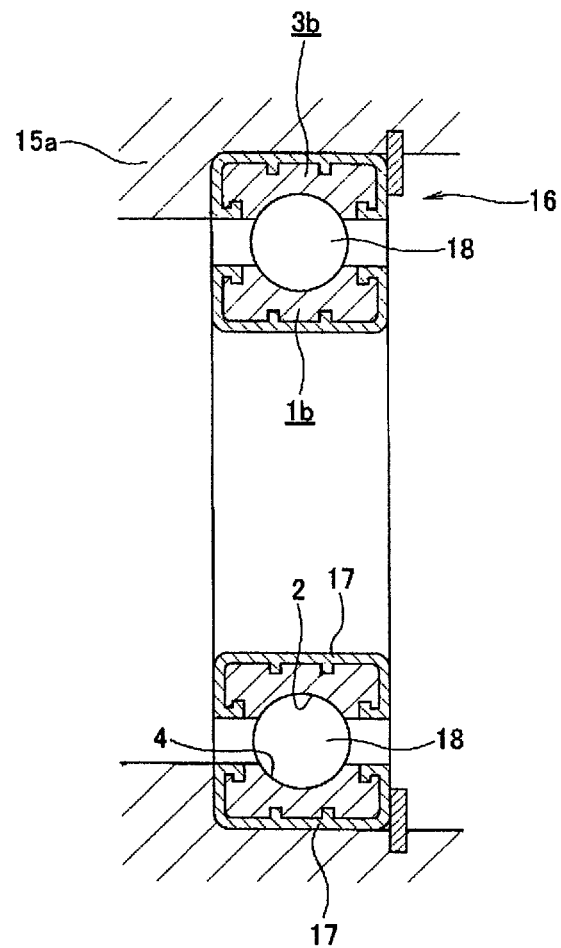
FIG. 39 is a sectional view showing a third example of a conventional construction.
Figure 40:
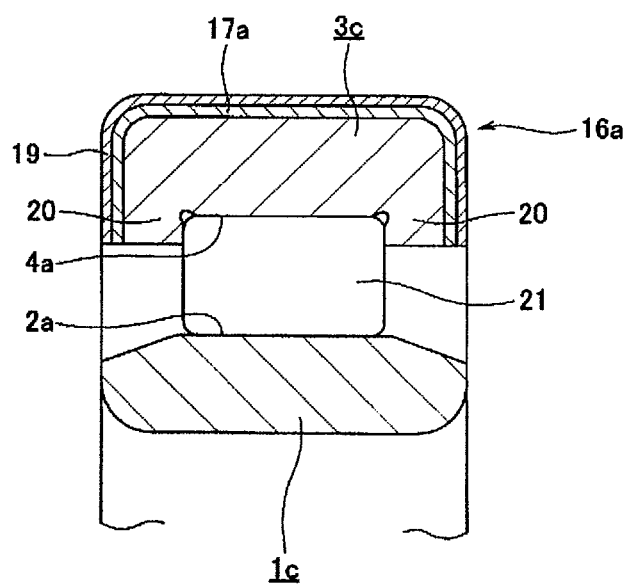
FIG. 40 is a partial sectional view of a rolling bearing, showing a fourth example of the same.
Figure 41:
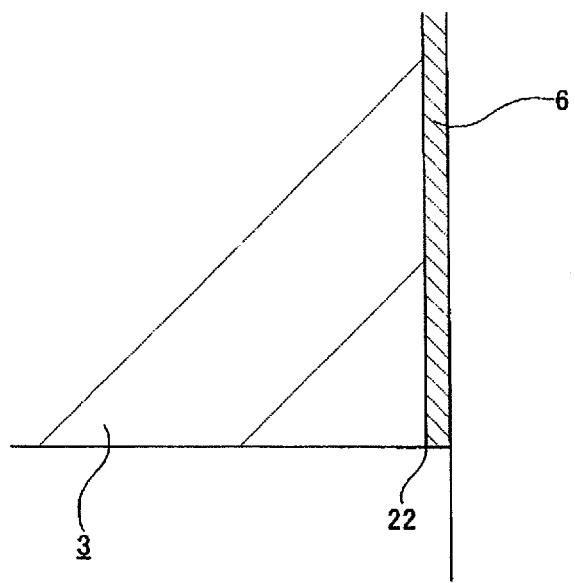
FIG. 41 is an enlarged view of section J in FIG. 34, showing a fifth example of the same.
Figure 42:
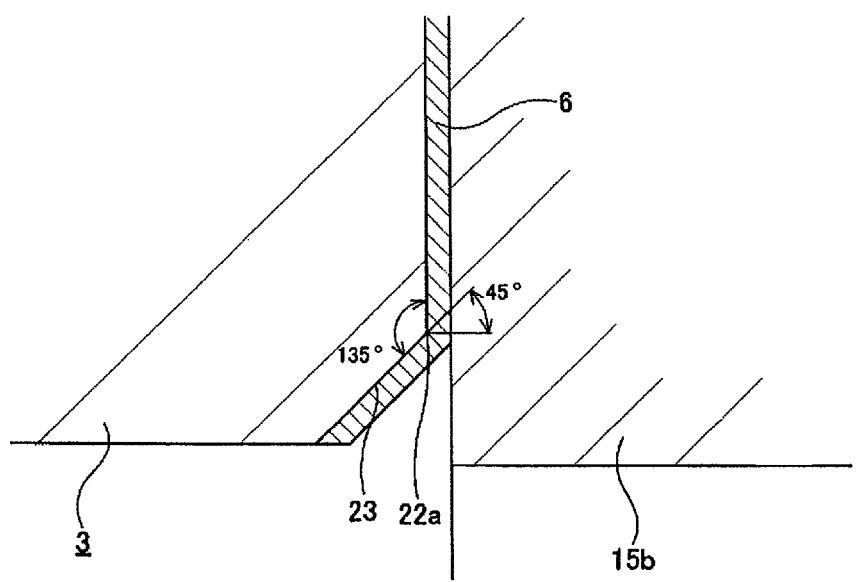
FIG. 42 is a diagram similar to FIG. 41, showing a sixth example of the same.
Figure 43:
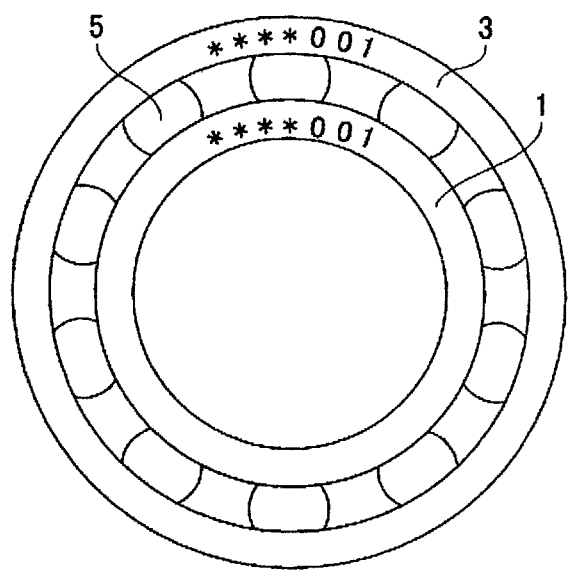
FIG. 43 is a side view showing a seventh example of the same.

A rolling bearing 16b of the present example comprises an outer ring 3f, an inner ring 1d, and a plurality of balls 18, each of which is made from a metal such as bearing steel (SUJ2 or SUJ3 for example), similarly to the construction shown in FIG. 39. Furthermore, in the case of the present example, among these, the outer ring 3f has dimension stabilizing treatment applied. As a dimension stabilizing treatment, for example, tempering is performed at a high temperature (for example 240° C.) after hardening, and the retained austenite amount is 2 volume percent or less. Moreover, in the case of the present example, the outer diameter $R_3$ of the rolling bearing 16b (outer ring 3f) is 200 mm or more.

In particular, in the case of the present example, the outer peripheral surface 7 and the two axial end faces 8 of the outer ring 3f are coated with an insulating ceramic coating 17b containing alumina as its main component. The insulating coating 17b is a single layer, and a metal layer, such as that disclosed in Patent Documents 12 and 13, is not formed. Furthermore, the insulating coating 17b is formed by plasma spraying, and is an insulating coating in which the amount of alumina content is 99 percent by weight or more and titanium oxide is contained at 0.01 to 0.2 percent by weight. Moreover, the insulating coating 17b coats the outer peripheral surface 7 and the two axial end faces 8, and also the surfaces of the quarter circle cross-section outer diameter side continuous folded over portions 27, which join the two axial direction edges of the outer peripheral surface 7 and the outer peripheral rims of the two axial end faces 8. Furthermore, in the case of the present example, the insulating coating 17b also coats the surfaces of the quarter circle cross-section inner diameter side continuous folded over portions 28, which join the internal rims of the two end faces 8 and the two axial edges of the inner peripheral surface of the outer ring 3f.

Moreover, in the case of the present example, the thickness of the insulating coating 17b coating the outer peripheral surface 7 and the two end faces 8 of the outer ring 3f is 0.1 to 0.7 mm. In this manner, in order to control the thickness of the insulating coating 17b, the surface is ground after forming the insulating ceramic coating. Furthermore, regarding the thickness of the insulating coating 17b, at least the coatings of the outer peripheral surface 7 and the two end faces 8 may be 0.1 to 0.7 mm. That is, parts of the insulating coating 17b that coat the surfaces of the continuous folded over portions 27 and 28 on the outer diameter side and the inner diameter side do not need to be ground and may remain as they are (ceramic droplets as sprayed) to reduce cost. Preferably, the film thickness of the coating of the outer peripheral surface 7 and the two end faces 8 after grinding is 0.5 mm or less. As a result, the overall film thickness before grinding can be thinner, enabling the cost to be kept low. In the case of the present example, as mentioned above, by controlling the material and the thickness of the insulating coating 17b, the insulation resistance value of the insulating coating 17b is 1000 MΩ or more, and the capacitance is 27 nF or less.

Furthermore, the rolling bearing 16b is incorporated in a rotation support portion of an inverter controlled electrical generator of a wind mill turbine, for example. That is, the outer ring 3f is fitted inside a metal housing constituting the rotation support portion by a loose fit, and also the inner ring 1d is fitted on the outside of a metal shaft constituting the rotation support portion by an interference fit.

According to the rolling bearing 16b of the present example constructed as above, in the case where the insulating ceramic coating 17b is formed on the outer ring 3f of a large sized rolling bearing 16b, whose outer diameter is 200 mm or more, sufficient capabilities of the insulating coating 17b can be ensured.

That is, in the case of the present example, the insulating coating 17b is an insulating coating in which the amount of alumina content is 99 percent by weight or more and titanium oxide is contained at 0.01 to 0.2 percent by weight. The film thickness is 0.1 to 0.7 mm, and the insulation resistance value of the insulating coating 17b is 1000 MΩ or more, and the capacitance is 27 nF or less. Therefore, even if the insulating coating 17b is formed on the outer ring 3f side, whose surface area is large, a rolling bearing 16b with high impedance can be achieved reliably.

Moreover, in the case of the present example, since the surfaces of the inner diameter side continuous folded over portions 28 of the surface of the outer ring 3f are also coated with the insulating coating 17b, creeping discharge can be avoided, enabling the impedance to be higher. For example, in the case where an end face 8 of the outer ring 3f makes contact with a step provided in the inner peripheral surface of the housing, there is a case where the distance between the inner peripheral surface end of the outer ring 3f, on which no insulating coating 17b is formed, and the step gets close. In this case, even if the axial end faces 8 of the outer ring 3f are coated with the insulating coating 17b, there is a possibility that current flows into the step along the inner peripheral surface of the outer ring 3f. However, if the insulating coating 17b coats the surfaces of the inner diameter side continuous folded over portions 28, which join the two inner peripheral surface edges of the outer ring 3f and the internal rims of the two axial end faces 8, it is possible to prevent current from flowing to the shaft side along the inner peripheral surface of the outer ring 3f.

Furthermore, since the insulating coating 17b is formed from an insulating coating in which the amount of alumina content is 99 percent by weight or more and titanium oxide is contained at 0.01 to 0.2 percent by weight, and the film thickness is 0.1 to 0.7 mm, the insulating coating 17b having a high impedance as mentioned above can be obtained inexpensively. In the case of the present example, since the insulating coating 17b is formed by plasma spraying, a high localized temperature is reached due to the high temperature of the sprayed gas plasma. However, since high temperature dimension stabilizing treatment is applied to the outer ring 3f on which the insulating coating 17b is formed, even if a high localized temperature is reached due to plasma spraying, the dimensional accuracy of the outer ring 3f can be maintained.

It is also possible to form the insulating coating 17b by a sprayed layer in which the amount of alumina content is 97 percent by weight or more and zirconia is contained at 0.1 to 2.5 percent by weight, and film the thickness is 0.1 to 0.7 mm.

Sixth Example of the Embodiment

Figure 9:
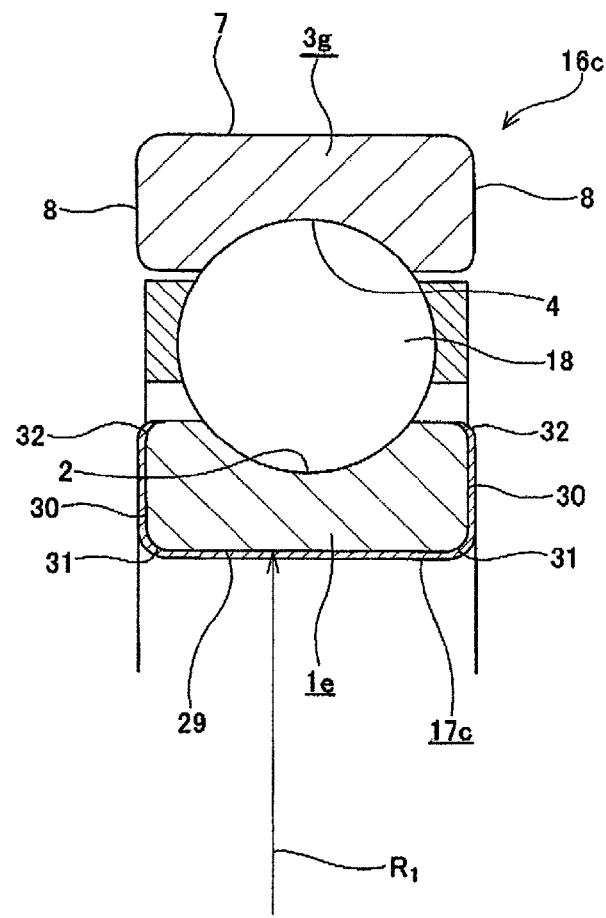
FIG. 9 is a partial sectional view of a rolling bearing, which shows a sixth example of the same.

FIG. 9 shows a sixth example of the embodiment of the present invention. The characteristic point of the present example is that an insulating ceramic coating is formed on the inner ring 1e side, in order to realize a construction which is inexpensive and has high impedance (insulation resistance), and the interference between the inner ring 1e and the mating component is regulated. The basic construction and effects of the rolling bearing are similar to those of a conventionally known rolling bearing such as in Patent Documents 6 and 11 to 13. Therefore, the description of parts similar to the conventional structure are omitted or simplified, and hereunder is a description focusing on the points of the present example.

The bearing device of the present example also, similar to the construction described in Patent Documents 6, and 11 to 13, comprises a rolling bearing 16c and a metal shaft (not shown in the drawings), serving as a mating component onto which the rolling bearing 16c is fitted. Examples that can be given for the material of this shaft are chrome-molybdenum steel for machine structural use, nickel-chromium-molybdenum steel, and carbon steel such as medium carbon steel. Moreover, the rolling bearing 16c comprises an outer ring 3g, an inner ring 1e, and a plurality of balls 18, each of which is made from a metal such as bearing steel (SUJ2 or SUJ3 for example), similarly to the construction shown in FIG. 39. Furthermore, in the case of the present example, among these, the inner ring 1e has dimension stabilizing treatment applied. As a dimension stabilizing treatment, for example, tempering is performed at a high temperature (for example 240° C.) after hardening, and the retained austenite amount is 2 volume percent or less.

Moreover, in the case of the present example, the sum of the surface areas of the outer peripheral surface 7 of the outer ring 3g and the two axial end faces 8 is 1.3 times the sum of the surface areas of the inner peripheral surface 29 of the inner ring 1e and the two axial end faces 30. Furthermore, in the case of the present example, the inner diameter R1 of the above rolling bearing 16c (inner ring 1e) is 100 mm or more.

In particular, in the case of the present example, the inner peripheral surface 29 and the two axial end faces 30 of the inner ring 1e are coated with an insulating ceramic coating 17c containing alumina as its main component. The insulating coating 17c is a single layer, and a metal layer, such as that disclosed in Patent Documents 12 and 13, is not formed. Furthermore, the insulating coating 17c is formed by plasma spraying, and is an insulating coating in which the amount of alumina content is 99 percent by weight or more and titanium oxide is contained at 0.01 to 0.2 percent by weight. Moreover, the insulating coating 17c coats the inner peripheral surface 29 and the two axial end faces 30, and also the surfaces of the quarter circle cross-section outer diameter side continuous folded over portions 31, which join the two axial direction edges of the inner peripheral surface 29 and the inner peripheral rims of the two axial end faces 30. Furthermore, in the case of the present example, the insulating coating 17c also coats the surfaces of the quarter circle cross-section outer diameter side continuous folded over portions 32, which join the outer peripheral rims of the two end faces 30 and the two axial edges of the outer peripheral surface of the inner ring 1e.

Moreover, in the case of the present example, the thickness of the insulating coating 17c coating the inner peripheral surface 29 and the two end faces 30 of the inner ring 1e is 0.1 to 0.7 mm. In this manner, in order to control the thickness of the insulating coating 17c, the surface is ground after forming the insulating ceramic coating. Furthermore, regarding the thickness of the insulating coating 17c, at least the coatings of the inner peripheral surface 29 and the two end faces 30 may be 0.1 to 0.7 mm. That is, parts of the insulating coating 17c that coat the surfaces of the continuous folded over portions 31 and 32 on the inner diameter side and the outer diameter side do not need to be ground and may remain as they are (ceramic droplets as sprayed) to reduce cost. In the case of the present example, as mentioned above, by controlling the material and the thickness of the insulating coating 17c, the insulation resistance value of the insulating coating 17c is 1000 MΩ or more, and the capacitance is 27 nF or less.

Furthermore, the rolling bearing 17c is incorporated in a rotation support portion of an inverter controlled electric motor or generator. That is, the outer ring 3g is fitted inside a metal housing constituting the rotation support portion by a loose fit, and also the inner ring 1e with the insulating coating 17c formed on the inner peripheral surface 29 and the two end faces 30 is fitted on the outside of a shaft constituting the rotation support portion by an interference fit. This shaft, as mentioned before, is made from steel such as chrome-molybdenum steel, or medium carbon steel. In the case of the present example, in this condition, the interference between the inner ring 1e and the shaft is regulated such that the insulating coating 17c is not damaged.

Therefore, in the case of the present example, the interference between the inner ring 1e and the shaft is regulated such that the hoop stress acting on the insulating coating 17c coating the inner peripheral surface 29 of the inner ring 1e is 200 N/mm$^2$ or less, even during use. In this manner, the hoop stress acting on the insulating coating 17c can be calculated using the material and dimensions of the inner ring 1e and the shaft, the material and dimensions of the insulating coating 17c, the assumed temperature during use, and the like. The interference between the inner ring 1e and the shaft is determined such that the hoop stress during use does not exceed 200 N/mm$^2$ Needless to say, the arrangement is also such that the hoop stress acting on the insulating coating 17c does not exceed 200 N/mm$^2$ when fitting the inner ring 1e and the shaft (when the temperature is normal). In order to arrange such that the hoop stress does not exceed 200 N/mm$^2$, in a rolling bearing where the inner diameter of the inner ring 1e is 180 mm for example, in the case where the bearing grade is grade 0, the dimensional tolerance of the fit with the shaft is set to k5 to r7 (JIS B 1566).

According to the construction of the present example constructed as above, it is possible to realize a construction in which an insulating ceramic coating is formed on a bearing ring, which is inexpensive and has high impedance (insulation resistance).

That is, in the case of the present example, since the insulating coating 17c is formed on the inner ring 1e side, compared with the case in which a film is formed on the outer ring 3g side, the area for forming the insulating coating 17c can be reduced. As a result, it is possible to reduce the capacitance of the insulating coating 17c, and increase its impedance. Furthermore, since it is not necessary to increase the film thickness in order to reduce the capacitance, the manufacturing cost can be reduced.

Since the metal forming the inner ring 1e and the shaft has a smaller elastic modulus and a greater coefficient of linear expansion than the ceramic forming the insulating coating 17c, the interference between the inner ring 1e and the shaft increases and the hoop stress acting on the insulating coating 17c increases as the temperature during use increases. Consequently, in the case where the interference at the time of fitting is too great, there is a possibility that damage occurs to the insulating coating 17c due to the increase in the hoop stress accompanying the increase in temperature. However, as in the present example, if the interference between the inner ring 1e and the shaft is appropriate, the inner ring 1e and the shaft can be joined firmly, and the insulating coating 17c coating the inner peripheral surface 29 of the inner ring 1e can be prevented from being damaged. In particular, in the case of the present example, since the interference between the inner ring 1e and the shaft is controlled such that the hoop stress acting on the insulating coating 17c coating the inner peripheral surface 29 of the inner ring 1e is 200 N/mm$^2$ or less even during use, it is possible to prevent damage such as cracks or the like occurring in the insulating coating 17c more reliably.

Moreover, in the case of the present example, the insulating coating 17c is an insulating coating in which the content of alumina is 99 percent by weight or more and titanium oxide is incorporated at 0.01 to 0.2 percent by weight. The film thickness is 0.1 to 0.7 mm, the insulation resistance value of the insulating coating 17c is 1000 MΩ or more, and the capacitance is 27 nF or less. As a result, a bearing device with high impedance can be achieved more reliably. Furthermore, in the case of the present example, since the surfaces of the outer diameter side continuous folded over portions 32 of the inner ring 1e are coated with the insulating coating 17c, creeping discharge can be avoided, enabling the impedance to be higher. For example, in the case where an end face 30 of the inner ring 1e makes contact with a step provided on the outer peripheral surface of the shaft, there is a case where the distance between the outer peripheral surface end of the inner ring 1e, on which no insulating coating 17c is formed, and the step gets close. In this case, even if the axial end faces 30 of the inner ring 1e are coated with the insulating coating 17c, there is a possibility that current flows into the step along the outer peripheral surface of the inner ring 1e. However, if the surfaces of the outer diameter side continuous folded over portions 32, which join the two rims of the outer peripheral surface of the inner ring 1e and the outer peripheral rim of the two axial end faces 30, are coated with the insulating coating 17c, it is possible to prevent current from flowing to the shaft side along the outer peripheral surface of the inner ring 1e.

Furthermore, since the insulating coating 17c is formed from an insulating coating in which the amount of alumina content is 99 percent by weight or more and titanium oxide is contained at 0.01 to 0.2 percent by weight, and the film thickness is 0.1 to 0.7 mm, the insulating coating 17c having a high impedance as mentioned above can be obtained inexpensively. In the case of the present example, since the insulating coating 17c is formed by plasma spraying, a high localized temperature is reached due to the high temperature of the sprayed gas plasma. However, since high temperature dimension stabilizing treatment is applied to the inner ring 1e on which the insulating coating 17c is formed, even if a high localized temperature is reached due to plasma spraying, the dimensional accuracy of the inner ring 1e can be maintained.

Moreover, in the case of the present example, the sum of the surface areas of the outer peripheral surface 7 and the two end faces 8 of the outer ring 3g is 1.3 times the sum of the surface areas of the inner peripheral surface 29 and the two end faces 30 of the inner ring 1e. Furthermore, the inner diameter of the rolling bearing 16c is 100 mm or more. Therefore, good levels of high impedance and cost reduction for the rolling bearing can be achieved at the same time. In the case of a rolling bearing 16c whose inner diameter is 100 mm or more, it is easy to spray the inner peripheral surface 29, and the work efficiency is excellent, so low cost can be achieved.

It is also possible to form the insulating coating 17c by a sprayed layer in which the amount of alumina content is 97 percent by weight or more and zirconia is contained at 0.1 to 2.5 percent by weight, and the film thickness is 0.1 to 0.7 mm.

Seventh Example of the Embodiment

Figure 10:
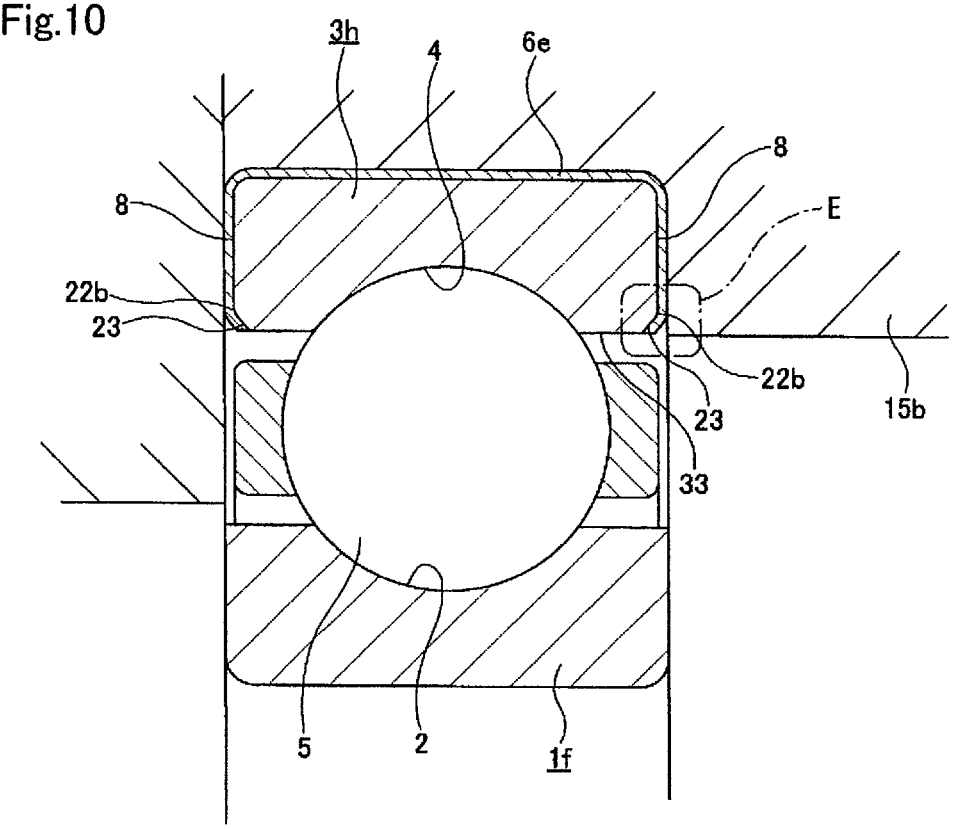
FIG. 10 is a partial sectional view showing a seventh example of the same.
Figure 11:
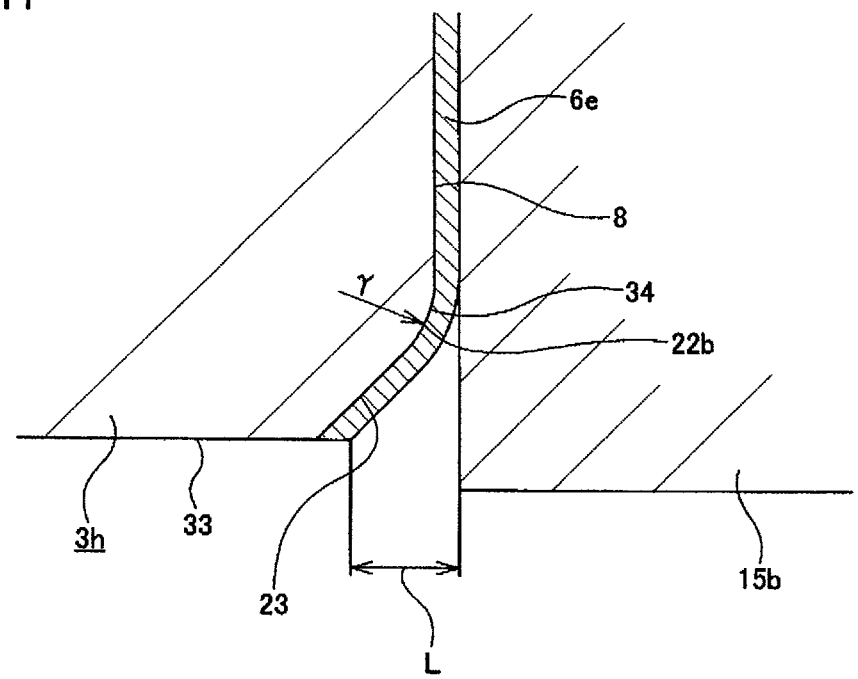
FIG. 11 is an enlarged view of section E of FIG. 10.

FIGS. 10 and 11 show a seventh example of the embodiment of the present invention. A rolling bearing is provided with a plurality of rolling elements 5 between an inner ring raceway 2 formed in the outer peripheral surface of an inner ring 1f and an outer ring raceway 4 formed in the inner peripheral surface of an outer ring 3h, which enable the inner ring 1f and the outer ring 3h to rotate relative to each other. The outer peripheral surface of the outer ring 3h and the two axial end faces 8 are coated with an insulating coating 6e.

Furthermore, in the case of the present example, partial cone concave chamfers 23, which are inclined at 45 degrees with respect to the central axis of the outer ring 3h, are formed between the two axial end faces 8 of the outer ring 3h and the inner peripheral surface 33. The two chamfers 23 are partial cone concave indented parts, whose generatrix shapes are straight lines. Continuous portions 22b between the outer peripheral rims of the two chamfers 23 and the two axial end faces 8 are partial circle shape convex surfaces 34 whose cross-sections have a curve radius r of 1 mm or more. Moreover, it is ensured that the distance L between the surface of the insulating coating 6e coating the inner peripheral edge parts of the two chamfers 23 and the surface of the insulating coating 6e coating the two axial end faces 8 in the axial direction of the outer ring 3h (distance between the surface of the insulating coating 6e coating the inner peripheral edge part of the chamfer 23, and the housing 15b), is 1 mm or more.

According to the construction of the present example constructed as above, even in the case where current flows between the outer ring 3h and the housing 15b, which is made from conductive material and makes contact with the outer ring 3h, the amount of current concentrated at the continuous portions 22b facing the housing 15b is limited. That is, the continuous portions 22b are partial circle shape convex surfaces 34 whose cross-sections have a curve radius r of 1 mm or more, and are not vertices, so that the amount of current concentrated at the continuous portions 22b can be limited. Therefore, a voltage (1000 VDC or less) that is applied to an electrolytic erosion preventing insulated rolling bearing installed in a rotation support portion of a rotating shaft of an electric motor for general purposes, or rail car, or a rotating shaft of an electrical generator, would be unlikely to produce sparking between the continuous portions 22b and the housing 15b. As a result, it is possible to ensure sufficient durability of the electrolytic erosion preventing insulated rolling bearing. When the present inventor changed the curve radius r in four steps of 0.6 mm, 1.0 mm, 1.2 mm and 1.5 mm, and applied a DC voltage of 1000 V between the outer ring 3h and the housing 15b, in the case where the curve radius r was 0.6 mm, sparking occurred at the continuous portions 22b, whereas in the cases where the curve radius r was 1.0 mm, 1.2 mm and 1.5 mm, sparking did not occur. In the experiment, the material of the insulating coating 6e was white alumina, and the thickness was 0.2 mm. Furthermore, the distance L between the surface of the insulating coating 6e coating the inner peripheral edge of the chamfer 23, and the housing 15b was 1.0 mm.

As is evident from the experiment, in the case of the present example, even if the insulating coating 6e is not particularly thick (for example, even if it is 0.5 mm or less, or even 0.3 mm or less), it is possible to prevent sparking from occurring between the outer ring 3h and the housing 15b made from conductive material. Therefore, even in the case where the usage conditions are critical, it is possible to realize an electrolytic erosion preventing insulated rolling bearing that can prevent electrolytic erosion sufficiently effectively, with low cost. The curve radius r of the cross-section of the continuous portion 22b is preferably 2 mm or more. That is, it is preferable to make the value of the curve radius r large provided it can be ensured that the distance L between the surface of the insulating coating 6e coating the inner peripheral edge of the chamfer 23 and the housing 15b is 1 mm or more (preferably 2 mm or more). Provided the distance L can be ensured, a large value such as 100 mm can also be used for the curve radius r.

Eighth Example of the Embodiment

Figure 12:
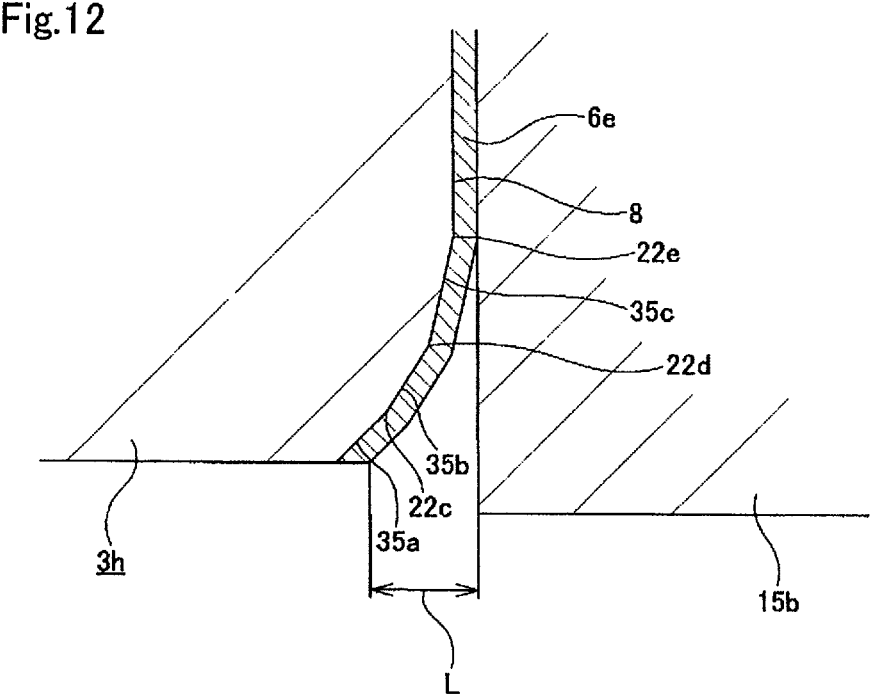
FIG. 12 shows an eighth example of the present invention, which is a diagram similar to FIG. 11.

FIG. 12 shows an eighth example of the embodiment of the present invention. In the case of the present example, the indented part formed as a part drawn towards the inner diameter of the axial end face 8 of the outer ring 3h, being a coated bearing ring, is a plurality (three in the example in the figure) of joined partial cone concave surfaces 35a, 35b and 35c, whose angles of inclination with respect to the central axis of the outer ring 3h, being a coated bearing ring, are different, and the generatrix shapes of which are straight lines. The apex angles of the continuous portions 22c, 22d and 22e between the adjacent partial cone concave surfaces 35a, 35b and 35c, and between the partial cone concave surface 35c, which is located closest to the outer diameter side, and the axial end face 8, are all 150 degrees or more (preferably 165 degrees or more). Furthermore, in the case of the present example, it is ensured that the distance L between the surface of the insulating coating 6e coating the internal rim of the partial cone concave surface 35a which is located closest to the inner diameter, and the housing 15b is 1 mm or more (preferably 2 mm or more).

Using the construction of the present example constructed as above also, even in the case where current flows between the outer ring 3h and the housing 15b, which is made from conductive material and makes contact with the outer ring 3h, the concentration of current at the continuous portions 22c, 22d and 22e facing the housing 15b is limited. That is, since the continuous portions 22c, 22d and 22e, whose apex angles are 150 degrees or more (preferably 165 degrees or more) are not vertices, current does not concentrate at the continuous portions 22c, 22d and 22e, so that sufficient durability of the electrolytic erosion preventing insulated rolling bearing can be ensured. It is preferable that the apex angles of the continuous portions 22c, 22d and 22e are large, provided it can be ensured that the distance L between the surface of the insulating coating 6e coating the internal rim of the partial cone concave surface 35a and the housing 15b is 1 mm or more (preferably 2 mm or more). Conversely, if the apex angles of the continuous portions 22c, 22d and 22e exceed 175 degrees, it is difficult to ensure the distance L. Accordingly, it is practical to limit the apex angles of the continuous portions 22c 22d and 22e to 175 degrees or less. The fact that in the case where the thickness of the insulating coating 6e is less than 0.5 mm, or in particular less than 0.3 mm, the effects of the invention become significant, is similar to the aforementioned case of the seventh example of the embodiment.

Ninth Example of the Embodiment

Figure 13:
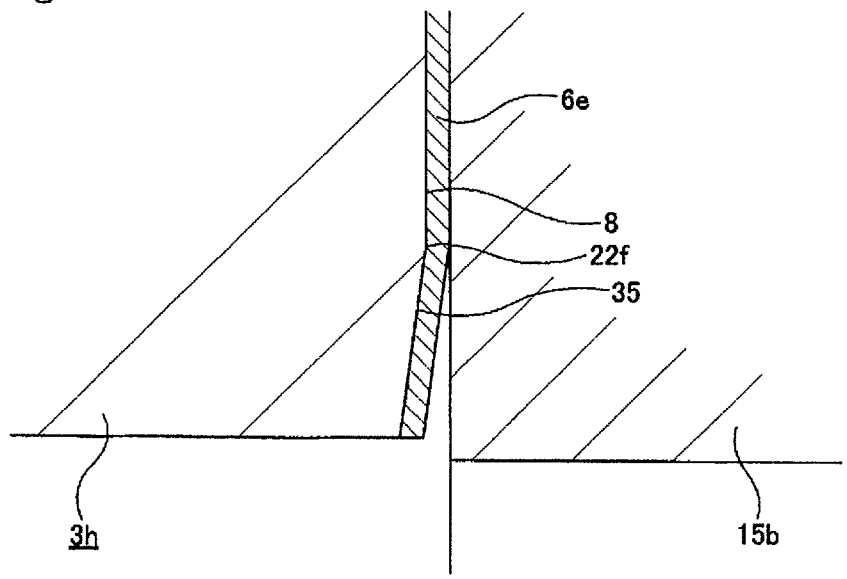
FIG. 13 shows a ninth example of the same, which is a diagram similar to FIG. 11.

FIG. 13 shows a ninth example of the embodiment of the present invention. In the case of the present example, the indented part formed as a part drawn towards the inner diameter of the axial end face 8 of the outer ring 3h, being the coated bearing ring, is a single partial cone concave surface 35, whose generatrix shape is a straight line. The apex angle of the continuous portion 22f between the partial cone concave surface 35 and the axial end face 8 of the outer ring 3h is 150 degrees or more. In the case of the present example also, it is possible to prevent sparking from occurring between the continuous portion 22f and the housing 15b, and ensure sufficient durability of the electrolytic erosion preventing insulated rolling bearing. The structures and effects of the other parts are similar to the seventh example and the eighth example.

Tenth Example of the Embodiment

Figure 14:
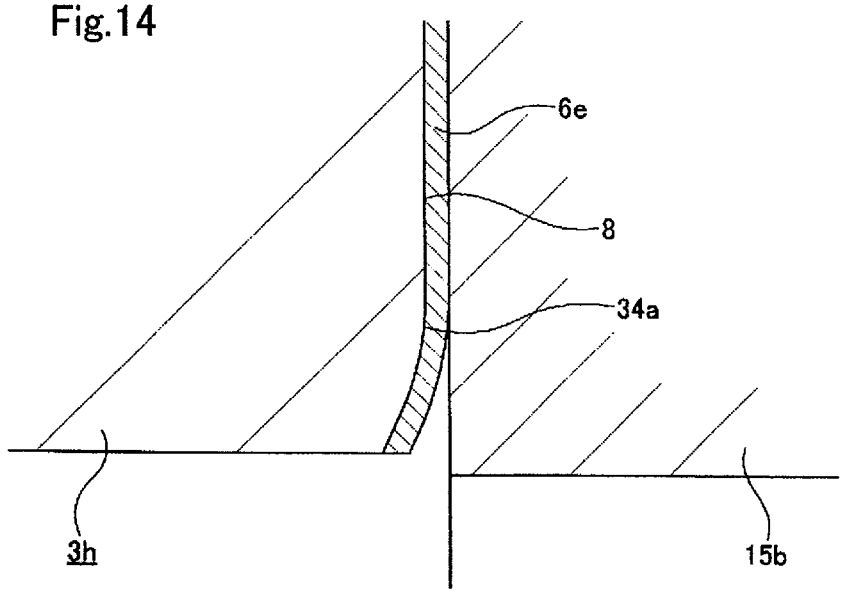
FIG. 14 shows a tenth example of the same, which is a diagram similar to FIG. 11.

FIG. 14 shows a tenth example of the embodiment of the present invention. In the case of the present example, the indented part formed as a part drawn towards the inner diameter of the axial end face 8 of the outer ring 3h, being a coated bearing ring, is a convex surface 34a, whose generatrix shape is a partial circle. The generatrix of the axial end face 8 is located tangential to the generatrix of the convex surface 34a. In the present example also, it is possible to prevent sparking from occurring between the outer ring 3h and the housing 15b, including the continuous portion of the convex surface 34a and the axial end face 8, and ensure sufficient durability of the electrolytic erosion preventing insulated rolling bearing. The structures and effects of the other parts are similar to the seventh example and the eighth example.

Eleventh Example of the Embodiment

FIG. 15 shows an eleventh example of the embodiment of the present invention. In an electrolytic erosion preventing insulated rolling bearing 36 of the present example, an inner ring 1f, in which an inner ring raceway 2 is formed in its outer peripheral surface, and an outer ring 3h, in which an outer ring raceway 4 is formed in its inner peripheral surface, are placed concentrically with each other, and a plurality of rolling elements 5 is provided between the inner ring raceway 2 and the outer ring raceway 4 in a state in which they are retained by a cage 37 such that they can roll freely. Furthermore, an inner diameter side insulating coating 38 is formed on the inner peripheral surface and the two axial end faces of the inner ring 1f, so that in a state where the inner ring 1f is fitted outside an inner diameter side mating component such as a rotating shaft, current is prevented from flowing between the inner ring 1f and the inner diameter side mating component. Moreover an outer diameter side insulating coating 39 is formed on the outer peripheral surface and the two axial end faces of the outer ring 3h, so that in a state where the outer ring 3h is fitted inside an outer diameter side mating component such as a housing, current is prevented from flowing between the outer ring 3h and the outer diameter side mating component. A ceramic sprayed layer is used in the present example for the inner diameter side and the outer diameter side insulating coatings 38 and 39.

In the case of such an electrolytic erosion preventing insulated rolling bearing, in a state in which the inner ring 1f, being a coated bearing ring, is fitted outside the metal rotating shaft, and the outer ring 3h is fitted inside the metal housing, the inner diameter side and outer diameter side insulating coatings 38 and 39 insulate the housing from the rotating shaft. As a result, current does not flow between the housing and the rotating shaft, which prevents electrolytic erosion as mentioned previously from occurring in each of the components 1f, 3h and 5 of the rolling bearing.

In the case of the present example, indications 40a and 40b, which are characters or reference symbols indicating property or history information, of the electrolytic erosion preventing insulated rolling bearing 36, are marked on part of the outer peripheral surface of the inner ring 1f, and part of the inner peripheral surface of the outer ring 3h, which constitute the electrolytic erosion preventing insulated rolling bearing 36 as described above. Firstly, regarding the outer ring 3h, the indication 40a is marked on the inner peripheral surface of an outer ring shoulder portion 41 of one {right one of FIG. 15 (C)} of a pair of outer ring shoulder portions 41, which sandwich the outer ring raceway 4 formed in the central part of the inner peripheral surface of the outer ring 3h from the two axial direction sides, using an air marker or a laser marker. Furthermore, regarding the inner ring 1f, the indication 40b is marked on the outer peripheral surface of an inner ring shoulder portion 42 of one {right one of FIG. 15 (D)} of a pair of inner ring shoulder portions 42, which sandwich the inner ring raceway 2 formed in the central part of the outer peripheral surface of the inner ring 1f from the two axial direction sides, by a similar method. The two indications 40a and 40b are marked on parts as close as possible to the axial direction center of the inner ring if and the outer ring 3h, within a range in which they do not have an adverse effect on the two raceways 2 and 4 by becoming start points of discharge, in order to keep the possibility of having an adverse effect on the electrolytic erosion preventing capabilities as low as possible. Accordingly, the parts of the outer peripheral surface of the inner ring shoulder portion 42 and the inner peripheral surface of the outer ring shoulder portion 41 on which the two indications 40a and 40b are marked, are covered by the cage 37 in a state in which the electrolytic erosion preventing insulated rolling bearing 36 is installed.

In the case of the electrolytic erosion preventing insulated rolling bearing 36 of the present example constructed as above, it is possible to mark the indications 40a and 40b of the characters or reference symbols indicating property or history information, without reducing the electrolytic erosion prevention capabilities. That is, on both of the inner ring 1f and the outer ring 3h, since the two indications are provided on parts of the peripheral surfaces of the inner ring if and the outer ring 3h that are not coated by the inner diameter side and outer diameter side insulating coatings 38 and 39, in other words parts that are not required to be insulated from the rotating shaft or the housing, being mating surfaces, the electrolytic erosion preventing capabilities are not damaged by the markings of the indications 40a and 40b. Furthermore, the indications 40a and 40b are covered by the cage 37, but they can be identified by moving the cage 37 in the radial direction. If any problem occurs with the electrolytic erosion preventing insulated rolling bearing 36, it can be identified by disassembling the concerned electrolytic erosion preventing insulated rolling bearing 36. Therefore, the fundamental capabilities of the electrolytic erosion preventing insulated rolling bearing 36 can be ensured, while the quality of the electrolytic erosion preventing insulated rolling bearing 36 can be controlled effectively.

Twelfth Example of the Embodiment

Figure 16:
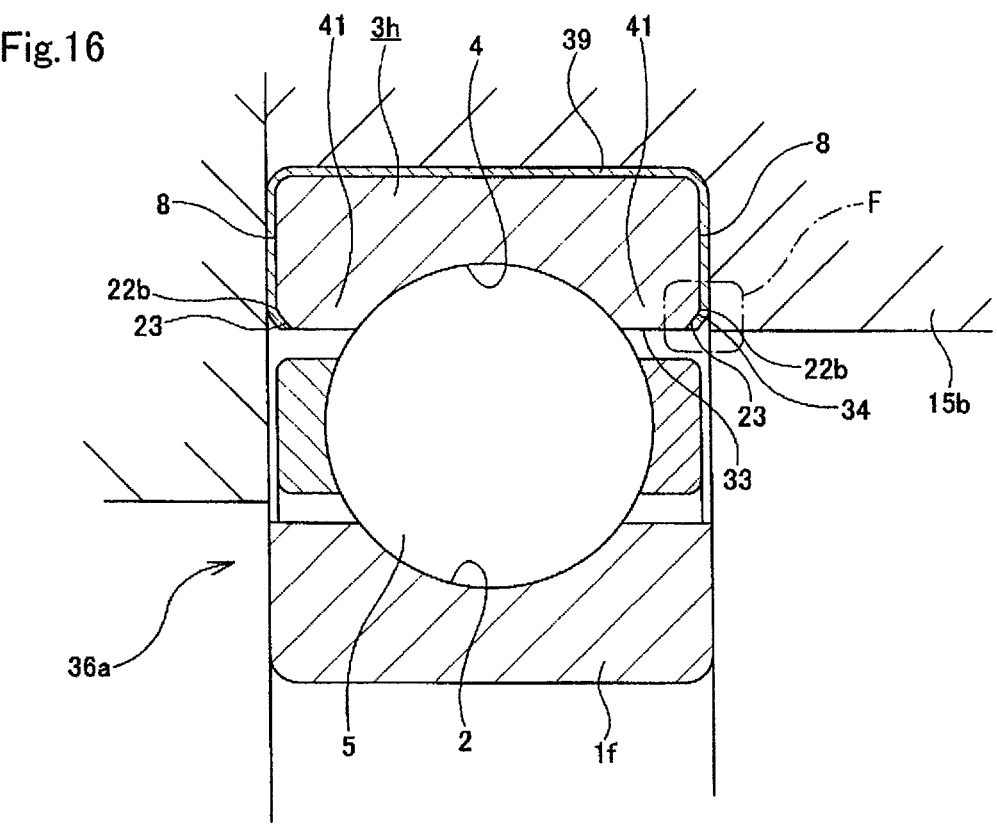
FIG. 16 is a partial sectional view of a twelfth example of the same, showing a condition installation in a housing.
Figure 17:
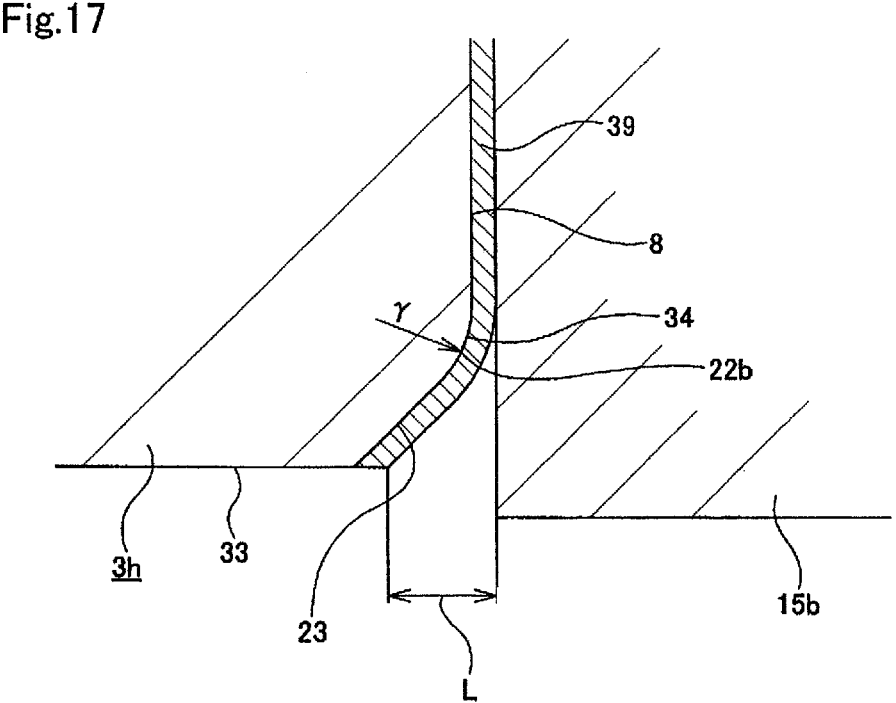
FIG. 17 is an enlarged view of section F in FIG. 16.

FIGS. 16 and 17 show a twelfth example of the embodiment of the present invention. In the case of the present example, partial cone concave chamfers 23, which are inclined at 45 degrees with respect to the central axis of the outer ring 3h, are formed between the two axial end faces 8 of the outer ring 3h and the inner peripheral surface 33. The two chamfers 23 are indented parts. Continuous portions 22b between the outer peripheral rims of the two chamfers 23 and the two axial end faces 8 are convex surfaces 34 whose cross-sections have a curve radius r for a partial circle shape of 1 mm or more. Moreover, it is ensured that the distance L between the inner peripheral edge parts of the two chamfers 23 and the axial end faces 8 (or between the surface of an outer diameter side insulating coating 39 coating the inner peripheral edge parts of the two chamfers 23 and the surface of the outer diameter side insulating coating 39 coating the two axial end faces 8) in the axial direction of the outer ring 3h, which is equal to the distance between the surface of the outer diameter side insulating coating 39 coating the inner peripheral edge part of the chamfer 23, and the housing 15b. Indications which are characters or reference symbols indicating property or history information of the electrolytic erosion preventing insulated rolling bearing 36a, are marked on the inner peripheral surface {refer to FIG. 15 (C)} of the outer ring shoulder portion 41, similarly to the case of the eleventh example of the embodiment.

According to the construction of the present example constructed as above, even in the case where current flows between the outer ring 3h and the housing 15b, which is made from conductive material and makes contact with the outer ring 3h, the amount of current concentrated at the continuous portions 22b facing the housing 15b is limited. That is, the continuous portions 22b are partial circle shape convex surfaces 34 whose cross-sections have a curve radius r of 1 mm or more, and are not vertices, so that the amount of current concentrated at the continuous portions 22b can be limited. Therefore, a voltage (1000 VDC or less) that is applied to an electrolytic erosion preventing insulated rolling bearing installed in a rotation support portion of a rotating shaft of an electric motor for general purposes, or rail car, or a rotating shaft of an electrical generator, would be unlikely to produce sparking between the continuous portions 22b and the housing 15b. As a result, it is possible to ensure sufficient durability of the electrolytic erosion preventing insulated rolling bearing.

When the present inventor changed the curve radius r in four steps of 0.6 mm, 1.0 mm, 1.2 mm and 1.5 mm, and applied a DC voltage of 1000 V between the outer ring 3h and the housing 15b, in the case where the curve radius r was 0.6 mm, sparking occurred at the continuous portions 22b, whereas in the cases where the curve radius r was 1.0 mm, 1.2 mm and 1.5 mm, sparking did not occur. In the experiment, the material of the outer diameter side insulating coating 39 was white alumina, and the thickness was 0.2 mm. Furthermore, the distance L between the surface of the outer diameter side insulating coating 39 coating the inner peripheral edge of the chamfer 23, and the housing 15b was 1.0 mm.

As is evident from the experiment, in the case of the present example, even if the outer diameter side insulating coating 39 is not particularly thick (for example, even if it is 0.5 mm or less, or even 0.3 mm or less), it is possible to prevent sparking from occurring between the outer ring 3h and the housing 15b made from conductive material. Therefore, even in the case where the usage conditions are critical, it is possible to realize an electrolytic erosion preventing insulated rolling bearing that can prevent electrolytic erosion sufficiently effectively, with low cost. The curve radius r of the cross-section of the continuous portion 22b is preferably 2 mm or more. That is, it is preferable to make the value of the curve radius r large provided it can be ensured that the distance L between the surface of the outer diameter side insulating coating 39 coating the inner peripheral edge of the chamfer 23 and the housing 15b is 1 mm or more (preferably 2 mm or more). Provided the distance L can be ensured, a large value such as 100 mm can also be used for the curve radius r.

In the case of the present example, different to the aforementioned eleventh example of the embodiment, the inner diameter side insulating coating is not provided on the inner rig 1f, but may be provided if desired. The structures and effects of the other parts are similar to the eleventh example of the embodiment, and hence duplicate description is omitted.

Thirteenth Example of the Embodiment

Figure 18:
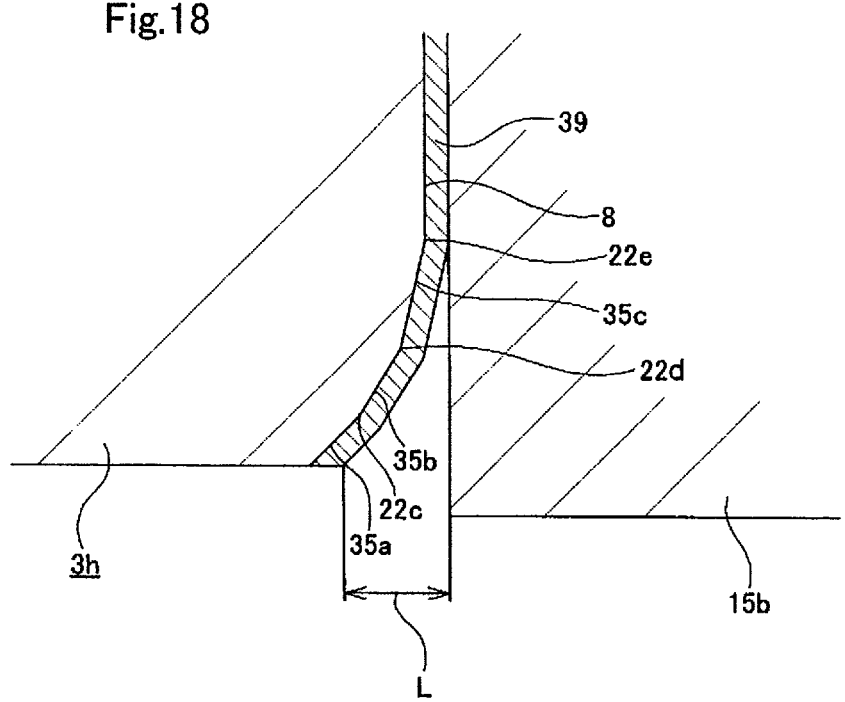
FIG. 18 shows a thirteenth example of the present invention, which is a diagram similar to FIG. 17.

FIG. 18 shows a thirteenth example of the embodiment of the present invention. In the case of the present example, the indented part formed as a part drawn towards the inner diameter of the axial end face 8 of the outer ring 3h, being a coated bearing ring, is a plurality (three in the example in the figure) of joined partial cone concave surfaces 35a, 35b and 35c, whose angles of inclination with respect to the central axis of the outer ring 3h, being a coated bearing ring, are different, and the generatrix shapes of which are straight lines. The apex angles of the continuous portions 22c, 22d and 22e between the adjacent partial cone concave surfaces 35a, 35b and 35c, and between the partial cone concave surface 35c, which is located closest to the outer diameter side, and the axial end face 8, are all 150 degrees or more (preferably 165 degrees or more). Furthermore, in the case of the present example, it is ensured that the distance L between the surface of the outer diameter side insulating coating 39 coating the internal rim of the partial cone concave surface 35a which is located closest to the inner diameter, and the housing 15b is 1 mm or more (preferably 2 mm or more). Indications which are characters or reference symbols indicating property or history information of the electrolytic erosion preventing insulated rolling bearing, are marked on the inner peripheral surface {refer to FIG. 15 (C)} of the outer ring shoulder portion 41, similarly to the case of the eleventh example of the embodiment, and the twelfth example of the embodiment.

Using the construction of the present example constructed as above also, even in the case where current flows between the outer ring 3h and the housing 15b, which is made from conductive material and makes contact with the outer ring 3h, the concentration of current at the continuous portions 22c, 22d and 22e facing the housing 15b is limited. That is, since the continuous portions 22c, 22d and 22e, whose angles are 150 degrees or more (preferably 165 degrees or more) are not vertices, current does not concentrate at the continuous portions 22c, 22d and 22e, so that sufficient durability of the electrolytic erosion preventing insulated rolling bearing can be ensured. It is preferable that the angles of the continuous portions 22c, 22d and 22e are large, provided it can be ensured that the distance L between the surface of the outer diameter side insulating coating 39 coating the internal rim of the partial cone concave surface 35a and the housing 15b is 1 mm or more (preferably 2 mm or more). Conversely, if the angles of the continuous portions 22c, 22d and 22e exceed 175 degrees, it is difficult to ensure the distance L. Accordingly, it is practical to limit the angles of the continuous portions 22c, 22d and 22e to 175 degrees or less. The fact that in the case where the thickness of the outer diameter side insulating coating 39 is less than 0.5 mm, or in particular less than 0.3 mm, the effects due to the apex angle being large become significant, is similar to the aforementioned case of the twelfth example of the embodiment.

Fourteenth Example of the Embodiment

Figure 19:
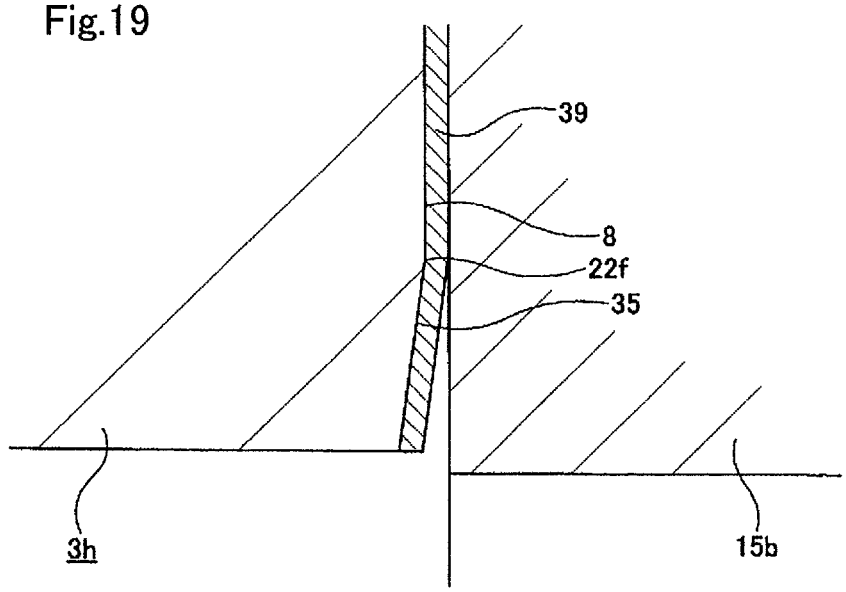
FIG. 19 shows a fourteenth example of the same, which is a diagram similar to FIG. 17.

FIG. 19 shows a fourteenth example of the embodiment of the present invention. In the case of the present example, the indented part formed as a part drawn towards the inner diameter of the axial end face 8 of the outer ring 3h, being the coated bearing ring, is a single partial cone concave surface 35, whose generatrix shape is a straight line. The apex angle of the continuous portion 22f between the partial cone concave surface 35 and the axial end face 8 of the outer ring 3h is 150 degrees or more. In the case of the present example also, it is possible to prevent sparking from occurring between the continuous portion 22f and the housing 15b, and ensure sufficient durability of the electrolytic erosion preventing insulated rolling bearing. Indications which are characters or reference symbols indicating property or history information of the electrolytic erosion preventing insulated rolling bearing, are marked on the inner peripheral surface {refer to FIG. 15 (C)} of the outer ring shoulder portion 41, similarly to the case of the eleventh and twelfth examples of the embodiment, and the thirteenth example of the embodiment. The structures and effects of the other parts are similar to the eleventh and twelfth examples of the embodiment, and the thirteenth example of the embodiment.

Fifteenth Example of the Embodiment

Figure 20:
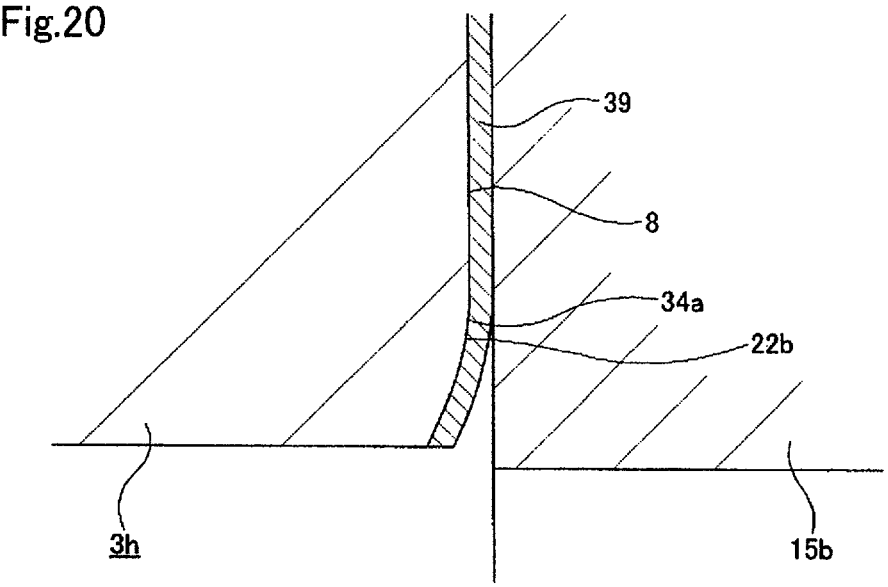
FIG. 20 shows a fifteenth example of the same, which is a diagram similar to FIG. 17.

FIG. 20 shows a fifteenth example of the embodiment of the present invention. In the case of the present example, the indented part formed as a part drawn towards the inner diameter of the axial end face 8 of the outer ring 3h, being a coated bearing ring, is a convex surface 34a, whose generatrix shape is a partial circle. The generatrix of the axial end face 8 is located tangential to the generatrix of the convex surface 34a. In the present example also, it is possible to prevent sparking from occurring between the outer ring 3h and the housing 15b, including the continuous portion 22b of the convex surface 34a and the axial end face 8, and ensure sufficient durability of the electrolytic erosion preventing insulated rolling bearing. Indications which are characters or reference symbols indicating property or history information of the electrolytic erosion preventing insulated rolling bearing, are marked on the inner peripheral surface {refer to FIG. 15 (C)} of the outer ring shoulder portion 41, similarly to the case of the eleventh to thirteenth examples of the embodiment, and the fourteenth example of the embodiment. The structures and effects of the other parts are similar to the eleventh to thirteenth examples of the embodiment, and the fourteenth example of the embodiment.

Sixteenth Example of the Embodiment

Figure 21:
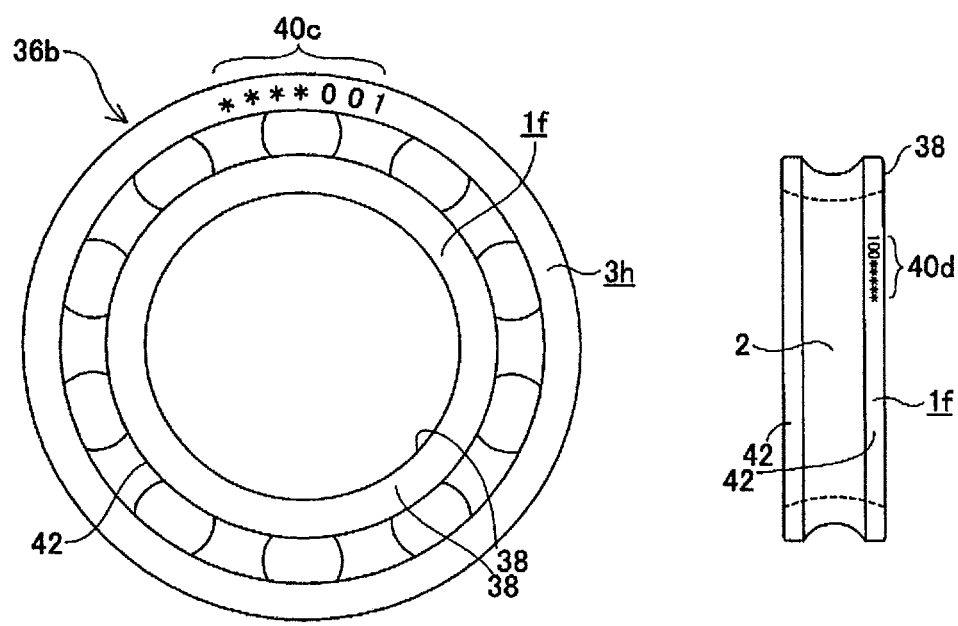
FIG. 21 shows a sixteenth example of the same, wherein (A) is a side view showing the whole, and (B) is a view of the removed inner ring seen from the side of (A).

FIG. 21 shows a sixteenth example of the embodiment of the present invention. In the case of the present example, the inner peripheral surface and the two axial end faces of the inner ring 1f are coated with an inner diameter side insulating coating 38. However the surface of the outer ring 3h is not coated by an insulating coating, so the metal material (bearing steel) forming the outer ring 3h is exposed. That is, in the case of the present example, the inner ring 1f is a coated bearing ring, and the outer ring 3h is an exposed bearing ring. Indication 40c indicating characters or reference symbols indicating property or history information of an electrolytic erosion preventing insulated rolling bearing 36b containing the outer ring 3h is marked on the axial end face of the outer ring 3h. Furthermore, in the case of the present example, a second indication 40d of the characters or reference symbols, corresponding to the indication 40c marked on the outer ring 3h, is marked on the outer peripheral surface of the inner ring shoulder portion 42 of the surface of the inner ring 1f, which is not coated by an insulating coating.

In the present example, the insulation between the rotating shaft and the housing is only the inner diameter side insulating coating 38. There is no insulation between the outer ring 3h and the housing. In the case of such an example, since the marking of the indications 40c and 40d is provided on a part for which insulation from its mating surface being a rotating shaft or housing is not required, the electrolytic erosion preventing capabilities are not damaged by the existence of the marking of the indications 40c and 40d. Since the indication 40c marked on the outer ring 3h is provided on a conspicuous part of the axial end face of the outer ring 3h, quality control and the like of the erosion preventing insulated rolling bearing 36b can be easily performed.

Moreover, in the case of the present example, since the indication 40d corresponding to the indication 40c marked on the outer ring 3h is marked on the inner ring 1f, being the coated bearing ring, in a state in which the electrolytic erosion preventing insulated rolling bearing 36b is used, the inner ring if and the outer ring 3h can be matched correctly. For example, in the case where the electrolytic erosion preventing insulated rolling bearing 36b is a tapered roller bearing, the electrolytic erosion preventing insulated rolling bearing 36b manufactured in a bearing factory is sometimes transported to a manufacturing factory of electric motors, electrical generators, or the like, in a state in which it is disassembled, and then assembled in the manufacturing factory. In such a case, if the indication 40d is marked, the inner ring 1f and the outer ring 3h can be matched correctly, so that it is possible for sufficient capabilities of the electrolytic erosion preventing insulated rolling bearing 36b to be exhibited. The structures and effects of the other parts are similar to the eleventh example of the embodiment. In the present example, it is also preferable that the shape of the rim of the inner diameter side insulating coating 38 is of a shape as shown in FIGS. 16 to 20 (with the inside and outside reversed in the radial direction).

Seventeenth Example of the Embodiment

Figure 22:
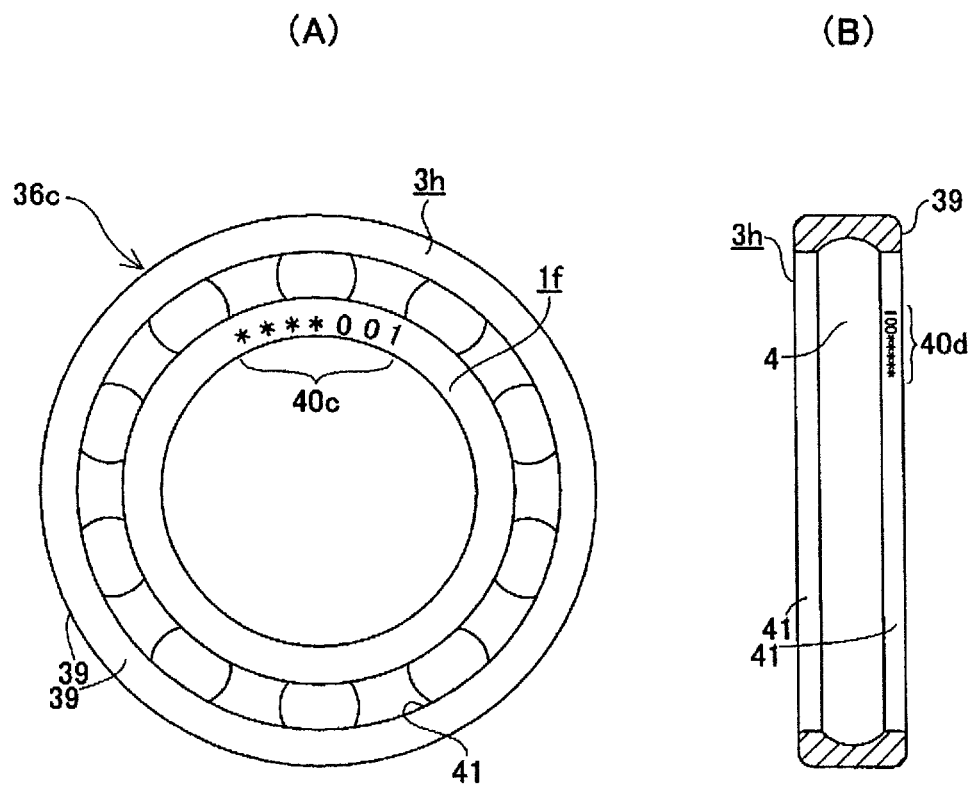
FIG. 22 shows a seventeenth example of the same, wherein (A) is a side view showing the whole, and (B) is a cross-section showing the removed outer ring.

FIG. 22 shows a seventeenth example of the embodiment of the present invention. In the case of the present example, the outer peripheral surface and the two axial end faces of the outer ring 3h are coated with an outer diameter side insulating coating 39. However, the surface of the inner ring 1f is not coated by an insulating coating, so the metal material (bearing steel) forming the inner ring if is exposed. That is, in the case of the present example, the outer ring 3h is a coated bearing ring, and the inner ring 1f is an exposed bearing ring. Indication 40c indicating characters or reference symbols indicating property or history information of an electrolytic erosion preventing insulated rolling bearing 36c containing the inner ring 1f is marked on the axial end face of the inner ring 1f. Furthermore, in the case of the present example, a second indication 40d of the characters or reference symbols, corresponding to the indication 40c marked on the inner ring 1f, is marked on the inner peripheral surface of the outer ring shoulder portion 41 of the outer ring 3h. The structures and effects other than that the coated bearing ring and the exposed bearing ring are reversed between the inside and outside, are similar to the case of the sixteenth example. In the present example, it is also preferable that the shape of the rim of the outer diameter side insulating coating is of a shape as shown in FIGS. 16 to 20.

Working Example 1

There follows a description of experiments performed in order to confirm the effects of the present invention. The following is described with reference to FIGS. 1 to 3. First is a description of an experiment performed in order to determine the influence of the thickness of the ceramic sprayed layer and the content by percentage of alumina in the ceramic sprayed layer on non-uniformity in the thickness of the ceramic sprayed layer and the insulating characteristics. An outer ring 3 (inner diameter of the outer ring: 142 mm) constituting a single row deep groove ball bearing (outer diameter: 170 mm, inner diameter: 80 mm, width: 39 mm), whose bearing designation was 6316, was used in this experiment.

First is a description of an experiment performed in order to determine the influence of the thickness dimensions $T_7$ and $T_8$ of the ceramic sprayed layers formed on the outer peripheral surface 7 and the two axial end faces 8 of the outer ring 3 (non-uniformity in the thickness) on the thickness dimension $T_9$ of the two continuous folded over portions 9. In this experiment, the thickness dimensions $T_7$ and $T_8$ ($T_7 \neq T_8$) of the ceramic sprayed layers formed on the outer peripheral surface 7 and the two axial end faces 8 of the outer ring 3 were changed in eight steps between 0.15 and 0.60 mm, and the thickness dimension $T_9$ of the two continuous folded over portions 9 was measured. The results of the experiment are shown in FIG. 23. As is evident from FIG. 23, the smaller the thickness dimensions $T_7$ and $T_8$ of the ceramic sprayed layers formed on the respective surfaces 7 and 8, the smaller the thickness dimension $T_9$ of the two continuous folded over portions 9 becomes. However, if the thickness dimensions $T_7$ and $T_8$ of the ceramic sprayed layers formed on the relative surfaces 7 and 8 increase, the thickness dimension $T_9$ of the two continuous folded over portions 9 increases along a quadratic curve. This confirmed that it is important to limit the thickness dimensions $T_7$ and $T_8$ of the ceramic sprayed layers formed on the respective surfaces 7 and 8 in order to limit the thickness dimension $T_9$ of the two continuous folded over portions 9.

Figure 24:
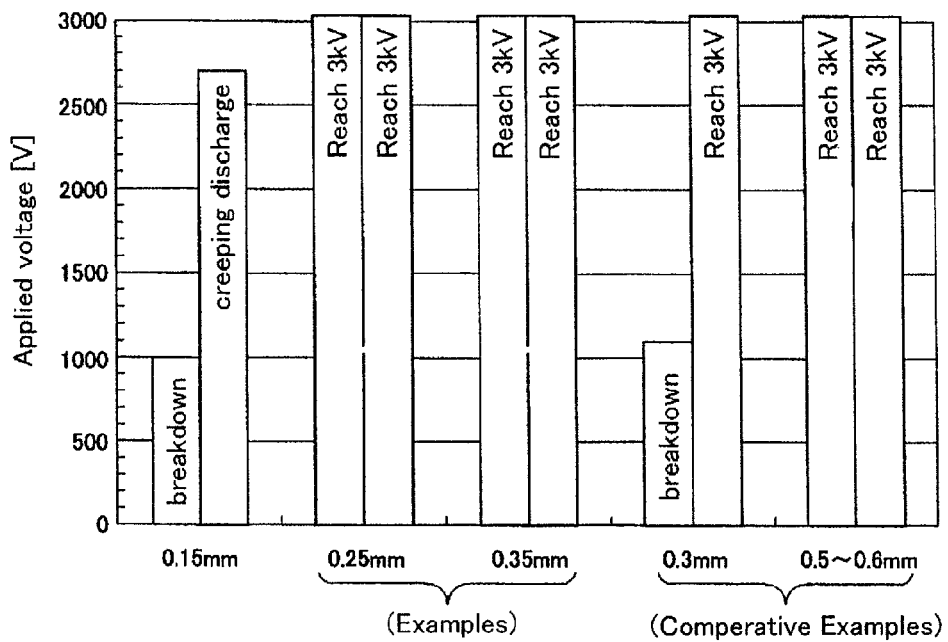
FIG. 24 is a bar graph showing the results of withstand voltage test performed in order to confirm the effects of the present invention.

Next is a description of an experiment performed in order to confirm that even if the thickness dimension of the insulating coating 6a is reduced, sufficient insulation performance can be obtained by using a ceramic sprayed layer containing alumina at 99 percent by weight or more. For the insulating coating 6a prepared, a ceramic sprayed layer which contained alumina at 99 percent by weight and titanium oxide at 0.04 percent by weight, and to which sealing with synthetic resin had been applied, was ground afterwards to thickness dimensions $t_7$ and $t_8$ ($t_7 \neq t_8$) at three dimensions of 0.15, 0.25 and 0.35 mm. Furthermore, similarly to the conventional, ceramic sprayed layers with low alumina content (alumina content of 94 percent by weight and titanium oxide content of 2.4 percent by weight), with thickness dimensions of 0.3 mm and 0.5 to 0.6 mm, were prepared. A withstand voltage test was performed on each of them, wherein a DC voltage applied to the two sides of the insulating coating was increased gradually. The maximum value of the voltage applied was 3000 V. Two test samples of each type, 10 in total, were prepared. Furthermore, the abovementioned sealing with synthetic resin used bisphenol F epoxy resin as its main component, which is described as a working example 1 in the specification of the aforementioned Patent Document 7. The results of the experiment performed in this manner are shown in FIG. 24.

Even in the case where a ceramic sprayed layer containing alumina at 99 percent by weight or more was used, when the thickness dimensions $t_7$ and $t_8$ of the insulating coating 6a were 0.15 mm, creeping discharge was confirmed at 1000 V or 2700 V, and it was proved that 0.15 mm is insufficient for the thickness dimensions of $t_7$ and $t_8$. However, in the case of thickness dimensions $t_7$ and $t_8$ of 0.25 mm, and in the case of 0.35 mm, even with the maximum applied voltage of 3000 V, sufficient insulating characteristics could be ensured. This confirmed that if a ceramic sprayed layer containing alumina at 99 percent by weight or more is used, and it is ensured that the thickness dimensions $t_7$ and $t_8$ are 0.25 mm or more, sufficient insulating characteristics can be ensured. In addition, in the case of an insulating coating made from a ceramic sprayed layer in which the content by percentage of alumina was 94 percent by weight, which is lower than the case of the present invention, some samples exhibited dielectric breakdown at a voltage of 1100 V, and some samples did not exhibit dielectric breakdown even at 3000 V. It was found that in order to ensure sufficient insulating characteristics even when the proportion of alumina is as low as mentioned above, it must be ensured that the thickness dimension of the insulating coating is approximately 0.5 to 0.6 mm.

Moreover, an experiment will be described which was performed in order to determine the influence of the purity (content by percentage of alumina in the ceramic sprayed layer on the water absorptivity of the ceramic sprayed layer. In this experiment, by grinding the ceramic sprayed layer on which sealing with synthetic resin had been pre-applied similarly to the previous case, an insulating coating with a desired thickness was formed on the surface of the outer ring 3 of a single row deep groove ball bearing, whose bearing designation was 6316. Three purities of alumina, 94 percent by weight (content of titanium oxide: 2.4 percent by weight), 98 percent by weight (similarly: 0.8 percent by weight), and 99 percent by weight (similarly: 0.04 percent by weight), were prepared, and the thickness was adjusted appropriately according to the purity such that the resistance value was approximately 5000 MΩ in dry conditions immediately after formation. To be specific, in the case of 94 percent by weight, it was 0.3 mm, and in the case of 98 percent by weight and 99 percent by weight, it was 0.25 mm. These three samples were soaked in warm water at 80° C. for one hour, and after removing the moisture attached to the surfaces, the resistance value was measured between the inner peripheral surface (not coated with insulating coating) of the outer ring 3, and the outer peripheral surface thereof that was coated with the insulating coating.

Figure 25:
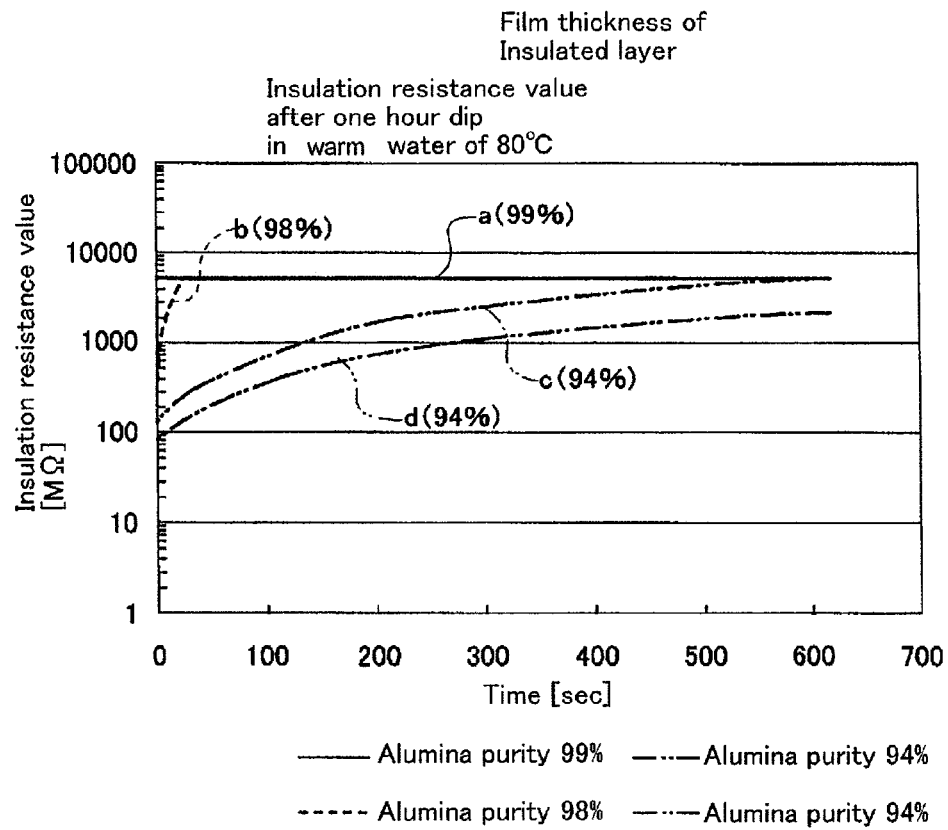
FIG. 25 is a line chart showing the influence of the alumina purity on the water-absorbing property of ceramic spraying layer.

The results of the experiment performed in this manner are shown in FIG. 25. In FIG. 25, a solid line "a", a broken line "b", and chain lines "c" and "d" show the case of the purity of alumina being 99 percent by weight, the case of the same being 98 percent by weight, and cases of the same being 94 percent by weight, respectively. The solid line "a" indicates that the resistance value reached 5000 MΩ immediately after the measurement of the resistance value started in the case where the purity of alumina in the insulating coating was 99 percent by weight. Furthermore, the broken line "b" indicates that in the case of 98 percent by weight similarly, the resistance value reached 5000 MΩ after approximately 30 seconds had elapsed after starting the measurement of the resistance value. Moreover, the chain lines "c" and "d" indicate that in the case of 94 percent by weight similarly, some reached 5000 MΩ after approximately 10 minutes had elapsed after starting the measurement of the resistance value, but some only increased to about 2000 MΩ. A reason that may be considered for the resistance value increasing as time elapsed is that the moisture soaked into the insulating coating evaporated due to the heating caused by the current of the resistance measurement.

As is evident from the experiment whose results are shown in FIG. 25, the higher the purity of the alumina in the insulating coating, the more difficult it is for the insulating coating to absorb water. In particular, it is proved that in the case where the purity is 99 percent by weight, it hardly absorbs moisture, so even in the case where there is a possibility that it is used in an area to which there is a possibility that moisture becomes attached, or in a high humidity atmosphere, excellent insulating characteristics can always be obtained.

Working Example 2

Experiments performed in order to confirm the effects of titanium oxide content of 0.01 to 0.1 percent by weight in the present invention will be described. First is a description of an experiment performed in order to confirm that by limiting the amount of titanium oxide mixed in the ceramic sprayed layer, and making the particle size of the alumina small, improvement in accuracy related to the thickness dimension of the ceramic sprayed layer, and improvement in deposition efficiency of alumina, can be achieved. In this experiment also, an outer ring 3 (inner diameter of the outer ring: 142 mm) constituting a single row deep groove ball bearing (outer diameter: 170 mm, inner diameter: 80 mm, width: 39 mm), whose bearing designation was 6316, was used.

An operation for forming a ceramic sprayed layer was performed with an aim of forming a sprayed layer with a thickness of 0.3 mm on the outer peripheral surface of the outer ring and the two axial end faces constituting the ball bearing. As a result, it was confirmed that the dispersion of the thickness could be limited to 0.04 mm or less (0.08 mm on the diameter of the sprayed layer that coated the outer peripheral surface) while maintaining sufficient yield of the material. In the case of a conventionally used ceramic sprayed layer in which alumina is its main component, and titanium oxide is incorporated at approximately 3 percent by weight, it was necessary to make the thickness approximately 0.7 to 0.8 mm in order to maintain the required insulation performance. In the case where the ceramic sprayed layer with such thickness was formed using ceramic particles whose particle size was approximately 30 to 75 μm, the dispersion of the thickness of the ceramic sprayed layer obtained reached approximately 0.15 to 0.2 mm. The ceramic sprayed layer needed to have finishing applied to the surface after sealing with synthetic resin. However, the larger the dispersion of the thickness, the more troublesome the time and labor required for the finishing became. In the case where the above-described experiment result was investigated with consideration of this issue, in the case of the present invention, it was proved that the manufacturing cost could be kept down.

Next is a description of an experiment performed in order to determine the influence of the content of titanium oxide on the insulation resistance of the insulating coating, being a ceramic sprayed layer. In this experiment also, an outer ring 3 (refer to FIG. 1 to FIG. 3) constituting a single deep groove ball bearing, whose bearing designation was 6316, was used.

An insulating coating made from a ceramic sprayed layer was formed on the outer ring 3 using 5 types of materials in which the main components were alumina, and the contents of titanium oxide were respectively 0.01 percent by weight (alumina content: more than 99.7 percent by weight), 0.04 percent by weight (ditto: 99.7 percent by weight), 0.2 percent by weight (ditto: 99.3 percent by weight), 0.4 percent by weight (ditto: 98.8 percent by weight), and 3 percent by weight (ditto: 95 percent by weight). The thickness of the insulating coating was 0.3 mm (target value). In each case, the resistance value was measured when a voltage of 1000 V (DC) was applied. The sealing with synthetic resin was the same as in the case of working example 1 described previously.

Figure 26:
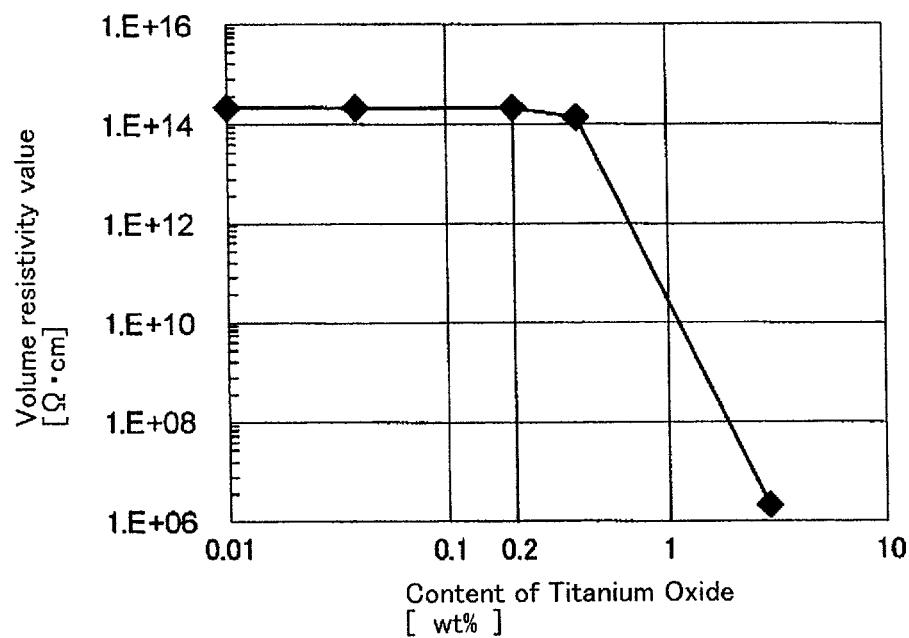
FIG. 26 is a line chart showing the results of an experiment performed in order to determine the influence of the amount of titanium oxide content on the resistance value related to the present invention (containing 0.01 to 0.2 weight percent of titanium oxide).

As a result, the resistance value (volume resistivity value) became $2.76 \times 10^{14} \Omega \cdot cm$ in the case where the content of titanium oxide was 0.01 percent by weight, $2.34 \times 10^{14} \Omega \cdot cm$ in the case of 0.04 percent by weight of the same, $2.02 \times 10^{14} \Omega \cdot cm$ in the case of 0.2 percent by weight of the same, $1.62 \times 10^{14} \Omega \cdot cm$ in the case of 0.4 percent by weight of the same, and $2.18 \times 10^{6} \Omega \cdot cm$ in the case of 3 percent by weight of the same. FIG. 26 shows the results of the experiment performed under such conditions. As is evident from the results shown in FIG. 26, the greater the titanium oxide content, the lower the resistance value (insulation performance reduces). However, in the case where the content exceeded 0.2 percent by weight, the degree of reduction became large, and in particular, in the case where it exceeded 0.4 percent by weight, the reduction was rapid. That is, the resistance value reduced by 15% from the case where the content of titanium oxide was 0.01 percent by weight to the case of 0.04 percent by weight, 14% from 0.04 percent by weight to 0.2 percent by weight, 20% from 0.2 percent by weight to 0.4 percent by weight, and 31% from 0.04 percent by weight to 0.4 percent by weight. It reduced disproportionately from 0.4 percent by weight to 3 percent by weight.

From such experimental results, it is proved that in the case where the thickness of the insulating coating made from a ceramic sprayed layer is limited to approximately 0.3 mm, it is important to limit the content of titanium oxide to 0.2 percent by weight or less in order to maintain the necessary insulation performance. That is, in the case of 0.4 percent by weight, compared with the case of 0.2 percent by weight, the deterioration of the insulation performance accompanying the increase in the amount of titanium oxide mixed in becomes significant. Accordingly, in the case where safety is considered, it is necessary to limit the amount mixed in to 0.2 percent by weight or less.

Next is a description of an experiment performed in order to determine the influence of the content of titanium oxide in the insulating coating, being a ceramic sprayed layer, on the reduction of the resistance value. In this experiment also, an outer ring 3 constituting a single deep groove ball bearing, whose bearing designation was 6316, was used.

An insulating coating made from a ceramic sprayed layer was formed on the outer ring 3 using 2 types of materials in which the main components were alumina, and the contents of titanium oxide were respectively 0.04 percent by weight and 0.4 percent by weight. The thickness of the insulating coating was 0.3 mm (target value). In each case, salt water at 10 percent by weight was applied (by brush coating) to the surface of the insulating coating, then it was exposed to a high humidity atmosphere (almost 100% humidity) for a long time (180 days), and afterwards the resistance value was measured with 1000 V (DC) applied. The sealing with synthetic resin was the same as in working example 1 described previously. Furthermore, the salt water was applied every 30 minutes (at intervals).

Figure 27:
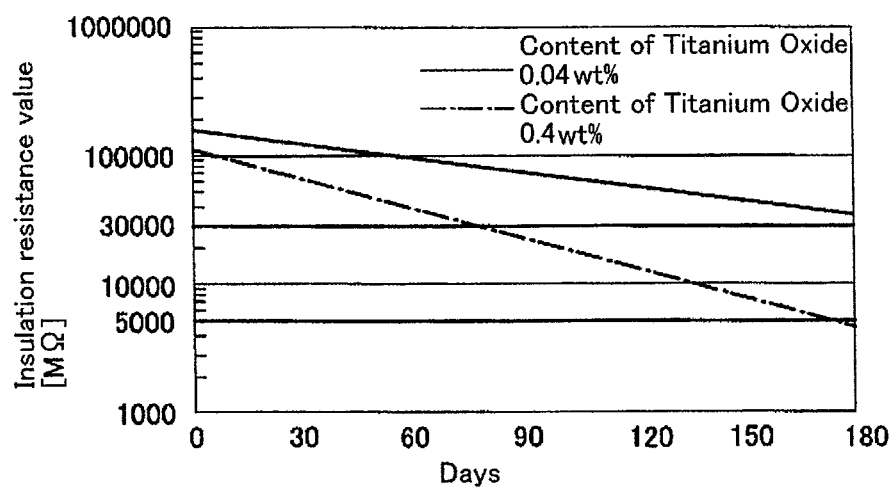
FIG. 27 is a line chart showing the results of an experiment similarly performed in order to determine the influence of the amount of titanium oxide content on the drop in the resistance value due to moisture adhesion.

FIG. 27 shows the results of the experiment performed in this manner. That is, in the case of a sample in which the content of titanium oxide was 0.04 percent by weight, even after 180 days had elapsed, it showed a resistance value of 30000 MΩ or more. However, in the case of a sample in which the content was 0.4 percent by weight, after 180 days had elapsed, it showed a resistance value of only 5000 MΩ or less. As is evident from such experimental results, it was confirmed that in relation to the reduction of the resistance value due to moisture adhesion, it is also advantageous to keep the content of titanium oxide low.

Next is a description of an experiment performed in order to determine the influence of the content of titanium oxide in the insulating coating, being a ceramic sprayed layer, on the reduction of the resistance value. In this experiment also, an outer ring 3 constituting a single deep groove ball bearing, whose bearing designation was 6316, was used.

An insulating coating made from a ceramic sprayed layer was formed on the outer ring 3 using 2 types of materials in which the main components were alumina, and the contents of titanium oxide were respectively 0.04 percent by weight and 0.4 percent by weight. The thickness of the insulating coating was 0.3 mm (target value). In each case, after it was left in an atmosphere of 160° C. for a long time (90 days), the resistance value was measured with 1000 V (DC) applied. The sealing with synthetic resin was the same as in working example 1 described previously.

Figure 28:
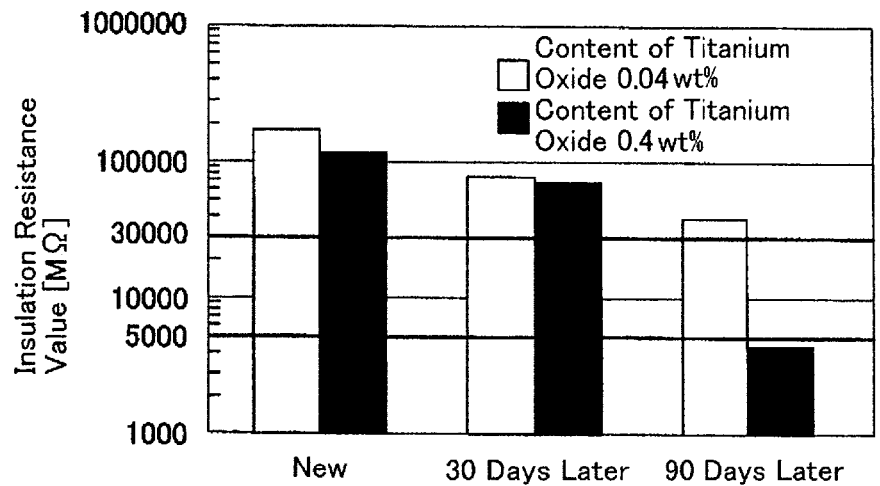
FIG. 28 is a bar graph showing the results of an experiment similarly performed in order to determine the influence of the amount of titanium oxide content on the drop in the resistance value at high temperature.

FIG. 28 shows the results of the experiment performed in this manner. As is evident from FIG. 28, in the case of a sample in which the content of titanium oxide was 0.04 percent by weight, even after 90 days had elapsed, it showed a resistance value of 30000 MΩ or more. However, in the case of a sample in which the content was 0.4 percent by weight, after 90 days had elapsed, it showed a resistance value of only 5000 MΩ or less. As is evident from such experimental results, it was confirmed that in relation to the reduction of the resistance value at a high temperature, it is also advantageous to keep the content of titanium oxide low.

As is evident from the above experimental results, in order to prevent the external appearance accompanying sealing with synthetic resin from deteriorating, even in the case where titanium oxide is mixed in the alumina, if the mixed amount is limited to 0.2 percent by weight or less, the necessary insulation resistance can be ensured. In particular, if the amount mixed in is limited to 0.05 percent by weight or less, preferably 0.04 percent by weight or less, sufficient insulation performance can be ensured even under reasonably harsh working conditions.

Working Example 3

Figure 29:
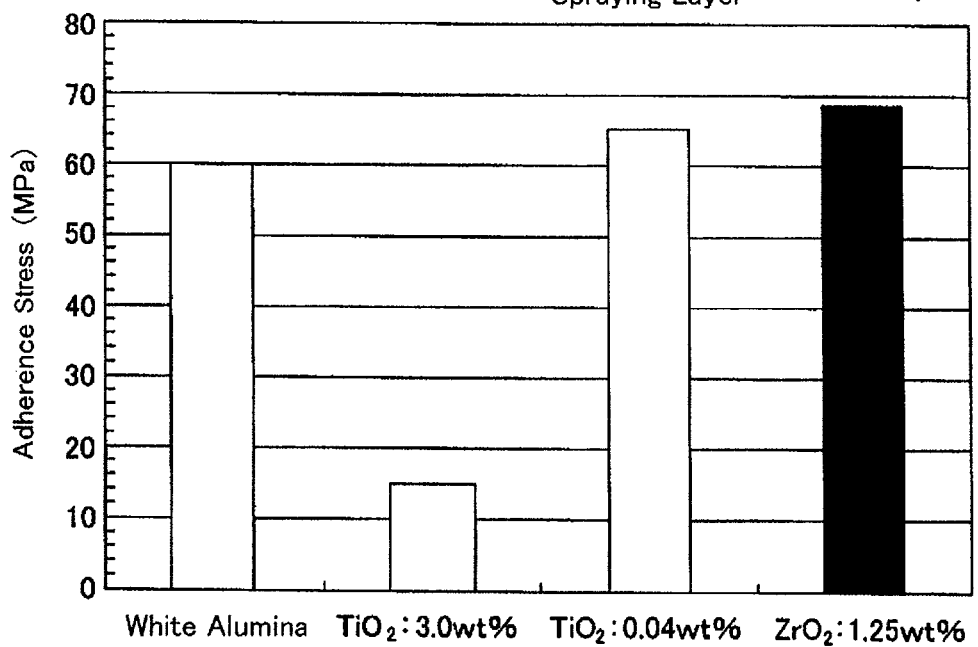
FIG. 29 is a bar graph showing the results of measurements of the adhesion of the ceramic sprayed layer related to the present invention (containing 97 weight percent or more of alumina and 0.5 to 2 weight percent of zirconia).

An experiment performed in order to confirm the effects of alumina content of 97 percent by weight or more and zirconia content of 0.5 to 2.5 percent by weight in the present invention will be described. First is a description of an experiment performed in order to check the adhesion (adhesion strength) of a ceramic sprayed layer. The experiment was performed based on the adhesion test described in JIS H 8666. Furthermore, for materials of the ceramic sprayed layer, four types were prepared, which were white alumina, grey alumina in which titanium oxide was incorporated in the alumina at 3.0 percent by weight, one in which titanium oxide was incorporated similarly at 0.04 percent by weight, and one in which zirconia was incorporated similarly at 1.25 percent by weight. In addition, an organic synthetic resin such as an epoxy type, fluorine type, or the like was used for the synthetic resin used for sealing each of the ceramic sprayed layers formed from the four materials. Moreover, the film thickness of each of the ceramic sprayed layers was 0.35 mm (350 μm). The experimental results are shown in FIG. 29. As is evident from FIG. 29, the adhesions of those that incorporated titanium oxide at 0.04 percent by weight were 60 to 64 MPa, whereas the adhesion of the one that incorporated zirconia at 1.25 percent by weight was 69 MPa, proving it to have high adhesion.

Working Example 4

Next is a description of an experiment performed in order to confirm the volume resistivity value of the ceramic sprayed layer. In the experiment, the following seven materials were used.
(1) white alumina
(2) alumina with titanium oxide incorporated at 0.04 percent by weight (alumina content: 99.7 percent by weight)
(3) similarly with titanium oxide incorporated at 0.4 percent by weight (similarly: 98.8 percent by weight)
(4) similarly with titanium oxide incorporated at 3.0 percent by weight (similarly: 95 percent by weight)
(5) similarly with zirconia incorporated at 0.5 percent by weight (similarly: 99.1 percent by weight)
(6) similarly with zirconia incorporated at 1.25 percent by weight (similarly: 98.2 percent by weight)
(7) similarly with zirconia incorporated at 2.5 percent by weight (similarly: 97 percent by weight)

An organic synthetic resin such as an epoxy type, fluorine type, or the like, was used for the synthetic resin used for sealing with synthetic resin each of the ceramic sprayed layers formed from the seven types of materials.

Figure 30:
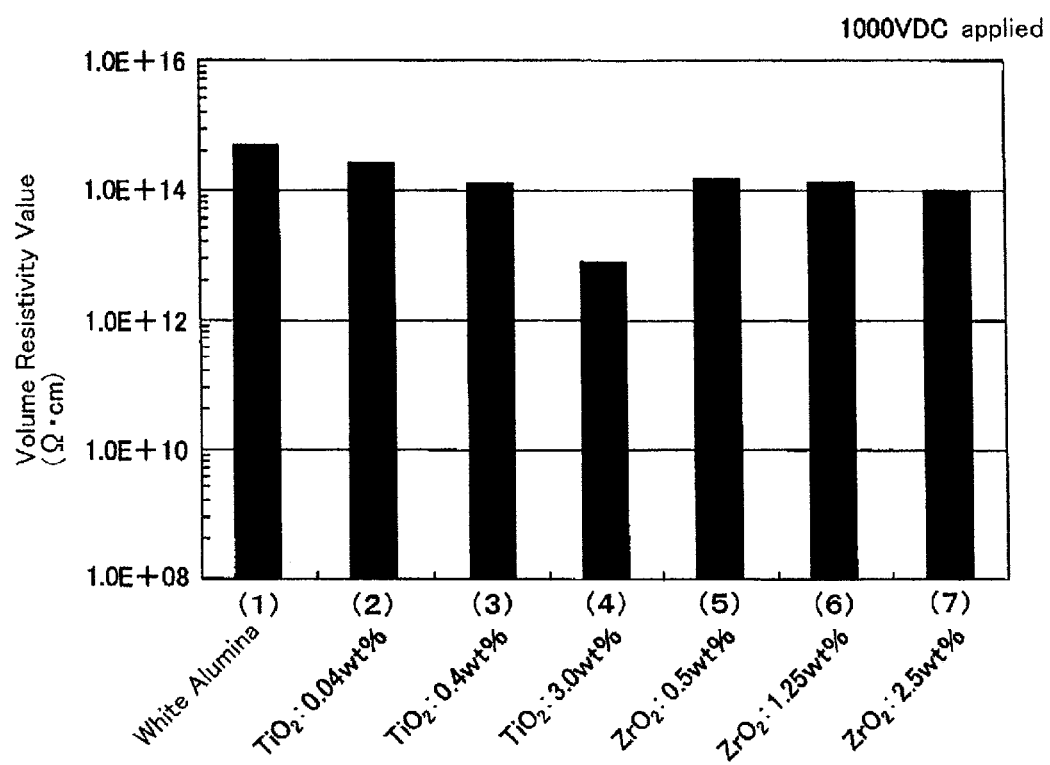
FIG. 30 is a bar graph similarly showing the results of measurements of the volume resistivity value of the ceramic sprayed layer.

FIG. 30 shows the respective volume resistivity values when a voltage of 1000 V was applied to each of the ceramic sprayed layers formed using the materials (1) to (7). As is evident in FIG. 30, the volume resistivity of the material {(4)} of alumina with titanium oxide incorporated at 3.0 percent by weight was $8.6 \times 10^{12}$ (Ω·cm), which was the lowest. Conversely that of the white alumina {(1)} was $5.0 \times 10^{14}$ (Ω·cm), which was the highest. Then, those of alumina with titanium oxide incorporated at 0.04 and 0.4 percent by weight, {(2) & (3)}, and those of alumina with zirconia incorporated at 0.5 to 2.5 percent by weight, {(5) to (7)}, showed similar values of 1.0 to $2.5 \times 10^{14}$ (Ω·cm). That is, regarding zirconia, the content of percentage of the reduction in the volume resistivity value with respect to the increase in its content is smaller than titanium oxide. This shows that a ceramic sprayed layer of alumina incorporating zirconia at 0.5 to 2.5 percent by weight has high insulating characteristics. Here, {(4)}, being alumina incorporating titanium oxide at 3.0 percent by weight, required a film thickness of 0.5 mm or more in order to ensure sufficient insulating characteristics. However, a material with alumina incorporating zirconia at 0.5 to 2.5 percent by weight could ensure sufficient insulating characteristics even if the film thickness was thinner. As a result, it was shown that the material cost could be reduced.

Working Example 5

Figure 31:
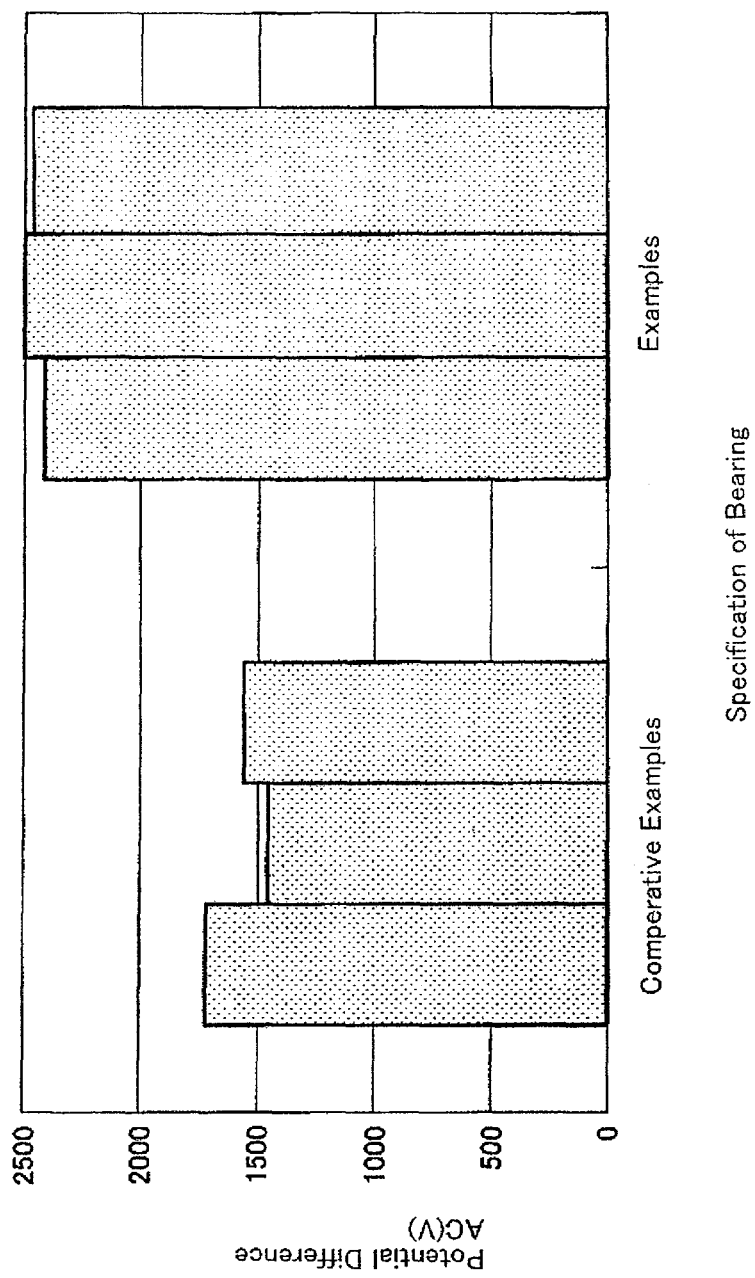
FIG. 31 is a bar graph showing the results of an experiment performed in order to confirm the effects of the present invention (comprising a seal device).

An experiment will be described which was performed in order to confirm the effects of the present invention (embodiment with a sealing device) by providing an insulating coating. In this experiment, three samples (working examples) in which an insulating coating was coated on the fitting grooves of the outer ring of a rolling bearing, and three samples (comparative examples) in which it was not coated (six in total), were prepared, and the breakdown voltage of each was investigated. A deep groove ball bearing, whose bearing designation was 6316 (outer diameter 170 mm, inner diameter 80 mm, width 39 mm), was used as the test bearing for every case. Furthermore, the insulating coating was a ceramic sprayed layer with alumina incorporated at 99 percent by weight or more. Moreover, the thickness of the insulating coating of the fitting grooves of the working example was 250 μm (0.25 mm) or more. Here, in the case of every test bearing, the outer peripheral surface of the outer ring and the two end faces in the axial direction were coated by the insulating coating to a thickness of 0.25 to 0.4 mm. The test bearings formed in this manner were each installed such that part of a housing and the fitting grooves were adjacent as in the construction shown in FIG. 6 (B), and the voltage when discharge phenomena occurred between the housing and the fitting grooves was investigated. The experimental results are shown in FIG. 31. As is evident from FIG. 31, in the case of the comparative examples in which the insulating coating was not formed in the fitting grooves, there were cases in which discharge phenomena occurred when the potential difference was approximately 1500 V. However, in the case of the working examples in which the insulating coating was formed in the fitting grooves, when the potential difference was 2000 V or more, furthermore even when it was approximately 2500 V, discharge phenomena were prevented from occurring.

Working Example 6

An experiment and calculation will be described which were performed in order to confirm the effects of the invention (about the relation of the film thickness of the insulating coating to the capacitance). The aim of the experiment and calculation was to investigate the capacitance in the case where a ceramic insulating coating was formed on the outer ring side of the rolling bearing and the thickness of the insulation coating was changed. The rolling bearing, being the object, was a deep groove ball bearing typically used in an electrical generator or an electric motor, and its bearing designation was 6336 (inner diameter 180 mm, outer diameter 380 mm, width 75 mm). The sum of the surface areas of the outer peripheral surface of the outer ring and the two end faces was 142780 mm².

Figure 32:
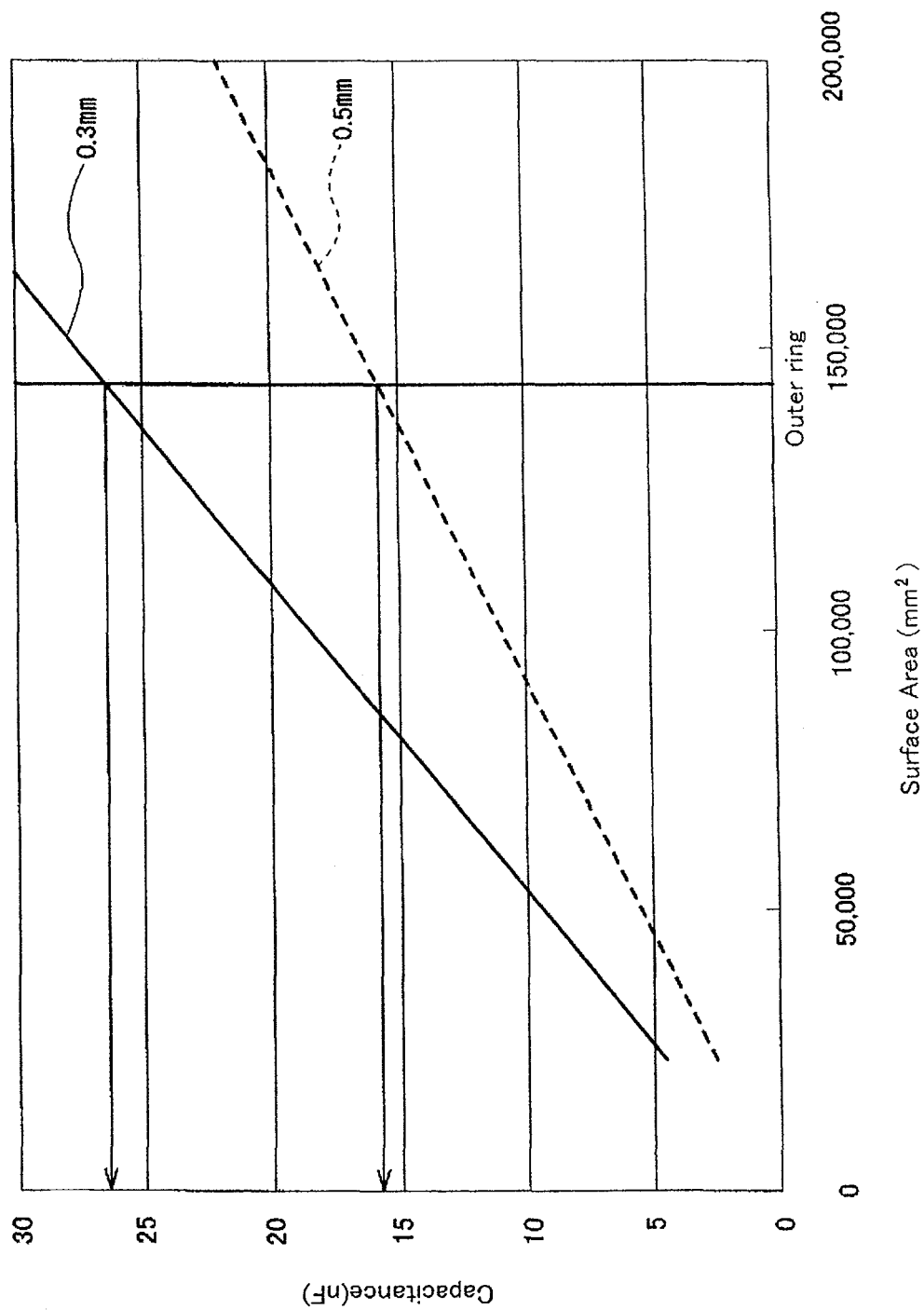
FIG. 32 is a line chart showing the results of calculations performed in order to investigate the effects of the present invention about the relation between capacitance and surface are of outer ring.

In the present working example, firstly, the capacitance per unit area of the insulating coating was measured. That is, the capacitance per unit area (10 mm×10 mm) of the ceramic insulating coating in which the content of alumina was 99.7 percent by weight and titanium oxide was contained at 0.04 percent by weight, was measured at film thicknesses of both 0.3 mm and 0.5 mm. In this manner, straight lines (solid line and broken line) as shown in FIG. 32 were obtained, and the capacitance at the surface area of the outer ring at each thickness was calculated. Here, the insulating coating with a thickness of 0.3 mm is shown by the solid line, and that of 0.5 mm is shown by the broken line. As is evident from FIG. 32, even in the case where the thickness of the insulating coating was 0.3 mm, the capacitance could be limited to 27 nF or less.

Working Example 7

Calculations will be described that were performed in order to confirm the effects of the present invention (about the relation of the formation place of insulating coating to the capacitance). The aim of these calculations was to compare the capacitances in the case where a ceramic insulating coating was formed on the outer ring side of a rolling bearing, and the case where the insulating coating was formed on the inner ring side. The rolling bearing, being the object, was a deep groove ball bearing typically used in an electrical generator or an electric motor, and its bearing designation was 6336 (inner diameter 180 mm, outer diameter 380 mm, width 75 mm). The sum of the surface areas of the outer peripheral surface and the two end faces of the outer ring was 142780 mm², and the sum of the surface areas of the inner peripheral surface and the two end faces of the inner ring was 77200 mm². Therefore, the surface area of the outer ring side was greater than or equal to 1.3 times (1.85 times) the surface area of the inner ring side.

Figure 33:
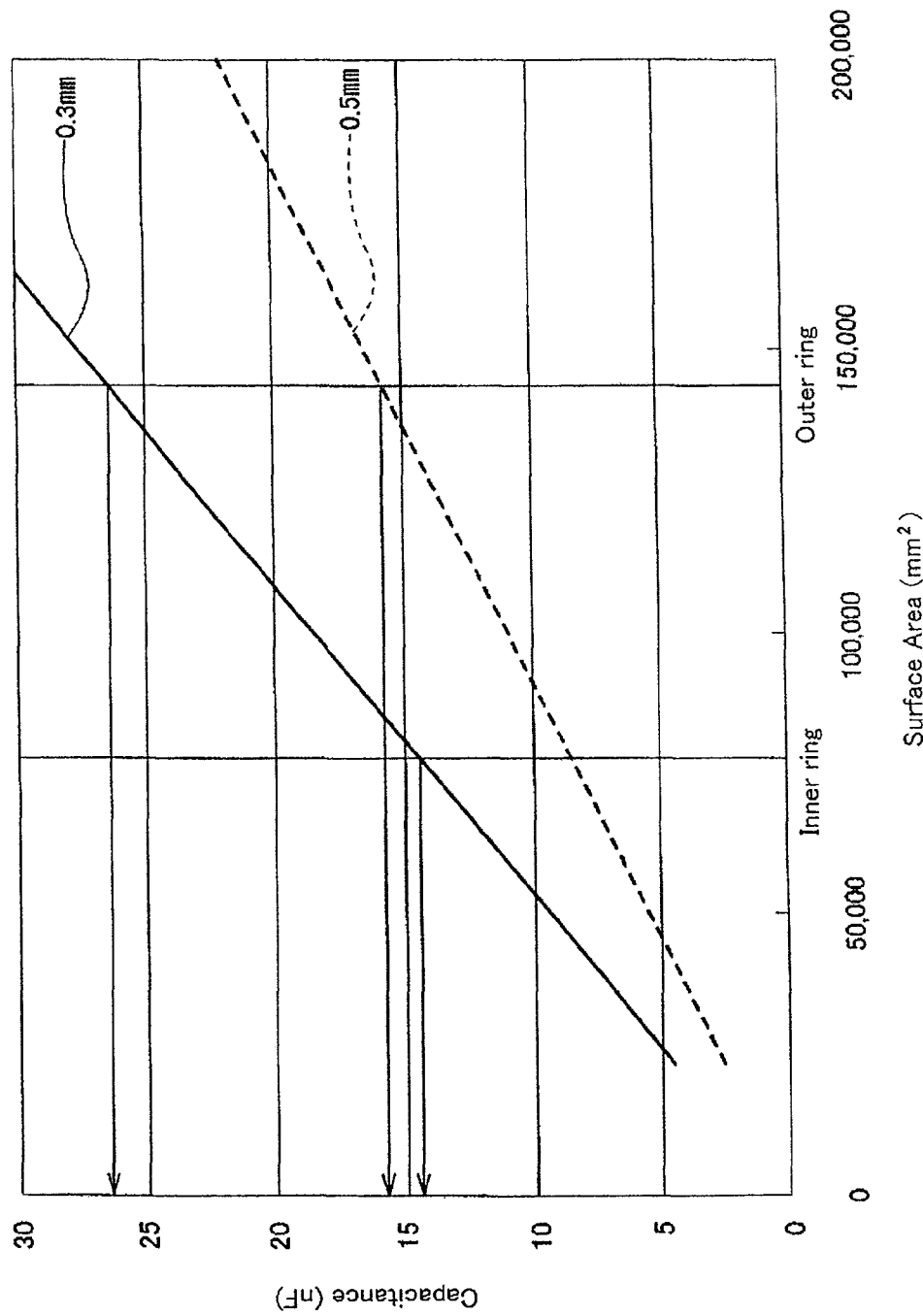
FIG. 33 is a line chart showing the results of calculations performed in order to investigate the effects of the present invention about the relation between capacitance and places formed with insulated layer.

In the present working example, firstly, the capacitance per unit area of the insulating coating was measured. That is, the capacitance per unit area (10 mm×10 mm) of the ceramic insulating coating in which the content of alumina was 99.7 percent by weight and titanium oxide was contained at 0.04 percent by weight, was measured at film thicknesses of both 0.3 mm and 0.5 mm. In this manner, straight lines (solid line and broken line) as shown in FIG. 33 were obtained, and the capacitance at each surface area at each thickness was calculated. Here, the insulating coating with a thickness of 0.3 mm is shown by the solid line, and that of 0.5 mm is shown by the broken line. As is evident from FIG. 33, the capacitance could be reduced further by forming the insulating coating on the inner ring side whose surface area was small. In particular, in the case where the thickness of the insulating coating was 0.3 mm, even in the case where it was formed on the outer ring side whose surface area was larger, the capacitance could be limited to 27 nF or less. However, in the case where the insulating coating with the same thickness was formed on the inner ring side, the capacitance became smaller than 15 nF. Furthermore, in the case where the insulating coating with a thickness of 0.5 mm was formed on the outer ring side, the capacitance could be made smaller, but the capacitance was greater than the case where the insulating coating with a thickness of 0.3 mm was formed on the inner ring side.

From such experimental results, it is proved that forming the insulating coating on the inner ring side enables the capacitance to be reduced much further, and thus higher impedance can be achieved. Moreover, from the above calculations, it is proved that in the case where the insulating coating is formed on the outer ring side, in order to obtain an equivalent capacitance to the rolling bearing in which the insulating coating is formed on the inner ring side, the film thickness of the insulating coating needs to be relatively large. Therefore, considered together with the fact that the area on which the insulating coating is formed on the outer ring side is large, it is proved that the effect on cost reduction by forming the insulating coating on the inner ring side is significantly large.

INDUSTRIAL APPLICABILITY

In the case where the present invention is implemented, it is also possible to implement a combination of each of the working examples. Furthermore, the present invention is not limited to a single row deep groove radial ball bearing as shown in the figures, and it can also be implemented in other types of radial ball bearing such as an angular contact type, a double row type or the like, or another type of rolling bearing such as a tapered roller bearing, a cylindrical roller bearing, a self-aligning roller bearing, a thrust ball bearing, a thrust roller bearing, or the like. In the case where it is implemented in a thrust rolling bearing, the insulating coating is formed on the inner and outer peripheral surfaces and one axial direction face.

Moreover, in each of the examples shown in FIGS. 4 to 7, a construction in which the insulating coating was formed on the outer ring was described. However, in the case where the inner ring has fitting grooves, the insulating coating is formed on the inner peripheral surface of the inner ring and the two axial end faces, and the fitting grooves. Furthermore, in the case where it is implemented in a thrust rolling bearing, the insulating coating is formed on the inner and outer peripheral surfaces, one axial direction face and the fitting grooves.

The invention claimed is:

1. An electrolytic erosion-preventing insulated rolling bearing, comprising:
    a pair of metal bearing rings which are placed concentrically with each other;
    a pair of raceway surfaces formed on facing surfaces of the two bearing rings; and
    a plurality of metal rolling elements provided between the raceway surfaces such that the metal rolling elements can roll freely, wherein
    at least one of the bearing rings includes a ceramic insulating coating formed on surfaces other than the surface on which the raceway surface is provided,
    the ceramic forming the insulating coating comprises 99 wt. % or more alumina, the insulating coating being formed by grinding a surface of a ceramic sprayed layer that is formed on the surfaces other than those on which the raceway surface is provided, the alumina containing 0.01 to 0.2 wt. % titanium oxide, and the alumina having a particle size ranging from 10 to 50 μm and an average particle size ranging from 15 to 25 μm,
    the thickness of the ceramic sprayed layer is 0.4 mm or less except on continuous folded over portions between adjacent surfaces, and
    the thickness of the insulating coating obtained by grinding the ceramic sprayed layer is 0.25 mm or more.

2. An electrolytic erosion-preventing insulated rolling bearing comprising:
    a metal outer ring having an outer ring raceway formed on its inner peripheral surface;
    a metal inner ring placed medially with respect to the outer ring, and having an inner ring raceway formed on its outer peripheral surface; and
    a plurality of metal rolling elements provided between the outer ring raceway and the inner ring raceway such that the metal rolling elements can roll freely,
    wherein a ceramic insulating coating with alumina as its main component is formed on at least an outer peripheral surface of the outer ring, excluding the surface defining the outer ring raceway, wherein the ceramic insulating coating has a thickness of from 0.1 to 0.7 mm and comprises 99 wt. % or more alumina and 0.01 to 0.2 wt. % titanium oxide, and the alumina has a particle size ranging from 10 to 50 μm and an average particle size ranging from 15 to 25 μm, and wherein the ceramic insulating coating has an insulation resistance value of 1000 MΩ or more, and a capacitance of 27 nF or less.

3. An electrolytic erosion-preventing insulated rolling bearing according to claim 2, wherein the ceramic insulating coating is formed by plasma spraying, and one of the inner ring and the outer ring is made from a high temperature dimensionally stabilized material or has undergone a high temperature dimension stabilizing treatment.

4. An electrolytic erosion-preventing insulated rolling bearing according to claim 2, wherein the outer diameter of the rolling bearing is 200 mm or more, and the ceramic insulating coating consists of a single layer formed directly on the surface of the outer ring.

* * * * *